United States Patent
Yamauchi et al.

(10) Patent No.: US 11,243,349 B2
(45) Date of Patent: Feb. 8, 2022

(54) WAVELENGTH CONVERSION DEVICE AND EXCITATION LIGHT SWITCHING METHOD

(71) Applicant: FUJITSU LIMITED, Kawasaki (JP)

(72) Inventors: Tomohiro Yamauchi, Kawasaki (JP); Takeshi Hoshida, Kawasaki (JP); Shingo Hara, Kawasaki (JP); Hiroki Satou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/705,724

(22) Filed: Dec. 6, 2019

(65) Prior Publication Data
US 2020/0200973 A1  Jun. 25, 2020

(30) Foreign Application Priority Data

Dec. 21, 2018 (JP) .............................. JP2018-239161

(51) Int. Cl.
G02B 6/12 (2006.01)

(52) U.S. Cl.
CPC ............ *G02B 6/12033* (2013.01); *G02B 2006/12109* (2013.01); *G02B 2006/12145* (2013.01); *G02B 2006/12164* (2013.01)

(58) Field of Classification Search
None
See application file for complete search history.

(56) References Cited

U.S. PATENT DOCUMENTS

| 5,859,938 A * | 1/1999 | Nabeyama ......... H01S 3/13013 385/24 |
| 6,324,318 B1 * | 11/2001 | Suzuki ............... H04J 14/0221 385/1 |

(Continued)

FOREIGN PATENT DOCUMENTS

| EP | 2390719 A1 | 11/2011 |
| JP | H04-003029 A | 1/1992 |

(Continued)

OTHER PUBLICATIONS

EESR—Extended European Search Report dated May 18, 2020 for corresponding European Paten Application No. 19212848.6.

(Continued)

*Primary Examiner* — Chris H Chu
(74) *Attorney, Agent, or Firm* — Fujitsu Patent Center

(57) ABSTRACT

A device includes a first excitation light source that emits first excitation light, a second excitation light source that emits second excitation light, a wavelength converter that converts signal light of a first wavelength into signal light of a second wavelength according to the first excitation light, and a measurer that measures a frequency difference between the first excitation light and the second excitation light, wherein when an abnormality of the first excitation light is detected, the second excitation light source is adjusted so that a frequency of the second excitation light is aligned with a frequency of the first excitation light before the abnormality detection, based on the frequency difference before the abnormality detection, and the wavelength converter converts the signal light of the first wavelength into the signal light of the second wavelength according to the second excitation light, after adjusting the frequency of the second excitation light.

7 Claims, 47 Drawing Sheets

(56) References Cited

U.S. PATENT DOCUMENTS

| | | | | |
|---|---|---|---|---|
| 6,347,174 B1* | 2/2002 | Onishi | ............... | G02B 6/02028 359/326 |
| 6,704,136 B2* | 3/2004 | Neuhauser | ........ | H01S 3/094003 359/334 |
| 2018/0219629 A1* | 8/2018 | Flens | .................. | H04J 14/0297 |
| 2020/0059313 A1 | 2/2020 | Kato et al. | | |

FOREIGN PATENT DOCUMENTS

| | | |
|---|---|---|
| JP | H04-121716 A | 4/1992 |
| JP | H06-326383 A | 11/1994 |
| WO | 2009/004698 A1 | 1/2009 |
| WO | 2018/198478 A1 | 11/2018 |

OTHER PUBLICATIONS

EPOA—European Office Action dated Dec. 4, 2020 for corresponding European Patent Application No. 19212848.6.
CNOA—Chinese Office Action dated Oct. 8, 2021 for corresponding Chinese Patent Application No. 201911309188.7, with English translation.

* cited by examiner

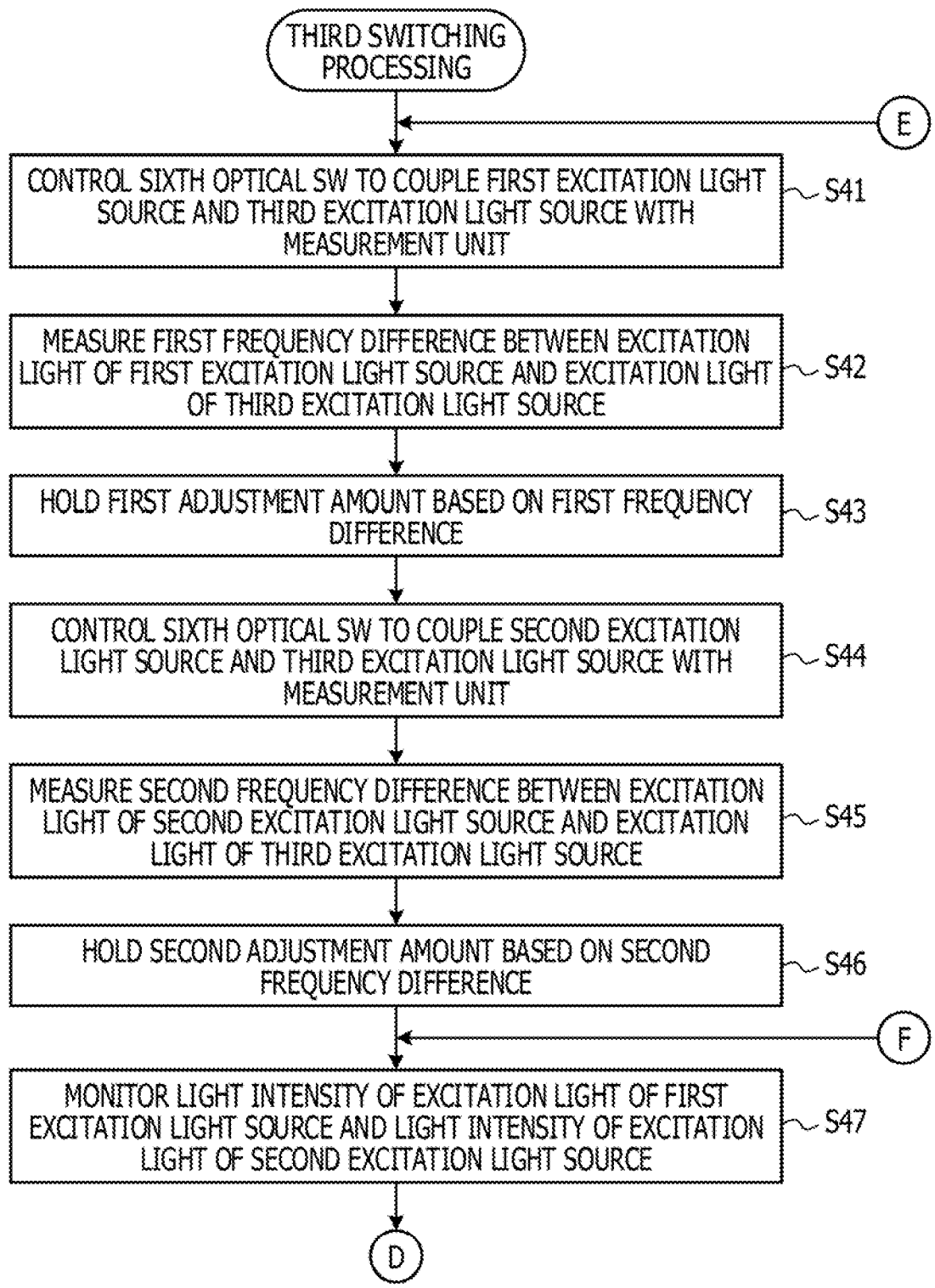

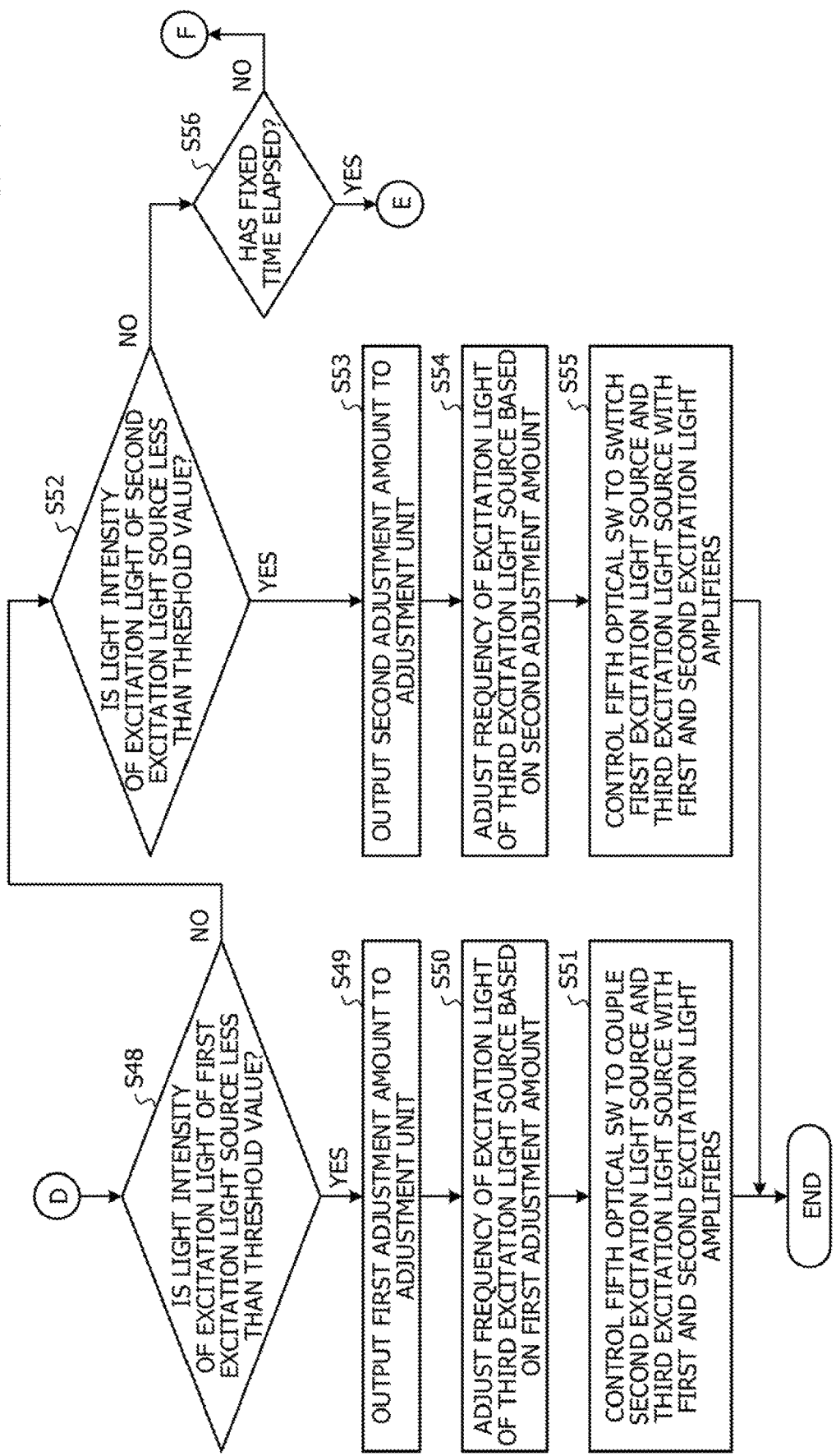

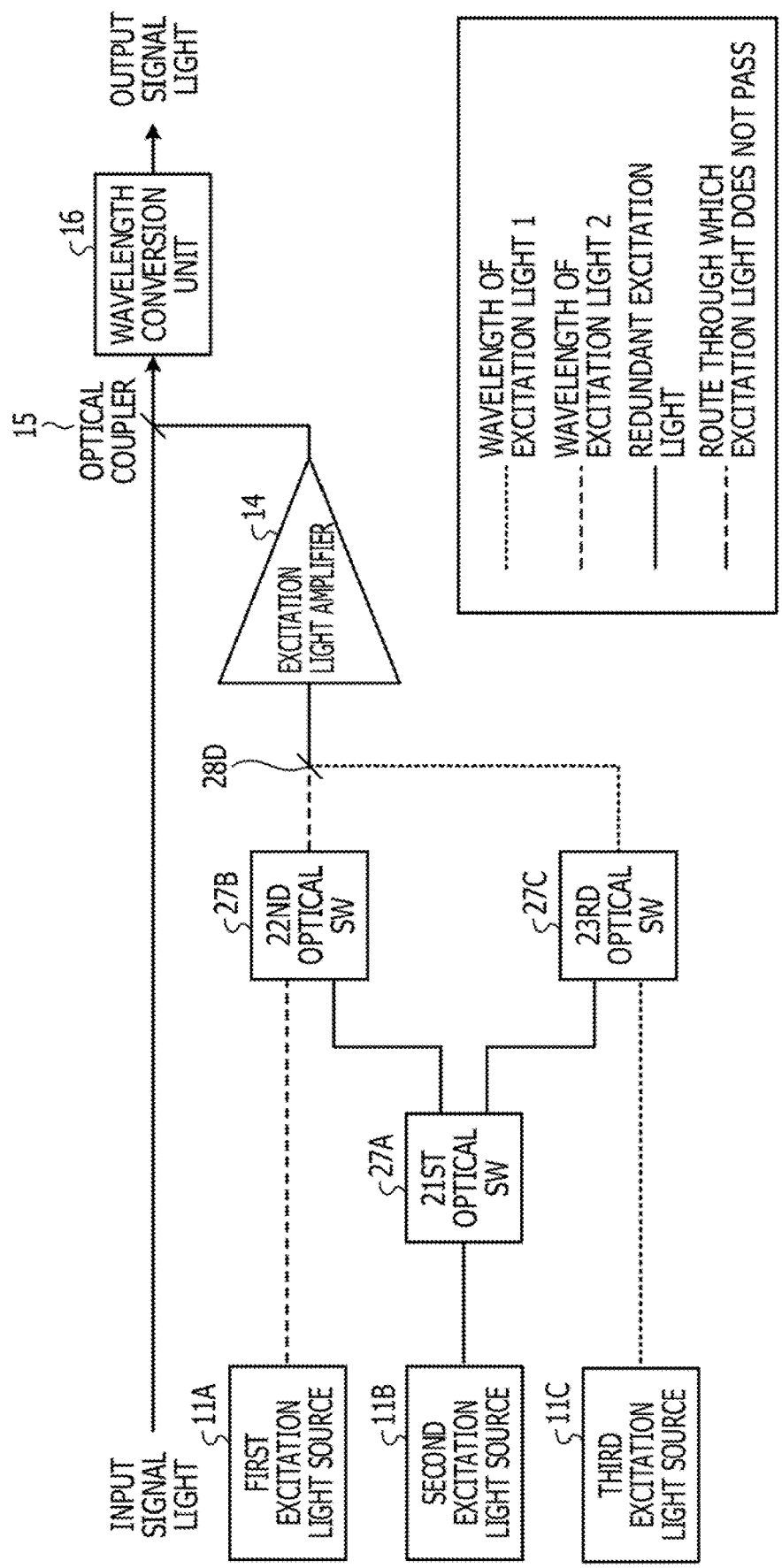

FIG. 30

| ROUTE 1 | ROUTE 2 | ROUTE 1 - ROUTE 2 | DETECTION RESULT |
|---|---|---|---|
| 3dB REDUCE | 3dB REDUCE | 0dB REDUCE | OUTPUT REDUCTION |
| 2dB REDUCE | 0dB REDUCE | 2dB REDUCE | FREQUENCY DEVIATION |
| 5dB REDUCE | 3dB REDUCE | 2dB REDUCE | OUTPUT REDUCTION FREQUENCY DEVIATION |

WAVELENGTH CONVERSION DEVICE AND EXCITATION LIGHT SWITCHING METHOD

CROSS-REFERENCE TO RELATED APPLICATION

This application is based upon and claims the benefit of priority of the prior Japanese Patent Application No. 2018-239161, filed on Dec. 21, 2018, the entire contents of which are incorporated herein by reference.

FIELD

The embodiments discussed herein are related to a wavelength conversion device and an excitation light switching method.

BACKGROUND

There is known a wavelength conversion technique for increasing transmission capacity by increasing the number of channels of, for example, wavelength division multiplex (WDM) light, for the continuously increasing traffic of an optical network. In the wavelength conversion technique, a wavelength conversion device that converts a wavelength of WDM light of a first wavelength into WDM light of a second wavelength different from the first wavelength according to excitation light is adopted.

However, in the wavelength conversion device, for example, a possibility of occurrence of an abnormality is higher than that in a general optical component such as an optical amplifier, so it is important to secure a redundancy of the wavelength conversion device. In the wavelength conversion device, there is a high possibility of occurrence of an abnormality in excitation light used for wavelength conversion, so it is considered to provide a redundancy to excitation light. However, in a case where a frequency is shifted between the excitation light beams, reception error may occur in a receiver on an opposite side of the excitation light at the time of switching.

For example, in a WDM system in which a transmitting side WDM device transmits WDM light to a receiving side WDM device, a transmitting side wavelength conversion device and a receiving side wavelength conversion device are arranged between the transmitting side WDM device and the receiving side WDM device. The transmitting side wavelength conversion device converts WDM light of a first wavelength into WDM light of a second wavelength according to excitation light and transmits the converted WDM light of the second wavelength to the receiving side wavelength conversion device. Further, the receiving side wavelength conversion device converts WDM light of the second wavelength into WDM light of the first wavelength according to the excitation light and transmits the converted WDM light of the first wavelength to the receiving side WDM device. For example, first wavelength conversion is performed by the transmitting side wavelength conversion device, and second wavelength conversion is performed by the receiving side wavelength conversion device.

FIG. 36 is an explanatory diagram illustrating an example of WDM light before wavelength conversion and WDM light after wavelength conversion in the wavelength conversion device. The wavelength conversion device converts the wavelength of WDM light of the first wavelength into WDM light of the second wavelength according to the excitation light as illustrated in FIG. 36.

For example, as related arts, Japanese Laid-open Patent Publication Nos. 4-3029, 4-121716, and 6-326383 are disclosed.

SUMMARY

According to an aspect of the embodiments, a device includes a first excitation light source that emits first excitation light, a second excitation light source that emits second excitation light, a wavelength converter that converts signal light of a first wavelength into signal light of a second wavelength according to the first excitation light, and a measurer that measures a frequency difference between the first excitation light and the second excitation light, wherein when an abnormality of the first excitation light is detected, the second excitation light source is adjusted so that a frequency of the second excitation light is aligned with a frequency of the first excitation light before the abnormality detection, based on the frequency difference before the abnormality detection, and the wavelength converter converts the signal light of the first wavelength into the signal light of the second wavelength according to the second excitation light, after adjusting the frequency of the second excitation light.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 9A and 9B are flowcharts illustrating an example of a processing operation of a wavelength conversion device related to third switching processing;

FIG. 22 is an explanatory diagram illustrating an example of an optical SW switching operation of a wavelength conversion device in a case of a failure of a second excitation light source from an operation state illustrated in FIG. 21;

FIG. 30 is an explanatory diagram illustrating an example of a determination result of an abnormality detection;

DESCRIPTION OF EMBODIMENTS

For example, in the wavelength conversion device, in a case where an excitation light source of maximum of ±ΔfGHz is used, there is a possibility that a frequency deviation of ±2ΔfGHz at the maximum occurs, for example, in first wavelength conversion due to a frequency drift such as a temperature change.

Figure 37:
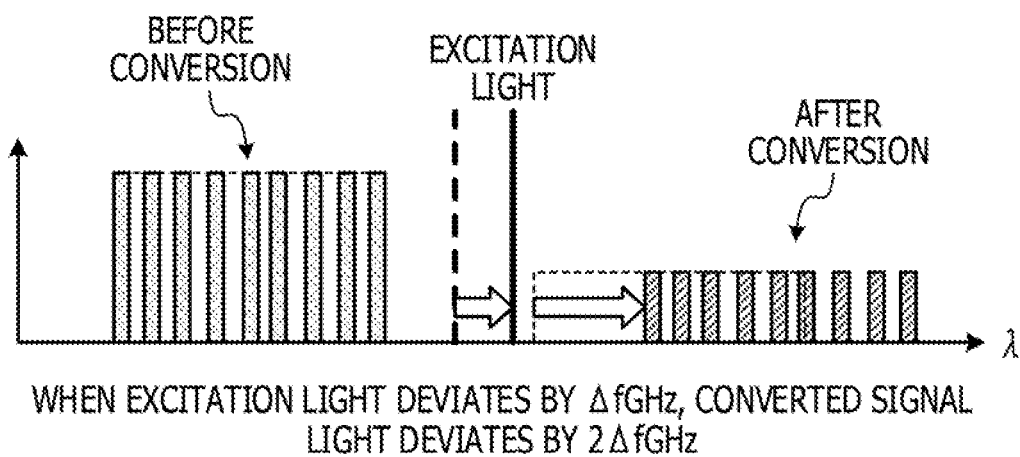
FIG. 37 is an explanatory diagram illustrating an example of WDM light before wavelength conversion and WDM light after wavelength conversion in a case of a frequency deviation (ΔfGHz) of excitation light.

FIG. 37 is an explanatory diagram illustrating an example of WDM light before wavelength conversion and WDM light after wavelength conversion in a case of a frequency deviation (ΔfGHz) of excitation light. When the frequency deviation of +ΔfGHz of excitation light is generated in the first wavelength conversion of the transmitting side wavelength conversion device, a frequency deviation of +2ΔfGHz is generated in WDM light after wavelength conversion, as illustrated in FIG. 37.

Figure 38:
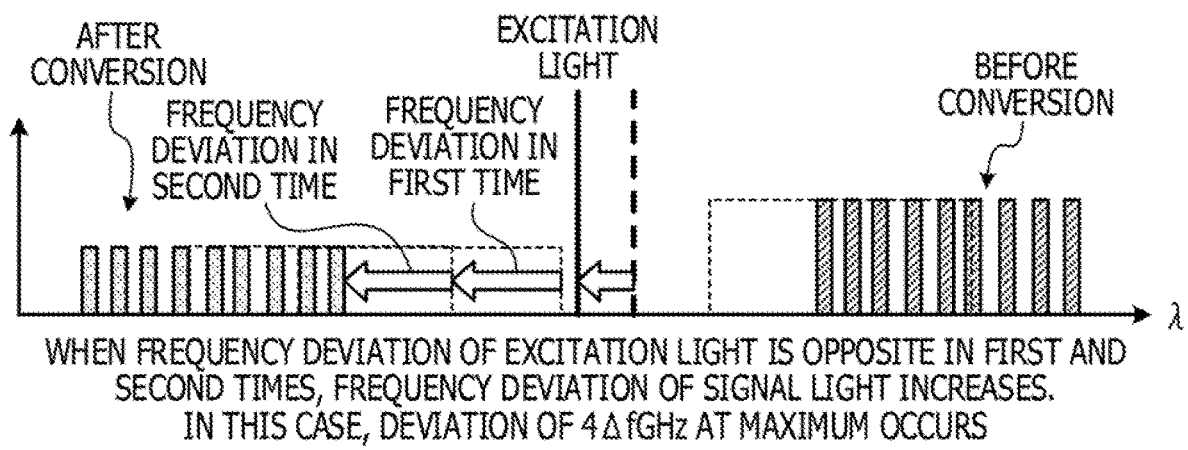
FIG. 38 is an explanatory diagram illustrating an example of WDM light before wavelength conversion and WDM light after wavelength conversion in a case where a frequency deviation of excitation light is opposite in the first and second times.

FIG. 38 is an explanatory diagram illustrating an example of WDM light before wavelength conversion and WDM light after wavelength conversion in a case where a frequency deviation of excitation light is opposite in the first and second times. The first frequency deviation of the excitation light is, for example, the frequency deviation of the excitation light in wavelength conversion of the transmitting side wavelength conversion device. When the frequency deviation of −ΔfGHz of excitation light is generated in the second wavelength conversion of the receiving side wavelength conversion device, as illustrated in FIG. 38, in the WDM light after wavelength conversion, a frequency deviation of 4ΔfGHz occurs due to a wavelength relationship between the excitation light and the WDM light before conversion. As a result, even when a coherent optical receiver capable of following up to the frequency deviation of ±F(<4Δf)GHz is used in the receiving side WDM device, it is not possible to follow up to the frequency deviation of, for example, 4ΔfGHz of the converted WDM light, thereby reception error occurs.

In view of the above, it is desirable to provide a wavelength conversion device or the like that is capable of suppressing a frequency deviation at the time of switching excitation light.

In one aspect, the frequency deviation at the time of switching the excitation light may be suppressed.

Hereinafter, Examples of the wavelength conversion device and the excitation light switching method disclosed in this application will be explained in detail with reference to the drawings. The disclosed technology is not limited by each Example. Each of the following Examples may be suitably combined within a range not causing contradiction.

Example 1

Figure 1:
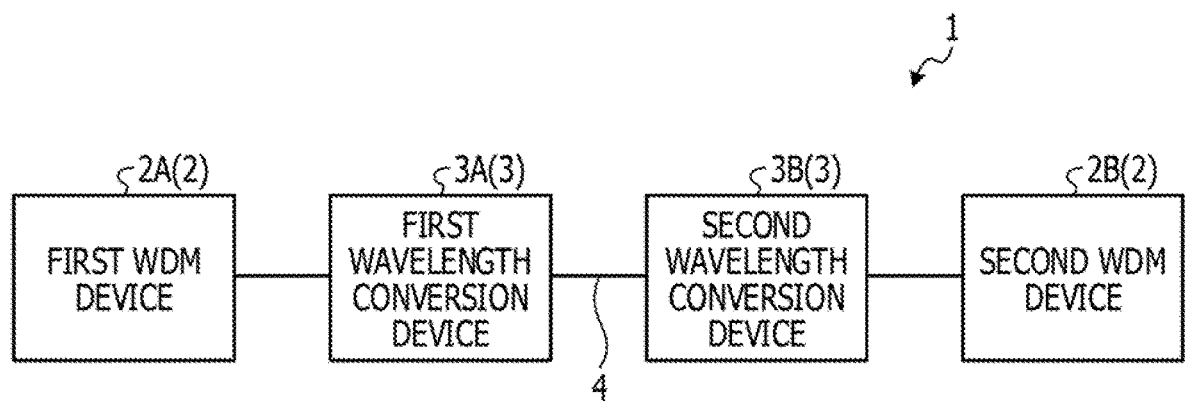
FIG. 1 is an explanatory diagram illustrating an example of a WDM system according to the present example.

FIG. 1 is an explanatory diagram illustrating an example of a WDM system 1 according to the present example. A wavelength division multiplex (WDM) system 1 illustrated in FIG. 1 includes a plurality of WDM devices 2 and a plurality of wavelength conversion devices 3. The WDM device 2 includes a first WDM device 2A and a second WDM device 2B on the opposite side. The WDM device 2 adopts, for example, a reception coherent method. The wavelength conversion device 3 converts the wavelength of the WDM light of the first wavelength into the WDM light of the second wavelength by using a single excitation light. The wavelength conversion device 3 has a first wavelength conversion device 3A and a second wavelength conversion device 3B on the opposite side. The first WDM device 2A is coupled to the second WDM device 2B by an optical fiber 4. The first wavelength conversion device 3A and a second wavelength conversion device 3B are arranged in the optical fiber 4 between the first WDM device 2A and the second WDM device 2B.

The first WDM device 2A multiplexes a first wavelength, for example, C-band signal light, and outputs the multiplexed C-band WDM light to the first wavelength conversion device 3A. The first wavelength conversion device 3A converts the wavelength of conventional band (C-band) WDM light into the second wavelength, for example, long-wavelength band (L-band) WDM light according to the excitation light, and outputs the converted L-band WDM light to the optical fiber 4.

The second wavelength conversion device 3B converts the wavelength of the L-band WDM light from the first wavelength conversion device 3A into the C-band WDM light according to the excitation light, and outputs the converted C-band WDM light to the second WDM device 2B. The second WDM device 2B demultiplexes the C-band WDM light into signal light beams of each wavelength and outputs the demultiplexed signal light beams to each optical transceiver.

Figure 2:
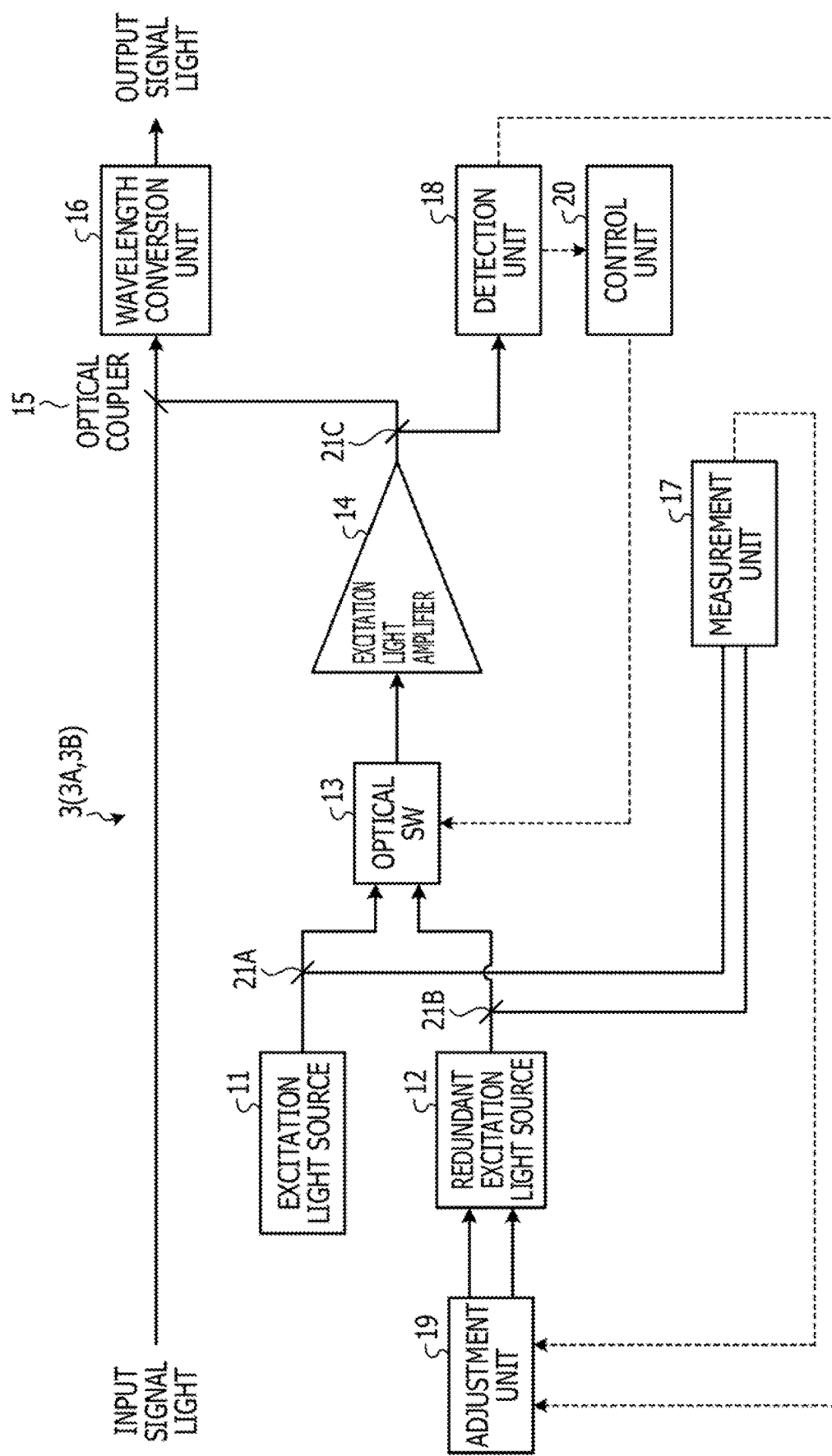
FIG. 2 is an explanatory diagram illustrating an example of a wavelength conversion device of Example 1.

FIG. 2 is an explanatory diagram illustrating an example of a wavelength conversion device 3 of Example 1. The wavelength conversion device 3 illustrated in FIG. 2 includes an excitation light source 11, a redundant excitation light source 12, an optical SW 13, an excitation light amplifier 14, an optical coupler 15, and a wavelength conversion unit 16. Further, wavelength conversion device 3 includes a measurement unit 17, a detection unit 18, an adjustment unit 19, a control unit 20, a first optical coupler 21A, a second optical coupler 21B, and a third optical coupler 21C.

The excitation light source 11 is, for example, a first excitation light source that emits excitation light in operation. The redundant excitation light source 12 is, for example, a second excitation light source that emits preliminary excitation light when the excitation light source 11 is switched. The optical SW 13 is a switch for switching and outputting the excitation light of the excitation light source 11 or the redundant excitation light source 12 to the excitation light amplifier 14. The excitation light amplifier 14 is an amplifier for optically amplifying excitation light which is an output of the optical SW 13. The optical coupler 15 multiplexes signal light of different wavelengths from each optical transceiver (not illustrated) and excitation light from the excitation light amplifier 14, and outputs the multiplexed signal light to the wavelength conversion unit 16. The wavelength conversion unit 16 converts the wavelength of the multiplexed signal light beams into different wavelength band according to the excitation light, for example, converts C-band WDM light into L-band WDM light.

The first optical coupler 21A is disposed between the excitation light source 11 and the optical SW 13, and branches and outputs the excitation light from the excitation light source 11 to the measurement unit 17 and the optical SW 13. The second optical coupler 21B is disposed between the redundant excitation light source 12 and the optical SW 13, and branches and outputs the excitation light from the redundant excitation light source 12 to the measurement unit 17 and the optical SW 13. The third optical coupler 21C is disposed between the excitation light amplifier 14 and the optical coupler 15, and branches and outputs the excitation light from the excitation light amplifier 14 to the optical coupler 15 and the detection unit 18.

The measurement unit 17 measures the frequency difference between the excitation light in operation from the excitation light source 11 via the first optical coupler 21A, and the excitation light from the redundant excitation light source 12 via the second optical coupler 21B. The measurement unit 17 calculates an adjustment amount according to the frequency difference, and outputs the calculated adjustment amount to the adjustment unit 19. The adjustment amount is an adjustment amount for aligning the frequency of the excitation light from the redundant excitation light source 12 with the frequency of the excitation light from the excitation light source 11 before abnormality detection, that is, for making the frequency difference zero. The frequency of the excitation light before abnormality detection is, for example, the frequency of the excitation light when the excitation light is measured at regular time interval in the step before an abnormality of the excitation light is detected by the detection unit 18. The regular time interval is a cycle timing when the measurement unit 17 measures the frequency difference.

The detection unit 18 detects a light intensity of the excitation light from the excitation light amplifier 14 via the third optical coupler 21C, and determines whether an abnormality of the excitation light is detected, based on the light intensity. The light intensity is, for example, an intensity corresponding to a current value or output power of the excitation light. When an abnormality of the excitation light is detected, the detection unit 18 outputs an abnormality of the excitation light to the adjustment unit 19 and the control unit 20. When an abnormality of the excitation light is detected, the adjustment unit 19 adjusts the frequency of the excitation light from the redundant excitation light source 12 according to the adjustment amount. As a result, the redundant excitation light source 12 outputs the adjusted excitation light having the same frequency as the excitation light of the excitation light source 11 before abnormality detection. When an abnormality of the excitation light is detected, the optical SW 13 switches the input from the excitation light source 11 to the excitation light of the redundant excitation light source 12. The adjustment unit 19 is realized, for example, by a circuit such as a resonator.

Figure 3:
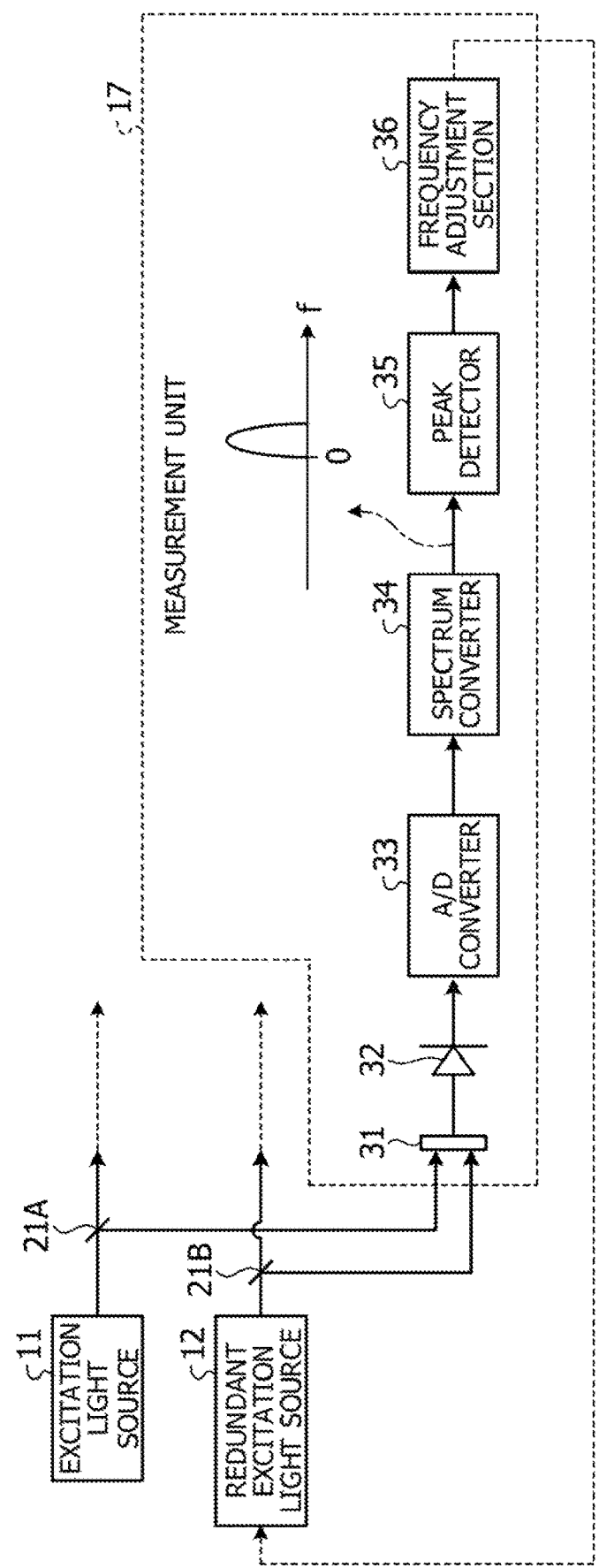
FIG. 3 is an explanatory diagram illustrating an example of a measurement unit.

FIG. 3 is an explanatory diagram illustrating an example of a measurement unit 17. The measurement unit 17 illustrated in FIG. 3 includes a multiplexing section 31, a photo diode (PD) 32, an A/D converter 33, a spectrum converter 34, a peak detector 35, and a frequency adjustment section 36. The multiplexing section 31 multiplexes the excitation light from the excitation light source 11 via the first optical coupler 21A and the excitation light from the redundant excitation light source 12 via the second optical coupler 21B. The PD 32 electrically converts the excitation light after multiplexing in the multiplexing section 31. The A/D converter 33 digitally converts an excitation light signal after electric conversion. The spectrum converter 34 performs spectrum conversion on the excitation light signal after digital conversion. The peak detector 35 detects the peak of the excitation light signal after spectrum conversion. The frequency adjustment section 36 calculates the adjustment amount at the peak of the excitation light signal.

Figure 4:
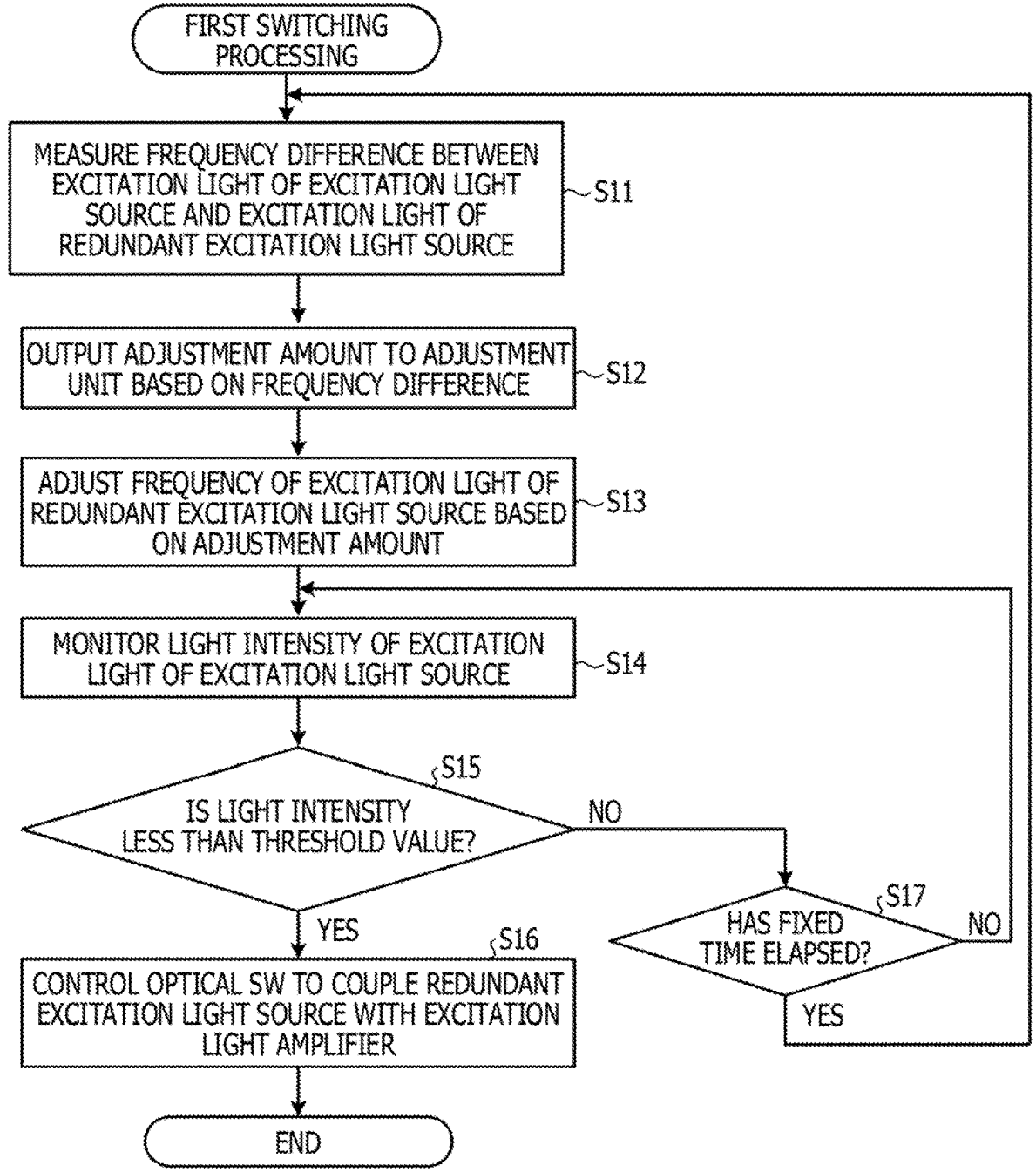
FIG. 4 is a flowchart illustrating an example of a processing operation of a wavelength conversion device related to first switching processing.

The operation of the WDM system 1 according to Example 1 will be explained below. FIG. 4 is a flowchart illustrating an example of a processing operation of a wavelength conversion device 3 related to first switching processing. In FIG. 4, the measurement unit 17 in the wavelength conversion device 3 measures the frequency difference between the frequency of excitation light from the excitation light source 11 and the frequency of excitation light from the redundant excitation light source 12 (Step S11). The measurement unit 17 outputs the adjustment amount before abnormality detection to the adjustment unit 19 in the wavelength conversion device 3 based on the frequency difference (Step S12).

The adjustment unit 19 adjusts the frequency of the excitation light of the redundant excitation light source 12 based on the adjustment amount (Step S13). As a result, the frequency of the excitation light of the redundant excitation light source 12 becomes the same as the frequency of the excitation light of the excitation light source 11. The detection unit 18 in the wavelength conversion device 3 monitors the light intensity of the excitation light of the excitation light source 11 (Step S14). The detection unit 18 determines whether the light intensity of the excitation light is less than a threshold value (Step S15). The threshold value is the threshold value of the light intensity for detecting an abnormality of the excitation light.

The control unit 20 in the wavelength conversion device 3 determines that the excitation light is abnormal when the light intensity is less than the threshold value (Step S15: Yes), controls the optical SW 13 to switch and couple the redundant excitation light source 12 to the excitation light amplifier 14 (Step S16), and ends the processing operation illustrated in FIG. 4. As a result, the excitation light amplifier 14 inputs the adjusted excitation light from the redundant excitation light source 12, amplifies the adjusted excitation light to output to the optical coupler 15. The control unit 20 is realized by a circuit such as a processor.

When the light intensity is not less than the threshold value (Step S15: No), the detection unit 18 determines that the excitation light from the excitation light source 11 is normal and determines whether a fixed time has elapsed (Step S17). In a case where a fixed time has elapsed (Step S17: Yes), the detection unit 18 proceeds to step S11 to measure a frequency difference between the excitation light source 11 and the redundant excitation light source 12. When a fixed time has not elapsed (Step S17: No), the detection unit 18 proceeds to step S14 to monitor the light intensity of the excitation light.

In the wavelength conversion device 3 of Example 1, the frequency difference between the excitation light in operation from the excitation light source 11 and preliminary excitation light from the redundant excitation light source 12 is measured. When an abnormality of the excitation light in operation is detected, the wavelength conversion device 3 adjusts the frequency of the preliminary excitation light to the frequency of the excitation light in operation before abnormality detection, based on the adjustment amount corresponding to the frequency difference before abnormality detection. After adjusting the frequency of the preliminary excitation light, the wavelength conversion device 3 aligns the frequency of the preliminary excitation light with the frequency of the excitation light in operation before abnormality detection, and switches from the excitation light source 11 to the redundant excitation light source 12. As a result, in the WDM device 2, communication may be continued without interruption even when the excitation light in operation is abnormal by suppressing the frequency deviation of the excitation light, that is, by aligning the frequencies between the excitation light beams, thereby avoiding reception error.

In the wavelength conversion device 3 of Example 1, a case where wavelength conversion is performed using single-wavelength excitation light is described, but the embodiment is not limited to the single-wavelength excitation light, wavelength conversion may be performed using two-wavelength excitation light, and with regard to the embodiment thereof, description will be made below as Example 2.

Example 2

Figure 5:
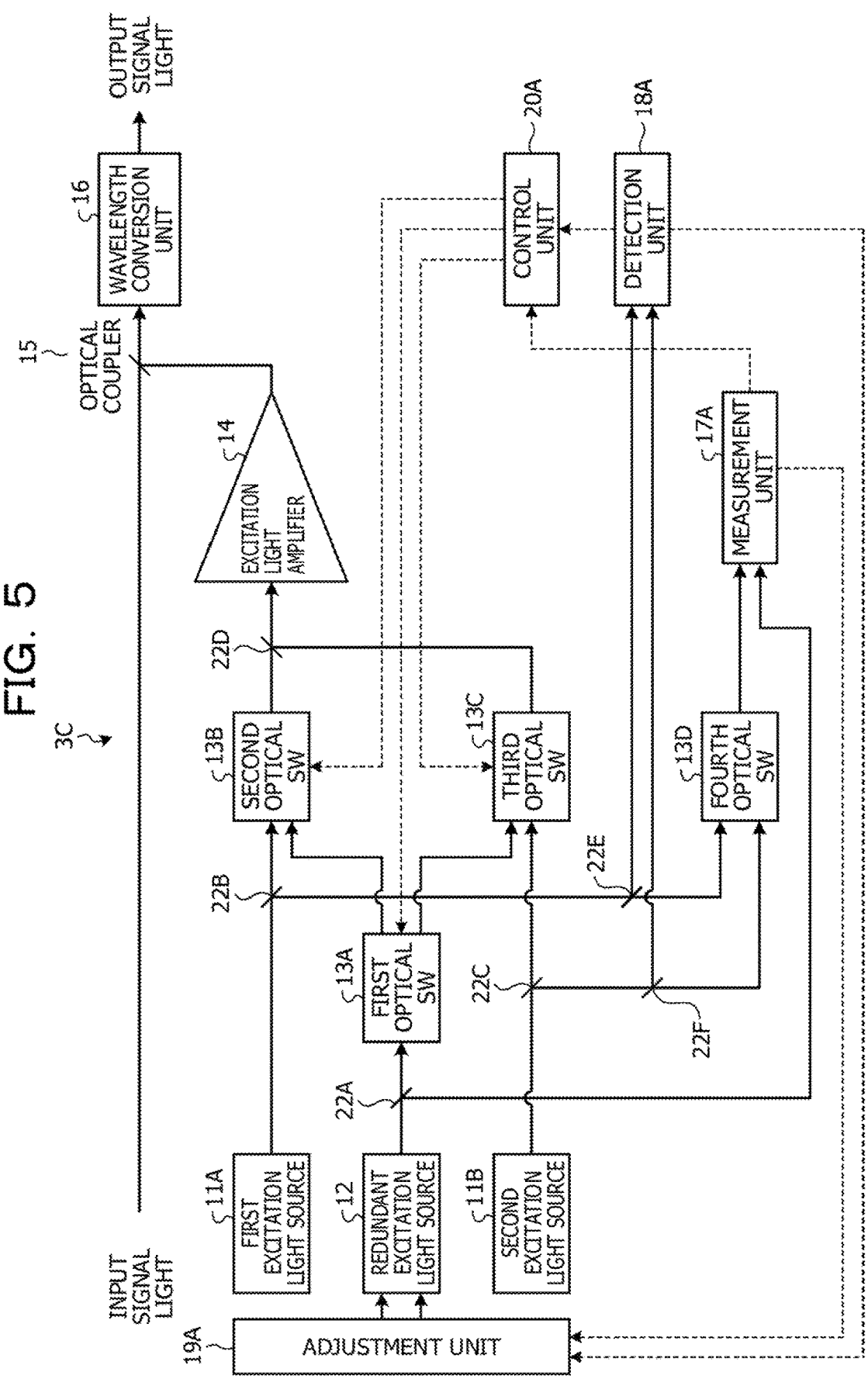
FIG. 5 is an explanatory diagram illustrating an example of a wavelength conversion device of Example 2.

FIG. 5 is an explanatory diagram illustrating an example of a wavelength conversion device 3C of Example 2. The same components as those in the WDM system 1 of Example 1 are denoted by the same reference numerals, and the description of the overlapping configuration and operation is omitted. The wavelength conversion device 3C illustrated in FIG. 5 converts the wavelength of WDM light by using two-wavelength excitation light. The wavelength conversion device 3C includes a first excitation light source 11A, a second excitation light source 11B, a redundant excitation light source 12, a first optical SW 13A, a second optical SW 13B, a third optical SW 13C, and a fourth optical SW 13D. In the wavelength conversion device 3C, when the WDM light and two excitation light beams on a long wavelength side of the WDM light side are input, non-degenerate four light is output from the WDM light after wavelength conversion on the long wavelength side centered on the two excitation light beams. The wavelength conversion device 3C includes a measurement unit 17A, a detection unit 18A, an adjustment unit 19A, and a control unit 20A. The wavelength conversion device 3C includes an 11th optical coupler 22A, a 12th optical coupler 22B, a 13th optical coupler 22C, a 14th optical coupler 22D, a 15th optical coupler 22E, and a 16th optical coupler 22F.

The first excitation light source 11A emits first excitation light. The second excitation light source 11B emits second excitation light. The redundant excitation light source 12 emits preliminary excitation light which is used when switching of the first excitation light source 11A or the second excitation light source 11B.

The first optical SW 13A is disposed between the redundant excitation light source 12, and the second optical SW 13B and the third optical SW 13C, and is a switch for switching and outputting the preliminary excitation light from the redundant excitation light source 12 to the second optical SW 13B or the third optical SW 13C. The second optical SW 13B is disposed between the first excitation light source 11A and the first optical SW 13A, and the excitation light amplifier 14, and is a switch for switching and outputting the first excitation light from the first excitation light source 11A or the preliminary excitation light from the first optical SW 13A to the excitation light amplifier 14. The third optical SW 13C is disposed between the second excitation light source 11B and the first optical SW 13A, and the excitation light amplifier 14, and is a switch for switching and outputting the second excitation light from the second excitation light source 11B or the excitation light from the first optical SW 13A to the excitation light amplifier 14. The fourth optical SW 13D is disposed between the first excitation light source 11A and the second excitation light source 11B, and the measurement unit 17, and is a switch for switching and outputting the first excitation light from the first excitation light source 11A or the second excitation light from the second excitation light source 11B to the measurement unit 17.

The 11th optical coupler 22A is disposed between the redundant excitation light source 12 and the first optical SW 13A, and the preliminary excitation light from the redundant excitation light source 12 is branched and output to the first optical SW 13A and the measurement unit 17A. The 12th optical coupler 22B is disposed between the first excitation light source 11A and the second optical SW 13B, and branches and outputs the first excitation light from the first excitation light source 11A to the second optical SW 13B and the fourth optical SW 13D. The 13th optical coupler 22C is disposed between the second excitation light source 11B and the third optical SW 13C, and branches and outputs the second excitation light from the second excitation light source 11B to the third optical SW 13C and the fourth optical SW 13D.

The 14th optical coupler 22D is disposed between the second optical SW 13B and the third optical SW 13C, and the excitation light amplifier 14, and multiplexes and outputs the excitation light from the second optical SW 13B and the excitation light from the third optical SW 13C to the excitation light amplifier 14. The 15th optical coupler 22E is disposed between the 12th optical coupler 22B, and the fourth optical SW 13D and the detection unit 18A, and branches and outputs the first excitation light from the 12th optical coupler 22B to the detection unit 18A and the fourth optical SW 13D. The 16th optical coupler 22F is disposed between the 13th optical coupler 22C, and the fourth optical SW 13D and the detection unit 18A, and branches and outputs the second excitation light from the 13th optical coupler 22C to the detection unit 18A and the fourth optical SW 13D.

The detection unit 18A determines whether the light intensity of the first excitation light via the 15th optical coupler 22E or the light intensity of the second excitation light via the 16th optical coupler 22F is less than the threshold value. The detection unit 18A determines that the excitation light is abnormal when the light intensity of the excitation light is less than the threshold value. When it is determined that the excitation light is abnormal, the control unit 20A switches and controls the first optical SW 13A, the second optical SW 13B, and the third optical SW 13C.

When it is determined that the first excitation light is abnormal, the control unit 20A switches a route of the first excitation light source 11A→the second optical SW 13B→the excitation light amplifier 14 to a route of the redundant excitation light source 12→the first optical SW 13A→the second optical SW 13B→the excitation light amplifier 14. As a result, the preliminary excitation light from the redundant excitation light source 12 is emitted instead of the first excitation light from the first excitation light source 11A. When it is determined that the second excitation light is abnormal, the control unit 20A switches a route of the second excitation light source 11B→the third optical SW 13C→the excitation light amplifier 14 to a route of the redundant excitation light source 12→the first optical SW 13A→the third optical SW 13C→the excitation light amplifier 14. As a result, the preliminary excitation light from the redundant excitation light source 12 is emitted instead of the second excitation light from the second excitation light source 11B.

The measurement unit 17A measures a first frequency difference between the frequency of the first excitation light and the frequency of the preliminary excitation light from the redundant excitation light source 12, and measures a second frequency difference between the frequency of the second excitation light and the frequency of the preliminary excitation light from the redundant excitation light source 12. Further, the measurement unit 17A outputs a first adjustment amount corresponding to the first frequency difference and a second adjustment amount corresponding to the second frequency difference to the adjustment unit 19A.

When it is determined that the first excitation light is abnormal, the adjustment unit 19A adjusts the frequency of the preliminary excitation light of the redundant excitation light source 12 based on the first adjustment amount, and emits the adjusted excitation light from the redundant excitation light source 12. When it is determined that the second excitation light is abnormal, the adjustment unit 19 adjusts the frequency of the preliminary excitation light of the redundant excitation light source 12 based on the second adjustment amount, and emits the adjusted excitation light from the redundant excitation light source 12.

Figure 6A:
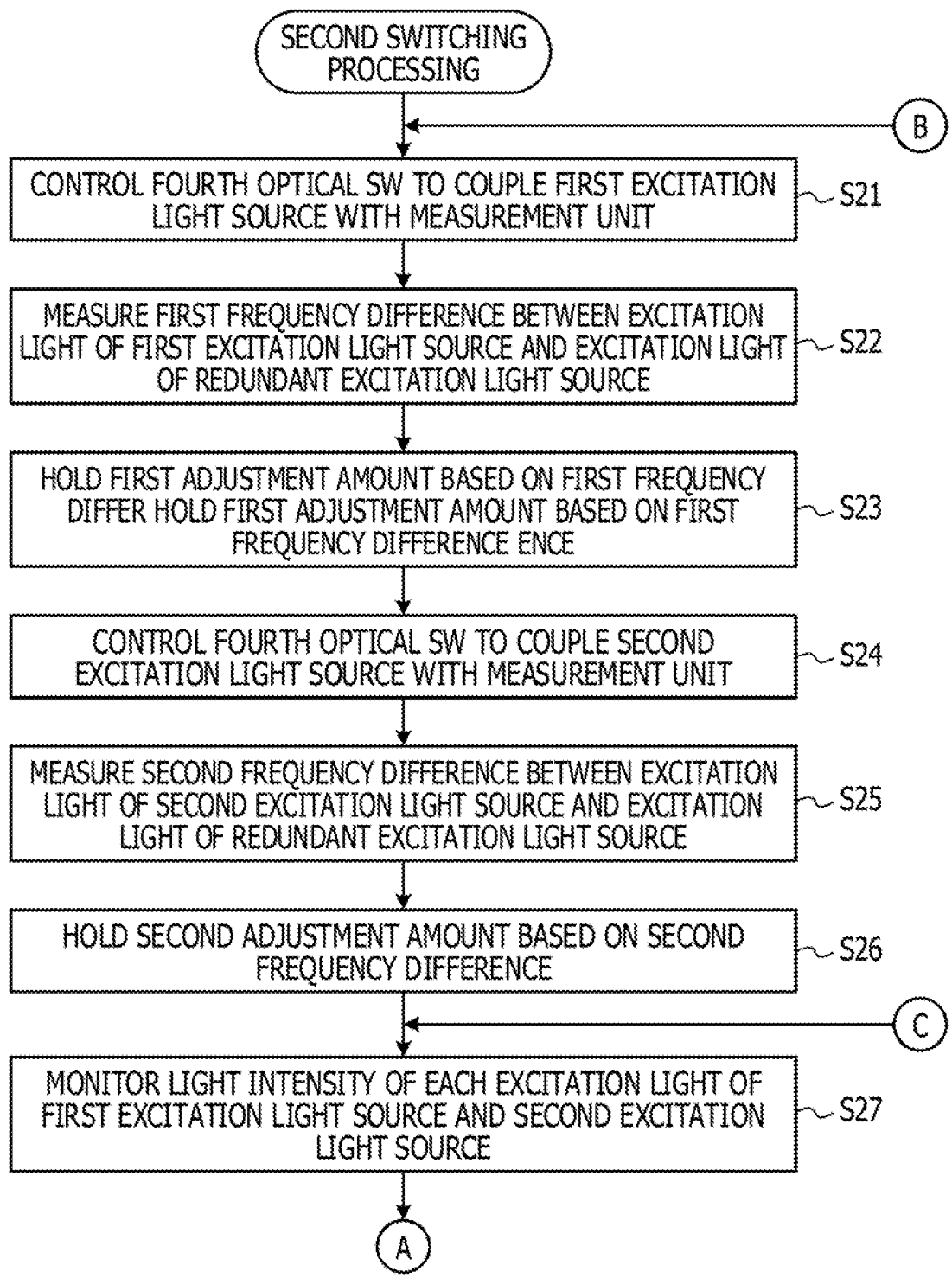
FIGS. 6A and 6B are flowcharts illustrating an example of a processing operation of a wavelength conversion device related to second switching processing.
Figure 6B:
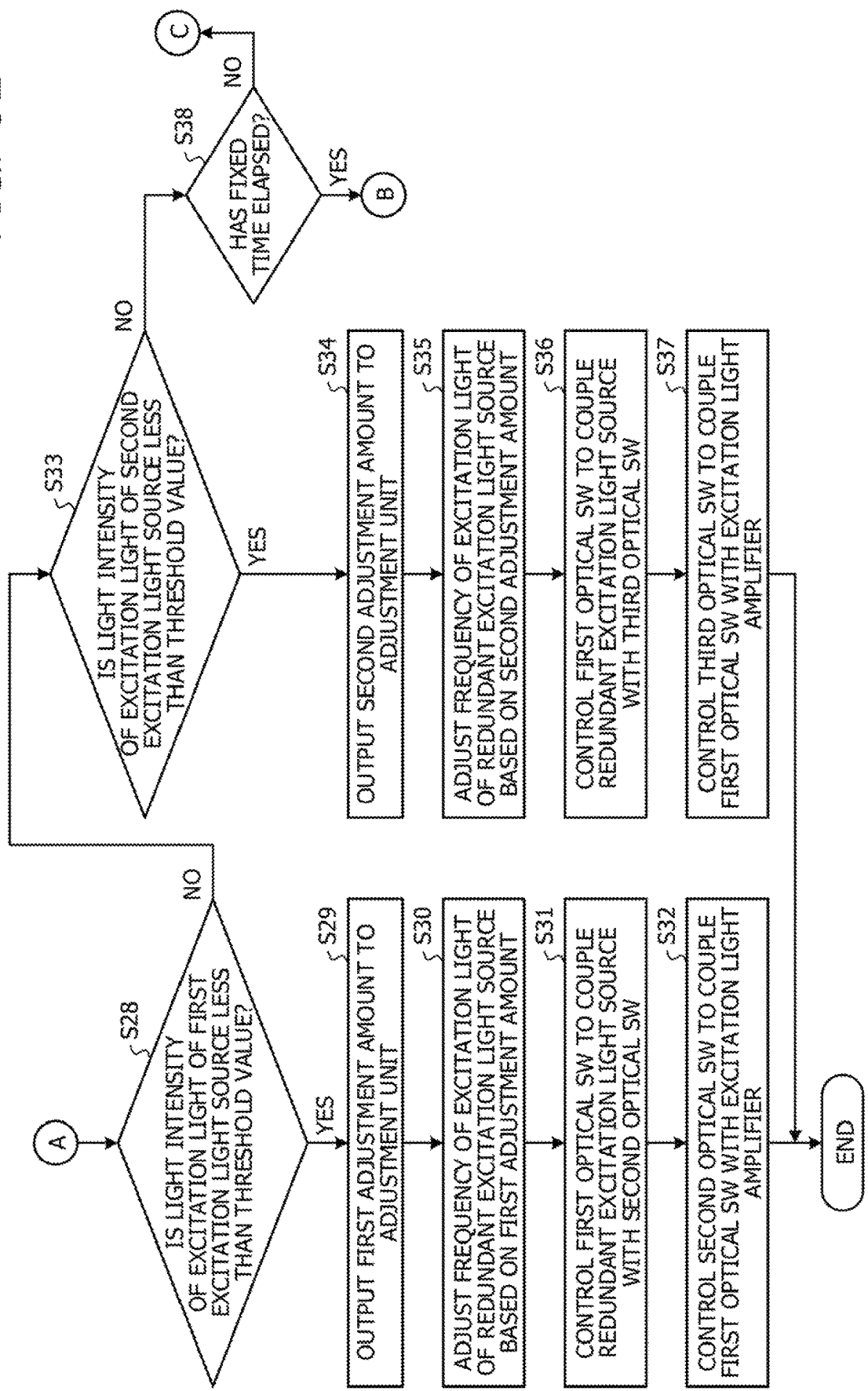

The operation of the WDM system 1 according to Example 2 will be explained below. FIGS. 6A and 6B are flowcharts illustrating an example of a processing operation of a wavelength conversion device 3C related to second switching processing. In FIG. 6A, the control unit 20A in the wavelength conversion device 3C controls the fourth optical SW 13D to couple the first excitation light source 11A with the measurement unit 17A (Step S21). The measurement unit 17A measures the first frequency difference between the frequency of first excitation light from the first excitation light source 11A and the frequency of the preliminary excitation light from the redundant excitation light source 12 (Step S22). The measurement unit 17B holds the first adjustment amount before abnormality detection corresponding to the first frequency difference (Step S23).

Next, the control unit 20A controls the fourth optical SW 13D to couple the second excitation light source 11B with the measurement unit 17A (Step S24). The measurement unit 17A measures the second frequency difference between the frequency of second excitation light from the second excitation light source 11B and the frequency of the preliminary excitation light from the redundant excitation light source 12 (Step S25). The measurement unit 17A holds the second adjustment amount before abnormality detection corresponding to the second frequency difference (Step S26).

The detection unit 18A in the wavelength conversion device 3C monitors the light intensity of the excitation light of the first excitation light source 11A and the light intensity of the excitation light of the second excitation light source 11B (Step S27). The detection unit 18A determines whether the light intensity of the first excitation light is less than the threshold value (Step S28).

When the light intensity of the first excitation light is less than the threshold value (Step S28: Yes), the measurement unit 17A determines that the first excitation light is abnormal, and outputs the first adjustment amount to the adjustment unit 19A (Step S29). The adjustment unit 19A adjusts the frequency of the preliminary excitation light of the redundant excitation light source 12 based on the first adjustment amount (Step S30). As a result, the frequency of the preliminary excitation light of the redundant excitation light source 12 becomes the same as the frequency of the first excitation light before abnormality detection of the first excitation light source 11A. The control unit 20A controls the first optical SW 13A and the second optical SW 13B so as to switch to a route of the redundant excitation light source 12→the first optical SW 13A→the second optical SW 13B→the excitation light amplifier 14 (Steps S31 and S32). As a result, the preliminary excitation light from the redundant excitation light source 12 is emitted to the excitation light amplifier 14 instead of the first excitation light.

When the light intensity of the first excitation light is not less than the threshold value (Step S28: No), the detection unit 18A determines that the first excitation light is normal and determines whether the light intensity of the second excitation light is less than the threshold value (Step S33). When the light intensity of the second excitation light is less than the threshold value (Step S33: Yes), the measurement unit 17A determines that the second excitation light is abnormal, and outputs the second adjustment amount to the redundant excitation light source 12 (Step S34). The adjustment unit 19A adjusts the frequency of the excitation light of the redundant excitation light source 12 based on the second adjustment amount (Step S35). As a result, the frequency of the preliminary excitation light of the redundant excitation light source 12 becomes the same as the frequency of the second excitation light before abnormality detection of the second excitation light source 11B. The control unit 20A controls the first optical SW 13A and the third optical SW 13C so as to switch to a route of the redundant excitation light source 12→the first optical SW 13A→the third optical SW 13C→the excitation light amplifier 14 (Steps S36 and S37). As a result, the preliminary excitation light from the redundant excitation light source 12 is emitted to the excitation light amplifier 14 instead of the second excitation light.

When the light intensity of the second excitation light is not less than the threshold value (Step S33: No), the detection unit 18A determines that the second excitation light is normal and determines whether a fixed time has elapsed (Step S38). In a case where a fixed time has elapsed (Step S38: Yes), the detection unit 18A proceeds to step S21 to control the fourth optical SW 13D. When a fixed time has not elapsed (Step S38: No), the detection unit 18A proceeds to step S27 to monitor the light intensity of the first excitation light and the light intensity of the second excitation light.

In the wavelength conversion device 3C of Example 2, the frequency difference between the excitation light in operation from the first excitation light source 11A and the second excitation light source 11B, and preliminary excitation light from the redundant excitation light source 12 is measured. When an abnormality of the first excitation light in operation is detected, the wavelength conversion device 3C adjusts the frequency of the preliminary excitation light from the redundant excitation light source 12 to the frequency of the first excitation light in operation before abnormality detection, based on the first adjustment amount corresponding to the first frequency difference before abnormality detection. After adjusting the frequency of the preliminary excitation light, the wavelength conversion device 3C aligns the frequency of the preliminary excitation light with the frequency of the first excitation light in operation before abnormality detection, and switches from the first excitation light source 11A to the redundant excitation light source 12. As a result, in the WDM device 2, communication may be continued without interruption even when the excitation light in operation is abnormal by suppressing the frequency deviation of the excitation light, that is, by aligning the frequencies between the excitation light beams, thereby avoiding reception error.

When an abnormality of the second excitation light in operation is detected, the wavelength conversion device 3C adjusts the frequency of the preliminary excitation light from the redundant excitation light source 12 to the frequency of the second excitation light in operation before abnormality detection, based on the second adjustment amount corresponding to the second frequency difference before abnormality detection. After adjusting the frequency of the preliminary excitation light, the wavelength conversion device 3C aligns the frequency of the preliminary excitation light with the frequency of the second excitation light in operation before abnormality detection, and switches from the second excitation light source 118 to the redundant excitation light source 12. As a result, in the WDM device 2, by aligning the frequencies between the excitation light beams, communication may be continued without interruption even when the excitation light in operation is abnormal, thereby avoiding reception error.

In the wavelength conversion device 3C of Example 2, a case where the first excitation light and the second excitation light are multiplexed and the first excitation light and the second excitation light after multiplexing are collectively amplified by the excitation light amplifier 14 has been described, but a parallel amplification may be used, and the description will be made regarding an embodiment thereof below as Example 3.

Example 3

Figure 7:
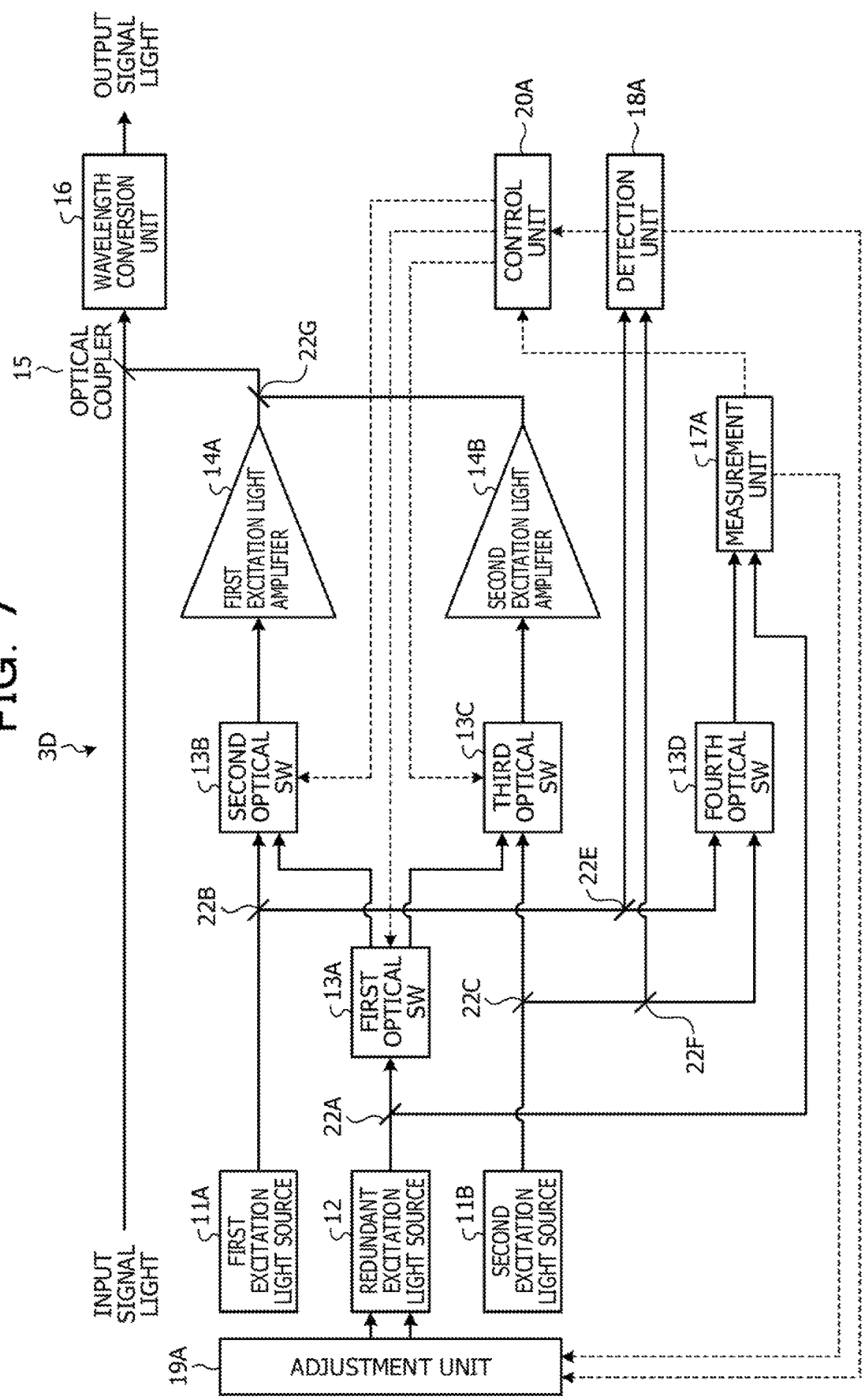
FIG. 7 is an explanatory diagram illustrating an example of a wavelength conversion device of Example 3.

FIG. 7 is an explanatory diagram illustrating an example of a wavelength conversion device 3D of Example 3. The same components as those in the wavelength conversion device 3C of Example 2 are denoted by the same reference numerals, and the description of the overlapping configuration and operation is omitted. The difference between the wavelength conversion device 3C of Example 2 and the wavelength conversion device 3D of Example 3 is that, the wavelength conversion device 3D of Example 3 is provided with the first excitation light amplifier 14A, the second excitation light amplifier 148, and the 17th optical coupler 22G.

The first excitation light amplifier 14A optically amplifies the first excitation light from the first excitation light source 11A from the second optical SW 13B or the preliminary excitation light from the redundant excitation light source 12, and outputs the excitation light after the optical amplification to the 17th optical coupler 22G. The second excitation light amplifier 14B optically amplifies the second excitation light from the second excitation light source 11B from the third optical SW 13C or the preliminary excitation light from the redundant excitation light source 12, and outputs the excitation light after the optical amplification to the 17th optical coupler 22G. The 17th optical coupler 22G multiplexes the excitation light from the first excitation light amplifier 14A and the excitation light from the second excitation light amplifier 14B, and outputs the multiplexed excitation light and the excitation light to the optical coupler 15.

In the wavelength conversion device 3D of Example 3, the frequency difference between the excitation light in operation from the first excitation light source 11A and the second excitation light source 11B, and preliminary excitation light from the redundant excitation light source 12 is measured. When an abnormality of the first excitation light in operation is detected, the wavelength conversion device 3D adjusts the frequency of the preliminary excitation light from the redundant excitation light source 12 to the frequency of the first excitation light in operation before abnormality detection, based on the first adjustment amount corresponding to the first frequency difference before abnormality detection. After adjusting the frequency of the preliminary excitation light, the wavelength conversion device 3D aligns the frequency of the preliminary excitation light with the frequency of the first excitation light in operation before abnormality detection, and switches from the first excitation light source 11A to the redundant excitation light source 12. As a result, in the WDM device 2, communication may be continued without interruption even when the excitation light in operation is abnormal by suppressing the frequency deviation of the excitation light, that is, by aligning the frequencies between the excitation light beams, thereby avoiding reception error.

When an abnormality of the second excitation light in operation is detected, the wavelength conversion device 3D adjusts the frequency of the preliminary excitation light from the redundant excitation light source 12 to the frequency of the second excitation light in operation before abnormality detection, based on the second adjustment amount corresponding to the second frequency difference before abnormality detection. After adjusting the frequency of the preliminary excitation light, the wavelength conversion device 3D aligns the frequency of the preliminary excitation light with the frequency of the second excitation light in operation before abnormality detection, and switches from the second excitation light source 11B to the redundant excitation light source 12. As a result, in the WDM device 2, by aligning the frequencies between the excitation light beams, communication may be continued without interruption even when the excitation light in operation is abnormal, thereby avoiding reception error.

In the wavelength conversion device 3C of Example 2, a case where the redundant excitation light source 12 dedicated to redundancy is disposed is described, but it is not limited to the redundant excitation light source 12. Two excitation light sources 11 out of the first to third excitation light sources 11A to 11C may be used for operation, and the remaining one excitation light source 11 may be used for redundancy, and description will be made regarding an embodiment in this case as Example 4 below.

Example 4

Figure 8:
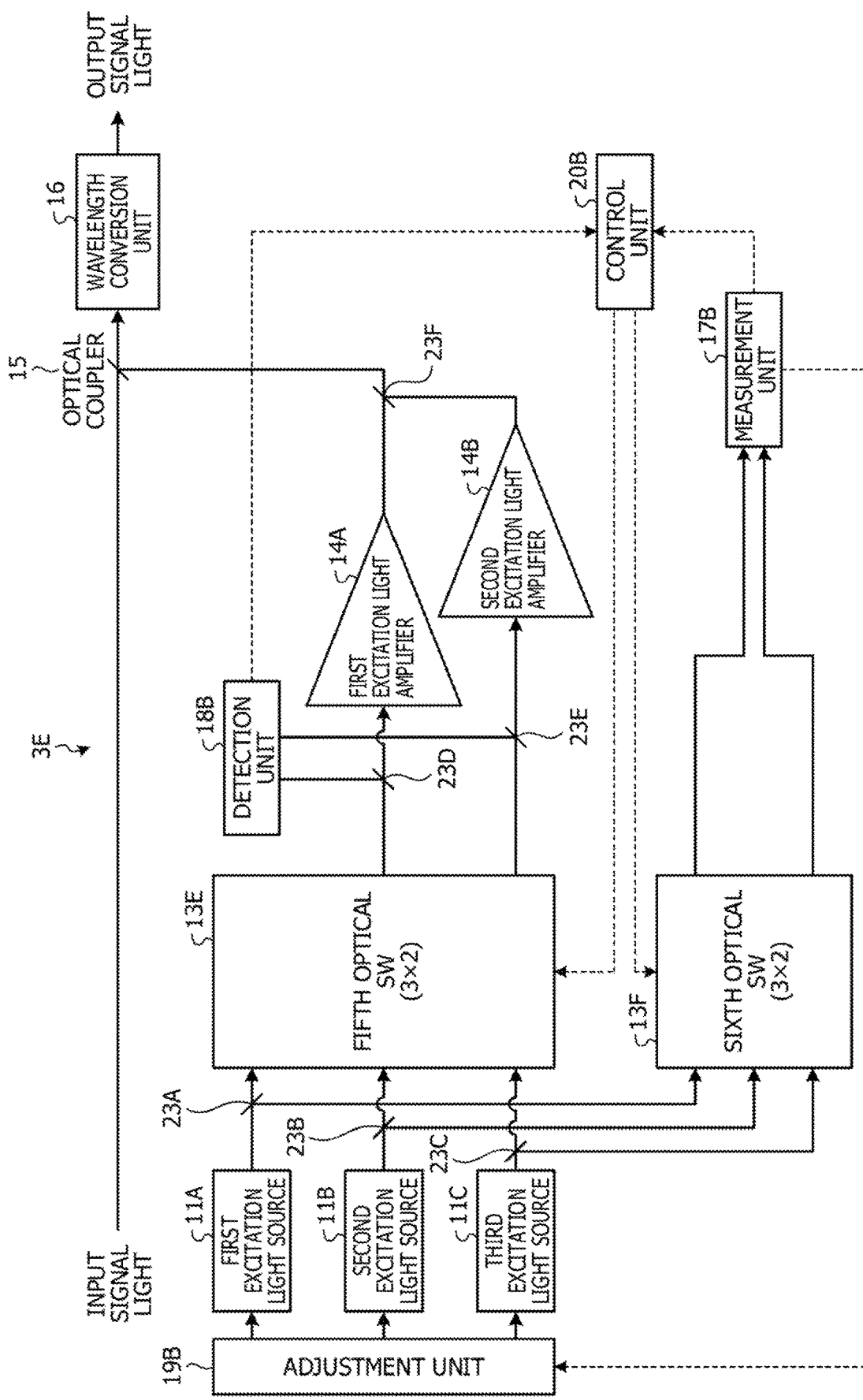
FIG. 8 is an explanatory diagram illustrating an example of a wavelength conversion device of Example 4.

FIG. 8 is an explanatory diagram illustrating an example of a wavelength conversion device 3E of Example 4. The same components as those in the wavelength conversion device 3C of Example 2 are denoted by the same reference numerals, and the description of the overlapping configuration and operation is omitted. The wavelength conversion device 3E illustrated in FIG. 8 includes a first excitation light source 11A, a second excitation light source 11B, a third excitation light source 11C, a fifth optical SW 13E, a sixth optical SW 13F, a first excitation light amplifier 14A, and a second excitation light amplifier 14B. The wavelength conversion device 3E includes a measurement unit 17B, a detection unit 18B, an adjustment unit 19B, and a control unit 20B.

The first excitation light source 11A emits first excitation light. The second excitation light source 118 emits second excitation light. The third excitation light source 11C emits the third excitation light. The fifth optical SW 13E is disposed between the first excitation light source 11A, the second excitation light source 11B, and the third excitation light source 11C, and the first excitation light amplifier 14A and the second excitation light amplifier 148, and is a 3 input×2 output optical switch. The sixth optical SW 13F is disposed between the first excitation light source 11A, the second excitation light source 11B, and the third excitation light source 11C, and the measurement unit 178, and is a 3 input×2 output optical switch.

The wavelength conversion device 3E includes a 21st optical coupler 23A, a 22nd optical coupler 238, a 23rd optical coupler 23C, a 24th optical coupler 23D, a 25th optical coupler 23E, and a 26th optical coupler 23F. The 21st optical coupler 23A is disposed between the first excitation light source 11A, and the fifth optical SW 13E and the sixth optical SW 13F, and branches and outputs the first excitation light from the first excitation light source 11A to the fifth optical SW 13E and the sixth optical SW 13F. The 22nd optical coupler 23B is disposed between the second excitation light source 118, and the fifth optical SW 13E and the sixth optical SW 13F, and branches and outputs the second excitation light from the second excitation light source 11B to the fifth optical SW 13E and the sixth optical SW 13F. The 23rd optical coupler 23C is disposed between the third excitation light source 11C, and the fifth optical SW 13E and the sixth optical SW 13F, and branches and outputs the third excitation light from the third excitation light source 11C to the fifth optical SW 13E and the sixth optical SW 13F.

The 24th optical coupler 23D is disposed between the fifth optical SW 13E, and the first excitation light amplifier 14A and the detection unit 18B, and branches and outputs the excitation light from the fifth optical SW 13E to the detection unit 188 and the first excitation light amplifier 14A. The 25th optical coupler 23E is disposed between the fifth optical SW 13E, and the second excitation light amplifier 14B and the detection unit 18B, and branches and outputs the excitation light from the fifth optical SW 13E to the detection unit 18B and the second excitation light amplifier 148. The 26th optical coupler 23F is disposed between the first excitation light amplifier 14A and the second excitation light amplifier 14B, and the optical coupler 15, and multiplexes and outputs the excitation light from the first excitation light amplifier 14A and the excitation light from the second excitation light amplifier 14B.

The detection unit 18B determines whether the light intensity of the excitation light via the 24th optical coupler 23D or the light intensity of the excitation light via the 25th optical coupler 23E is less than the threshold value. The detection unit 188 determines that the excitation light is abnormal when the light intensity of the excitation light is less than the threshold value. When it is determined that the excitation light is abnormal, the control unit 20B controls the fifth optical SW 13E and the sixth optical SW13F.

For the convenience, description will be made assuming that the first excitation light source 11A and the second excitation light source 11B are in operation, and the third excitation light source 11C is preliminary.

When it is determined that the first excitation light is abnormal, the control unit 20B switches the route of the first excitation light source 11A→the fifth optical SW 13E→the first excitation light amplifier 14A or the second excitation light amplifier 14B as follows. For example, the route is switched to a route of the third excitation light source 11C→the fifth optical SW 13E→the first excitation light amplifier 14A or the second excitation light amplifier 14B. As a result, the third excitation light from the third excitation light source 11C is emitted instead of the first excitation light from the first excitation light source 11A. When it is determined that the second excitation light is abnormal, the control unit 20B switches the route of the second excitation light source 11B→the fifth optical SW 13E→the first excitation light amplifier 14A or the second excitation light amplifier 148 as follows. For example, the route is switched to a route of the third excitation light source 11C→the fifth optical SW 13E→the first excitation light amplifier 14A or the second excitation light amplifier 14B. As a result, the third excitation light from the third excitation light source 11C is emitted instead of the second excitation light from the second excitation light source 11B.

The measurement unit 17B measures a first frequency difference between the frequency of the first excitation light and the frequency of the third excitation light (preliminary), and measures a second frequency difference between the frequency of the second excitation light and the frequency of the third excitation light (preliminary). The measurement unit 178 outputs the first adjustment amount corresponding to the first frequency difference and the second adjustment amount corresponding to the second frequency difference to the adjustment unit 19B.

When it is determined that the first excitation light is abnormal, the adjustment unit 19B adjusts the frequency of the third excitation light of the third excitation light source 11C based on the first adjustment amount, and emits the adjusted third excitation light from the third excitation light source 11C. When it is determined that the second excitation light is abnormal, the adjustment unit 198 adjusts the frequency of the third excitation light of the third excitation light source 11C based on the second adjustment amount, and emits the adjusted third excitation light from the third excitation light source 11C.

The operation of the WDM system 1 according to Example 4 will be explained below. FIGS. 9A and 9B are flowcharts illustrating an example of a processing operation of a wavelength conversion device 3E related to third switching processing. In FIG. 9A, the control unit 208 in the wavelength conversion device 3E controls the sixth optical SW 13F to couple the first excitation light source 11A and the third excitation light source 11C with the measurement unit 17B (Step S41). The measurement unit 178 measures the first frequency difference between the frequency of the first excitation light from the first excitation light source 11A and the frequency of the third excitation light from the third excitation light source 11C (Step S42). The measurement unit 17B holds the first adjustment amount before abnormality detection corresponding to the first frequency difference (Step S43).

Next, the control unit 20B controls the sixth optical SW 13F to couple the second excitation light source 11B and the third excitation light source 11C with the measurement unit 17B (Step S44). The measurement unit 17B measures the second frequency difference between the frequency of the second excitation light from the second excitation light source 118 and the frequency of the third excitation light from the third excitation light source 11C (Step S45). The measurement unit 17B holds the second adjustment amount before the abnormality detection corresponding to the second frequency difference (Step S46).

The detection unit 18B in the wavelength conversion device 3E monitors the light intensity of the excitation light of the first excitation light source 11A and the light intensity of the excitation light of the second excitation light source 11B (Step S47). The detection unit 18B determines whether the light intensity of the first excitation light is less than the threshold value (Step S48).

When the light intensity of the first excitation light is less than the threshold value (Step S48: Yes), the measurement unit 17B determines that the first excitation light is abnormal, and outputs the first adjustment amount to the adjustment unit 19B (Step S49). The adjustment unit 19B adjusts the frequency of the third excitation light of the third excitation light source 11C, based on the first adjustment amount (Step S50). As a result, the frequency of the third excitation light of the third excitation light source 11C becomes the same as the frequency of the first excitation light before abnormality detection of the first excitation light source 11A. The control unit 20B controls the fifth optical SW 13E so as to switch to a route of the third excitation light source 11C→the fifth optical SW 13E→the first excitation light amplifier 14A or the second excitation light amplifier 14B (Step S51). As a result, the third excitation light from the third excitation light source 11C is output instead of the first excitation light to the first excitation light amplifier 14A or the second excitation light amplifier 14B.

When the light intensity of the first excitation light is not less than the threshold value (Step S48: No), the detection unit 18B determines that the first excitation light is normal and determines whether the light intensity of the second excitation light is less than the threshold value (Step S52). When the light intensity of the second excitation light is less than the threshold value (Step S52: Yes), the measurement unit 17B determines that the second excitation light is abnormal, and outputs the second adjustment amount to the adjustment unit 19B (Step S53). The adjustment unit 19B adjusts the frequency of the third excitation light of the third excitation light source 11C, based on the second adjustment amount (Step S54). As a result, the frequency of the third excitation light of the third excitation light source 11C becomes the same as the frequency of the second excitation light before abnormality detection of the second excitation light source 11B. The control unit 20B controls the fifth optical SW 13E so as to switch to a route of the third excitation light source 11C→the fifth optical SW 13E→the second excitation light amplifier 14B or the first excitation light amplifier 14A (Step S55). As a result, the second excitation light is output instead of the second excitation light to the second excitation light amplifier 14B or the first excitation light amplifier 14A.

When the light intensity of the second excitation light is not less than the threshold value (Step S52: No), the detection unit 188 determines that the second excitation light is normal and determines whether a fixed time has elapsed (Step S56). In a case where a fixed time has elapsed (Step S56: Yes), the detection unit 188 proceeds to step S41 to control the sixth optical SW 13F. When a fixed time has not elapsed (Step S56: No), the detection unit 18B proceeds to step S47 to monitor the light intensity of the first excitation light and the light intensity of the second excitation light.

In the wavelength conversion device 3E of Example 4, in a case where the excitation light in operation is the first and second excitation light, the preliminary excitation light is the third excitation light, and an abnormality of the first excitation light is detected, the third excitation light is adjusted according to the first adjustment amount and the first excitation light in which an abnormality is detected is switched to the adjusted third excitation light. As a result, in the WDM device 2, communication may be continued without interruption even when the excitation light in operation is abnormal by suppressing the frequency deviation of the excitation light, that is, by aligning the frequencies between the excitation light beams, thereby avoiding reception error.

In the wavelength conversion device 3E, in a case where the excitation light in operation is the first and second excitation light, the preliminary excitation light is the third excitation light, and an abnormality of the second excitation light is detected, the third excitation light is adjusted according to the second adjustment amount and the second excitation light in which an abnormality is detected is switched to the adjusted third excitation light. As a result, in the WDM device 2, by aligning the frequencies between the excitation light beams, communication may be continued without interruption even when the excitation light in operation is abnormal, thereby avoiding reception error.

In the wavelength conversion device 3E, in a case where the excitation light in operation is the first and third excitation light, the preliminary excitation light is the second excitation light, and an abnormality of the first excitation light is detected, the second excitation light is adjusted according to the first adjustment amount and the first excitation light in which an abnormality is detected is switched to the adjusted second excitation light. As a result, in the WDM device 2, by aligning the frequencies between the excitation light beams, communication may be continued without interruption even when the excitation light in operation is abnormal, thereby avoiding reception error.

In the wavelength conversion device 3E, in a case where the excitation light in operation is the first and third excitation light, the preliminary excitation light is the second excitation light, and an abnormality of the third excitation light is detected, the second excitation light is adjusted according to the third adjustment amount and the third excitation light in which an abnormality is detected is switched to the adjusted second excitation light. As a result, in the WDM device 2, by aligning the frequencies between the excitation light beams, communication may be continued without interruption even when the excitation light in operation is abnormal, thereby avoiding reception error.

In the wavelength conversion device 3E, in a case where the excitation light in operation is the second and third excitation light, the preliminary excitation light is the first excitation light, and an abnormality of the second excitation light is detected, the first excitation light is adjusted according to the second adjustment amount and the second excitation light in which an abnormality is detected is switched to the adjusted first excitation light. As a result, in the WDM device 2, by aligning the frequencies between the excitation light beams, communication may be continued without interruption even when the excitation light in operation is abnormal, thereby avoiding reception error.

In the wavelength conversion device 3E, in a case where the excitation light in operation is the second and third excitation light, the preliminary excitation light is the first excitation light, and an abnormality of the third excitation light is detected, the first excitation light is adjusted according to the third adjustment amount and the third excitation light in which an abnormality is detected is switched to the adjusted first excitation light. As a result, in the WDM device 2, by aligning the frequencies between the excitation light beams, communication may be continued without interruption even when the excitation light in operation is abnormal, thereby avoiding reception error.

For the convenience, description has been made assuming that the first excitation light source 11A and the second excitation light source 11B are in operation, and the third excitation light source 11C is redundant, but not limited to this. For example, out of the first excitation light source 11A to the third excitation light source 11C, two excitation light sources 11 may be used for operation and one excitation light source 11 may be preliminary, and may be changed as appropriate.

The wavelength conversion device 3E of Example 4 exemplifies the 3×2 fifth optical SW 13E and the sixth optical SW 13F, but is not limited thereto, and the embodiment thereof will be described as Example 5 below.

Example 5

Figure 10:
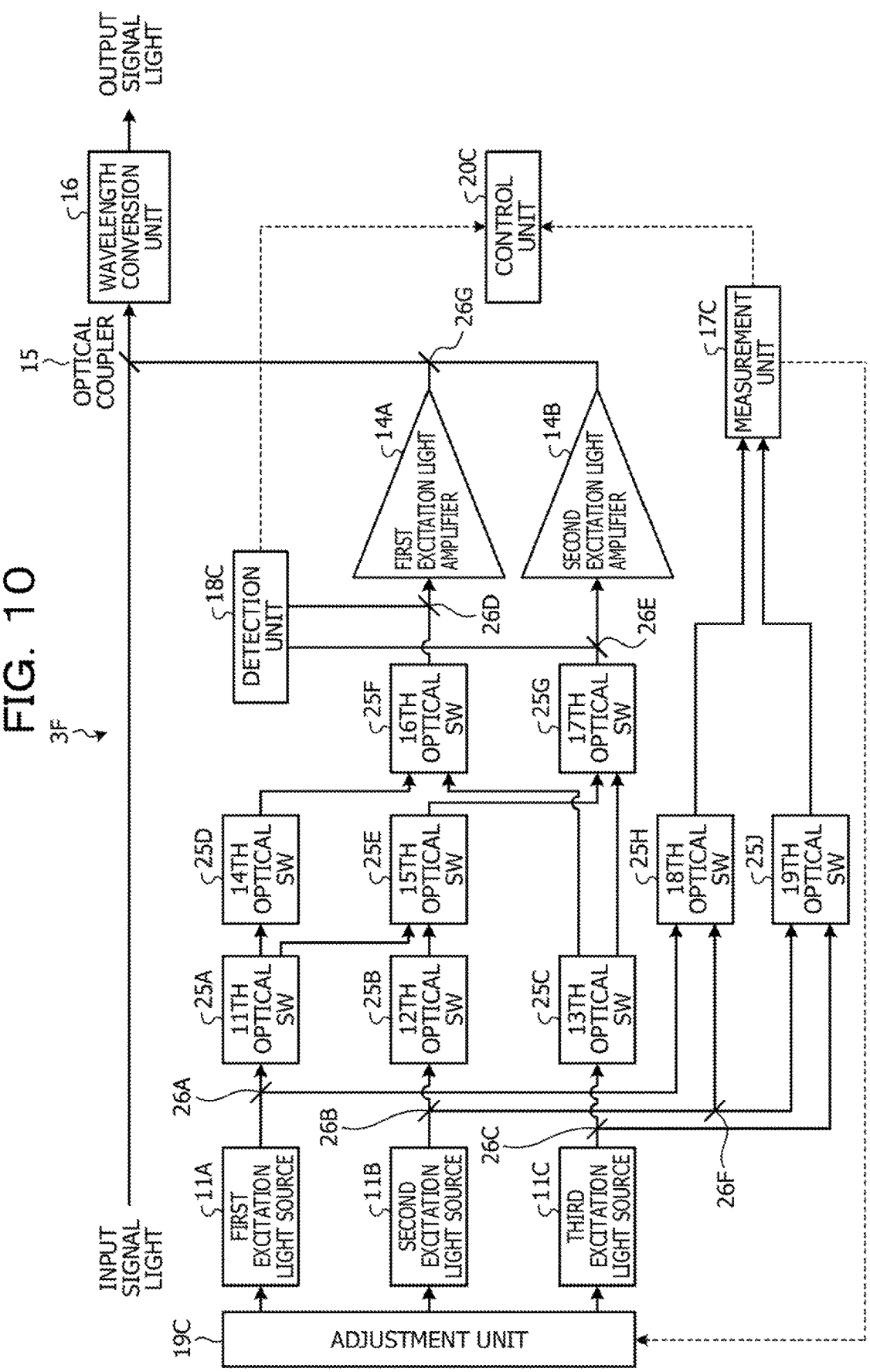
FIG. 10 is an explanatory diagram illustrating an example of a wavelength conversion device of Example 5.

FIG. 10 is an explanatory diagram illustrating an example of a wavelength conversion device 3F of Example 5. The same components as those in the WDM system of Example 4 are denoted by the same reference numerals, and the description of the overlapping configuration and operation is omitted. The difference between the wavelength conversion device 3F of Example 5 and the wavelength conversion device 3E of Example 4 is that, in the wavelength conversion device 3F of Example 5, the 11th optical SW 25A to the 17th optical SW 25G are provided instead of the fifth optical SW 13E, and the 18th optical SW 25H and the 19th optical SW 25J are provided instead of the sixth optical SW 13F.

The 11th optical SW 25A is disposed between the first excitation light source 11A, and the 14th optical SW 25D and the 15th optical SW 25E, and is a switch that outputs the first excitation light from the first excitation light source 11A to the 14th optical SW 25D and the 15th optical SW 25E. The 12th optical SW 25B is disposed between the second excitation light source 11B and 15th optical SW 25E, and is a switch that outputs the second excitation light from the second excitation light source 11B to the 15th optical SW 25E. The 13th optical SW 25C is disposed between the third excitation light source 11C, and the 16th optical SW 25F and the 17th optical SW 25G, and is a switch that outputs the third excitation light from the third excitation light source 11C to the 16th optical SW 25F and the 17th optical SW 25G.

The 14th optical SW 25D is disposed between the 11th optical SW 25A and the 16th optical SW 25F, and is a switch that outputs the first excitation light from the 11th optical SW 25A to the 16th optical SW 25F. The 15th optical SW 25E is disposed between the 11th optical SW 25A and the 12th optical SW 25B, and the 17th optical SW 25G, and is a switch that outputs the excitation light from the 11th optical SW 25A and the excitation light from the 12th optical SW 25B to the 17th optical SW 25G.

The 16th optical SW 25F is disposed between the 13th optical SW 25C and the 14th optical SW 25D, and the first excitation light amplifier 14A, and is a switch that outputs the excitation light from the 14th optical SW 25D or the excitation light from the 13th optical SW 25C to the first excitation light amplifier 14A. The 17th optical SW 25G is disposed between the 13th optical SW 25C and the 15th optical SW 25E, and the second excitation light amplifier 14B, and is a switch that outputs the excitation light from the 13th optical SW 25C or the excitation light from the 15th optical SW 25E to the second excitation light amplifier 14B.

The 18th optical SW 25H is disposed between the first excitation light source 11A and the second excitation light source 11B, and the measurement unit 17C, and is a switch that outputs the excitation light from the first excitation light source 11A or the excitation light from the second excitation light source 11B to the measurement unit 17C. The 19th optical SW 25J is disposed between the second excitation light source 11B and the third excitation light source 11C, and the measurement unit 17C, and is a switch that outputs the excitation light from the second excitation light source 11B or the excitation light from the third excitation light source 11C to the measurement unit 17C.

The wavelength conversion device 3F includes a 21st optical coupler 26A to a 25th optical coupler 26E, and a 26th optical coupler 26F. The 21st optical coupler 26A is disposed between the first excitation light source 11A, and the 11th optical SW 25A and the 18th optical SW 25H, and branches and outputs the first excitation light from the first excitation light source 11A to the 11th optical SW 25A and the 18th optical SW 25H. The 22nd optical coupler 26B is disposed between the second excitation light source 11B, and the 12th optical SW 25B and the 26th optical coupler 26F, and branches and outputs the second excitation light from the second excitation light source 118 to the 12th optical SW 25B and the 26th optical coupler 26F. The 23rd optical coupler 26C is disposed between the third excitation light source 11C and the 19th optical SW 253, and branches and outputs the third excitation light from the third excitation light source 11C to the 19th optical SW 253.

The 24th optical coupler 26D is disposed between the 16th optical SW 25F, and the first excitation light amplifier 14A and the detection unit 18C, and branches and outputs the excitation light from the 16th optical SW 25F to the detection unit 18C and the first excitation light amplifier 14A. The 25th optical coupler 26E is disposed between the 17th optical SW 25G, and the second excitation light amplifier 148 and the detection unit 18C, and branches and outputs the excitation light from the 17th optical SW 25G to the detection unit 18C and the second excitation light amplifier 148.

The 26th optical coupler 26F is disposed between the 22nd optical coupler 26B, and the 18th optical SW 25H and the 19th optical SW 253, and branches and outputs the excitation light from the 22nd optical coupler 26B to the 18th optical SW 25H and the 19th optical SW 253.

The detection unit 18C determines whether the light intensity of the excitation light via the 24th optical coupler 26D or the light intensity of the excitation light via the 25th optical coupler 26E is less than the threshold value. The detection unit 18C determines that the excitation light is abnormal when the light intensity of the excitation light is less than the threshold value. When it is determined that the excitation light is abnormal, the control unit 20C controls the 11th optical SW 25A to the 19th optical SW 25J.

The measurement unit 17C measures a frequency difference between the frequency of the first or second excitation light via the 18th optical SW 25H and the frequency of the second or third excitation light via the 19th optical SW 253, that is a frequency difference between the frequency of the excitation light in operation and the frequency of the preliminary excitation light. The measurement unit 17C outputs an adjustment amount corresponding to the frequency difference to the adjustment unit 19C. The adjustment unit 19C adjusts the frequency of the preliminary excitation light based on the adjustment amount, and outputs the adjusted preliminary excitation light from the excitation light source 11.

Figure 11:
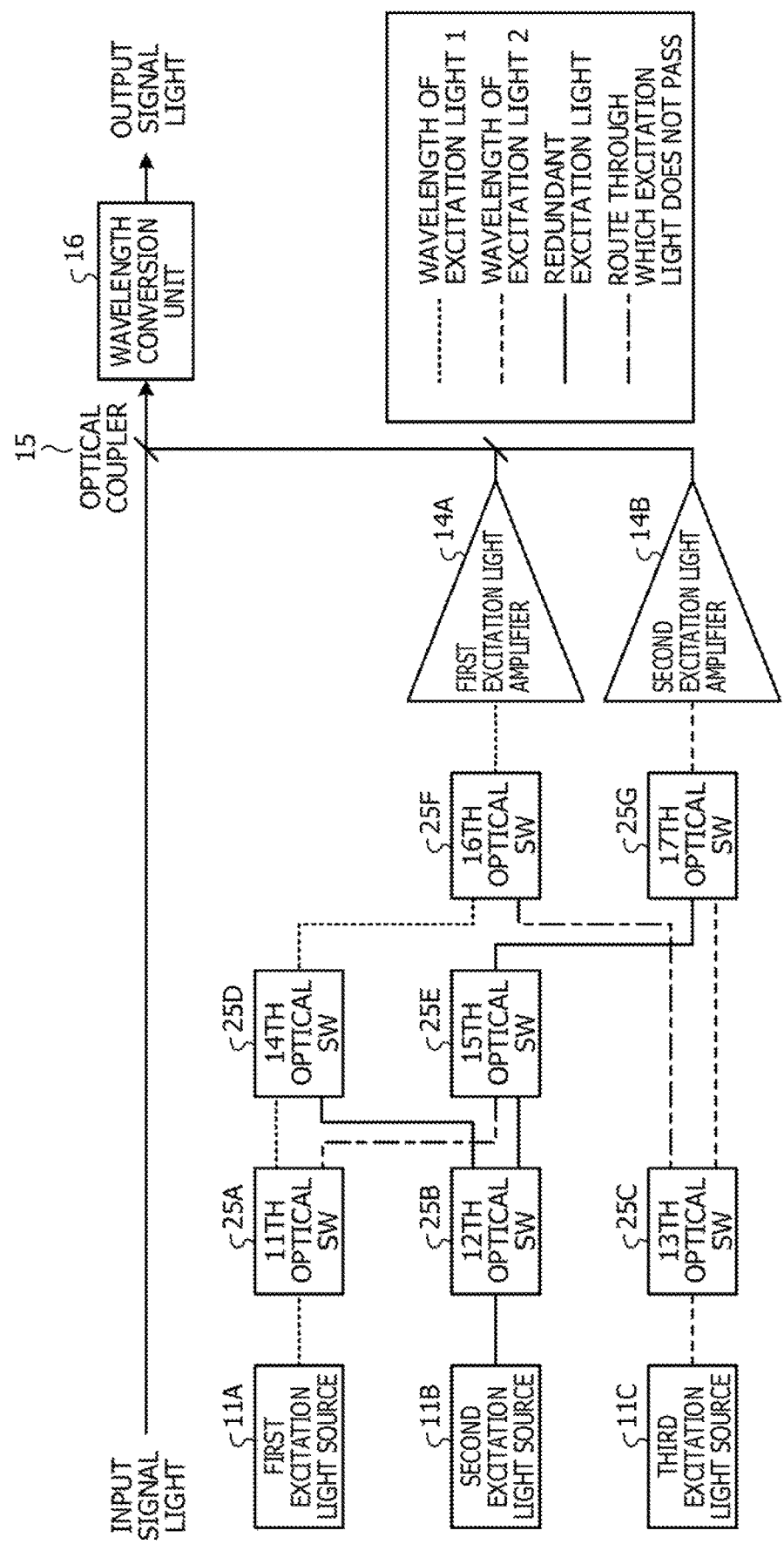
FIG. 11 is an explanatory diagram illustrating an example of an optical SW switching operation of a wavelength conversion device during operation of a first excitation light source and a third excitation light source.

The operation of the WDM system 1 according to Example 5 will be explained below. FIG. 11 is an explanatory diagram illustrating an example of the optical SW switching operation of the wavelength conversion device 3F during operation of the first excitation light source 11A and the third excitation light source 11C. The control unit 20C in the wavelength conversion device 3F illustrated in FIG. 11 switches to a route of the first excitation light source 11A→the 11th optical SW 25A→the 14th optical SW 25D→the 16th optical SW 25F→the first excitation light amplifier 14A, and outputs the first excitation light to the first excitation light amplifier 14A through the route. The control unit 20C switches to a route of the third excitation light source 11C→the 13th optical SW 25C→the 17th optical SW 25G→the second excitation light amplifier 14B, and outputs the third excitation light to the second excitation light amplifier 14B through the route.

Figure 12:
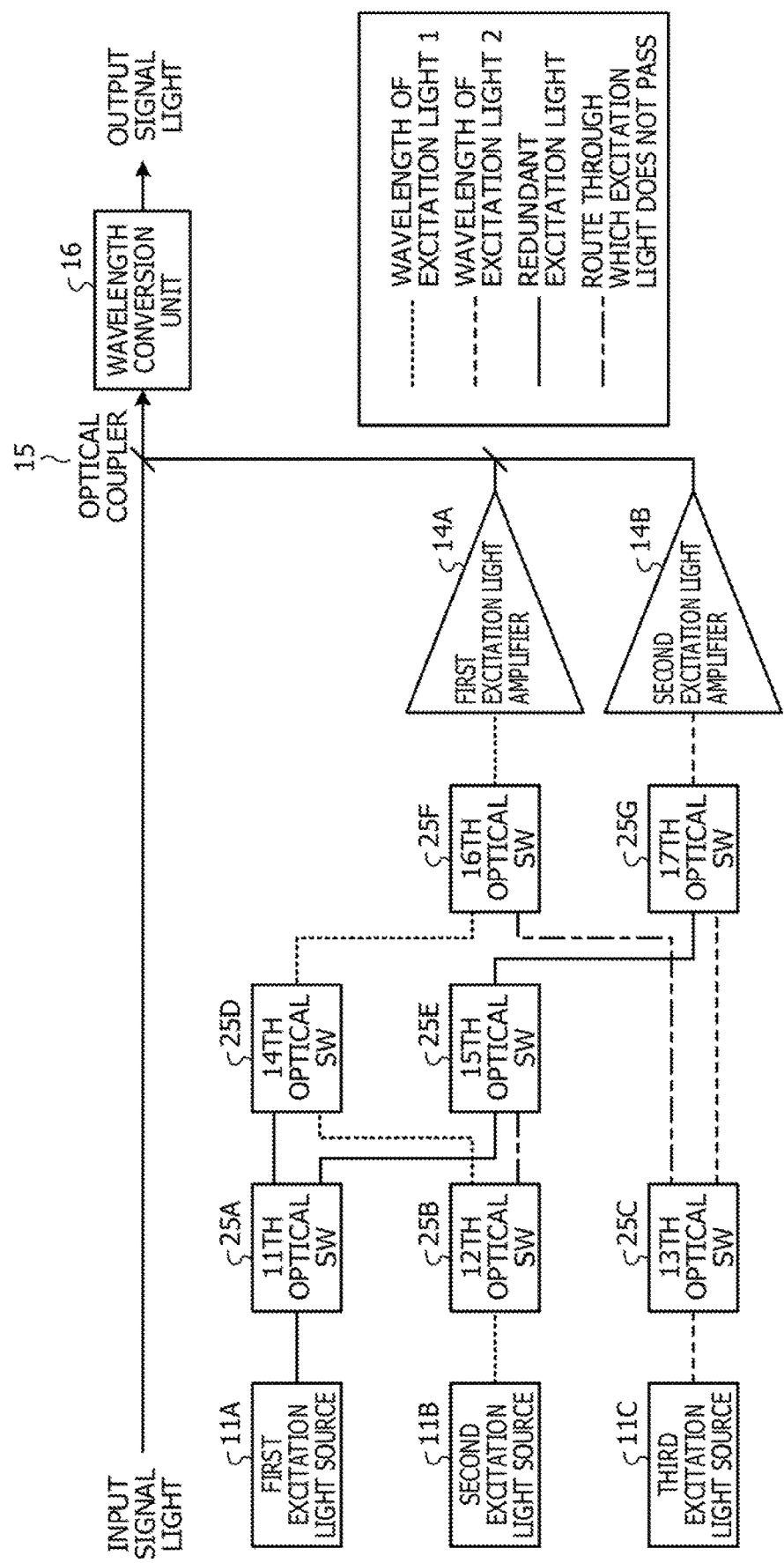
FIG. 12 is an explanatory diagram illustrating an example of an optical SW switching operation of a wavelength conversion device in a case of a failure of a first excitation light source from an operation state illustrated in FIG. 11.

FIG. 12 is an explanatory diagram illustrating an example of an optical SW switching operation of a wavelength conversion device 3F in a case of a failure of a first excitation light source 11A from an operation state illustrated in FIG. 11. The detection unit 18C of the wavelength conversion device 3F illustrated in FIG. 12 detects an abnormality of the light intensity of the first excitation light from the first excitation light source 11A. The control unit 20C switches from the first excitation light source 11A to the second excitation light source 11B. For example, the control unit 20C switches to a route of the second excitation light source 11B→the 12th optical SW 25B→the 14th optical SW 25D→the 16th optical SW 25F→the first excitation light amplifier 14A, and outputs the second excitation light to the first excitation light amplifier 14A through the route. The control unit 20C outputs, while maintaining the route of the third excitation light source 11C→the 13th optical SW 25C→the 17th optical SW 25G→the second excitation light amplifier 14B, the third excitation light to the second excitation light amplifier 14B through the route.

Figure 13:
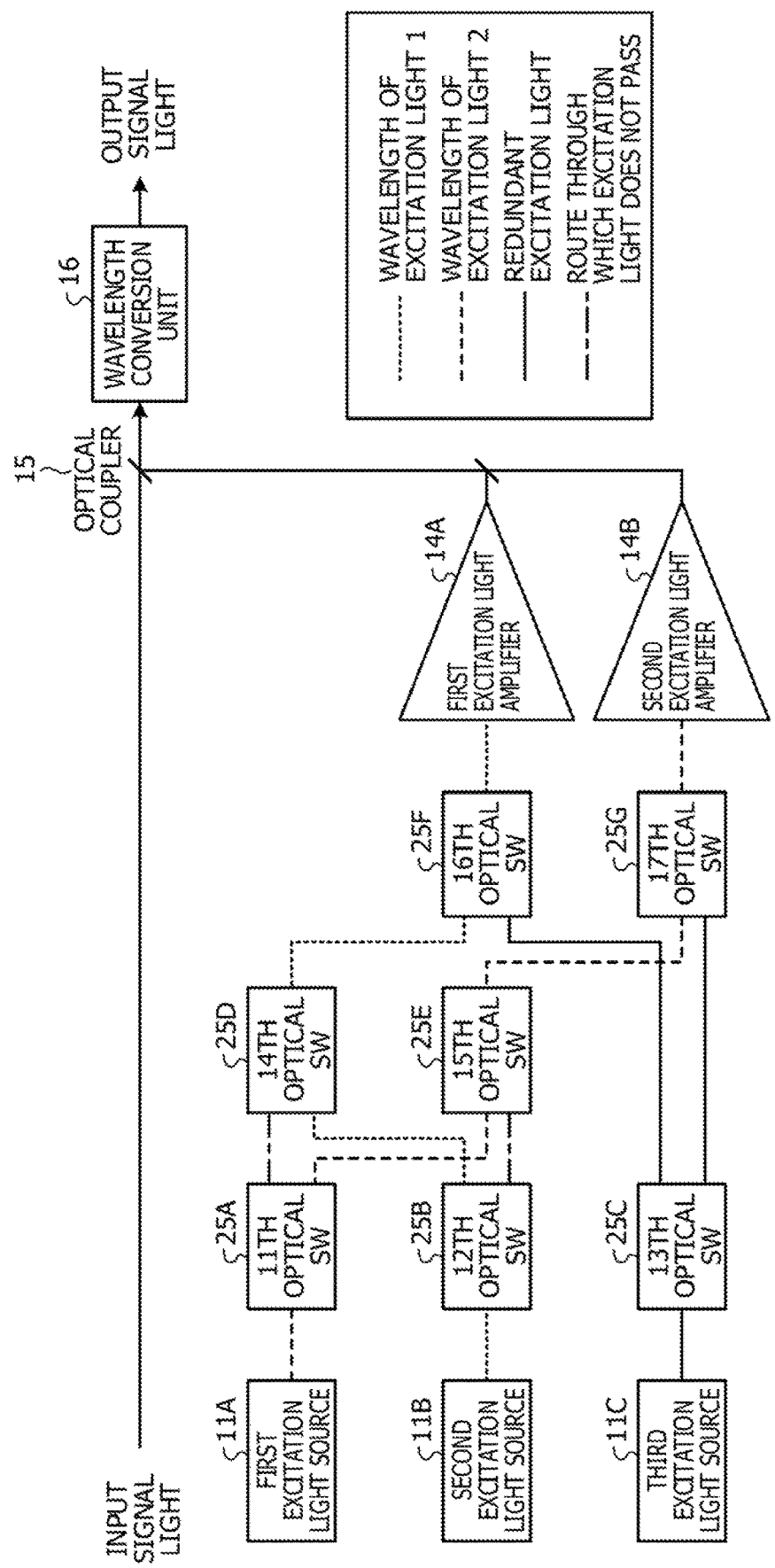
FIG. 13 is an explanatory diagram illustrating an example of an optical SW switching operation of a wavelength conversion device in a case of a failure of a third excitation light source from an operation state illustrated in FIG. 12.

FIG. 13 is an explanatory diagram illustrating an example of an optical SW switching operation of a wavelength conversion device 3F in a case of a failure of a third excitation light source 11C from an operation state illustrated in FIG. 12. The detection unit 18C of the wavelength conversion device 3F illustrated in FIG. 13 detects an abnormality of the light intensity of the third excitation light from the third excitation light source 11C. The control unit 20C switches from the third excitation light source 11C to the first excitation light source 11A. For example, the control unit 20C outputs, while maintaining the route of the first excitation light source 11A→the 11th optical SW 25A→the 15th optical SW 25E→the 17th optical SW 25G→the second excitation light amplifier 14B, the first excitation light to the second excitation light amplifier 14B through the route. The control unit 20C switches to a route of the second excitation light source 11B→the 12th optical SW 25B→the 14th optical SW 25D→the 16th optical SW 25F→the first excitation light amplifier 14A, and outputs the second excitation light to the first excitation light amplifier 14A through the route.

Figure 14:
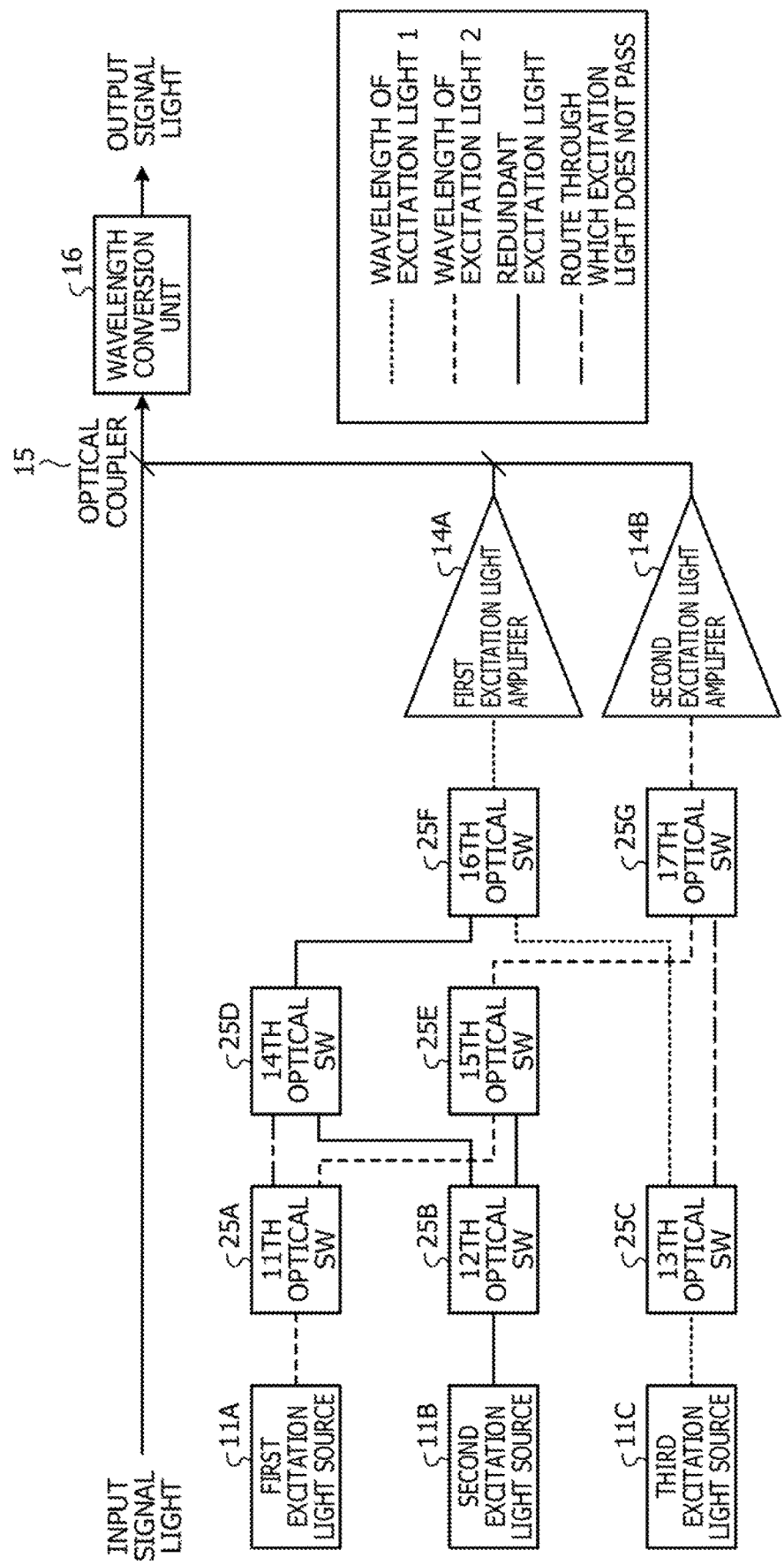
FIG. 14 is an explanatory diagram illustrating an example of an optical SW switching operation of a wavelength conversion device in a case of a failure of a second excitation light source from an operation state illustrated in FIG. 13.

FIG. 14 is an explanatory diagram illustrating an example of an optical SW switching operation of a wavelength conversion device 3F in a case of a failure of a second excitation light source 11B from an operation state illustrated in FIG. 13. The detection unit 18C of the wavelength conversion device 3F illustrated in FIG. 14 detects an abnormality of the light intensity of the second excitation light from the second excitation light source 11B. The control unit 20C switches from the second excitation light source 118B to the third excitation light source 11C. For example, the control unit 20C switches to a route of the third excitation light source 11C→the 13th optical SW 25C→the 16th optical SW 25F→the first excitation light amplifier 14A, and outputs the third excitation light to the first excitation light amplifier 14A through the route. The control unit 20C outputs, while maintaining the route of the first excitation light source 11A→the 11th optical SW 25A→the 15th optical SW 25E→the 17th optical SW 25G→the second excitation light amplifier 14B, the first excitation light to the second excitation light amplifier 14B through the route.

Figure 15A:
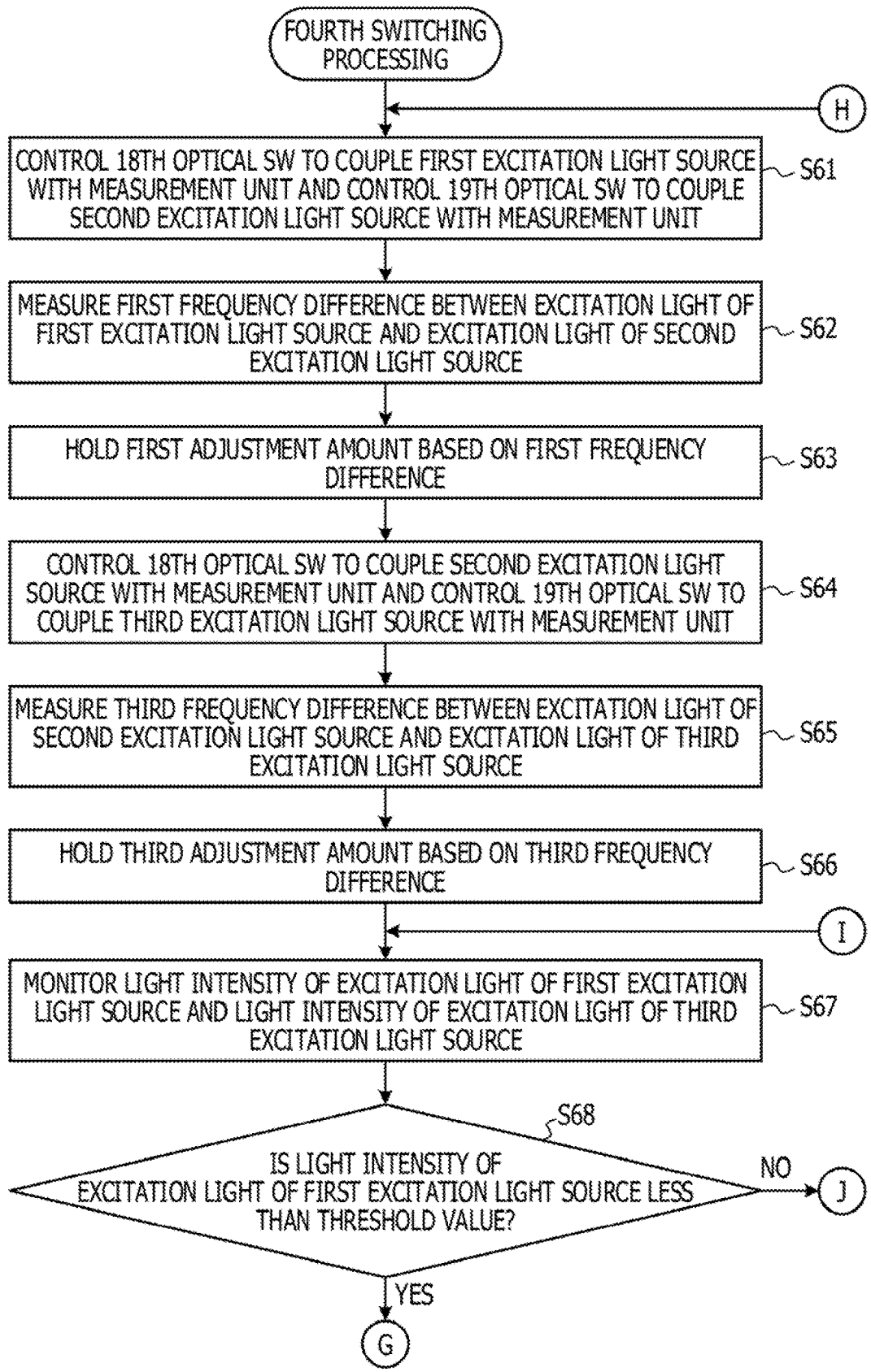
FIGS. 15A and 15B are flowcharts illustrating an example of a processing operation of a wavelength conversion device related to fourth switching processing.
Figure 15B:
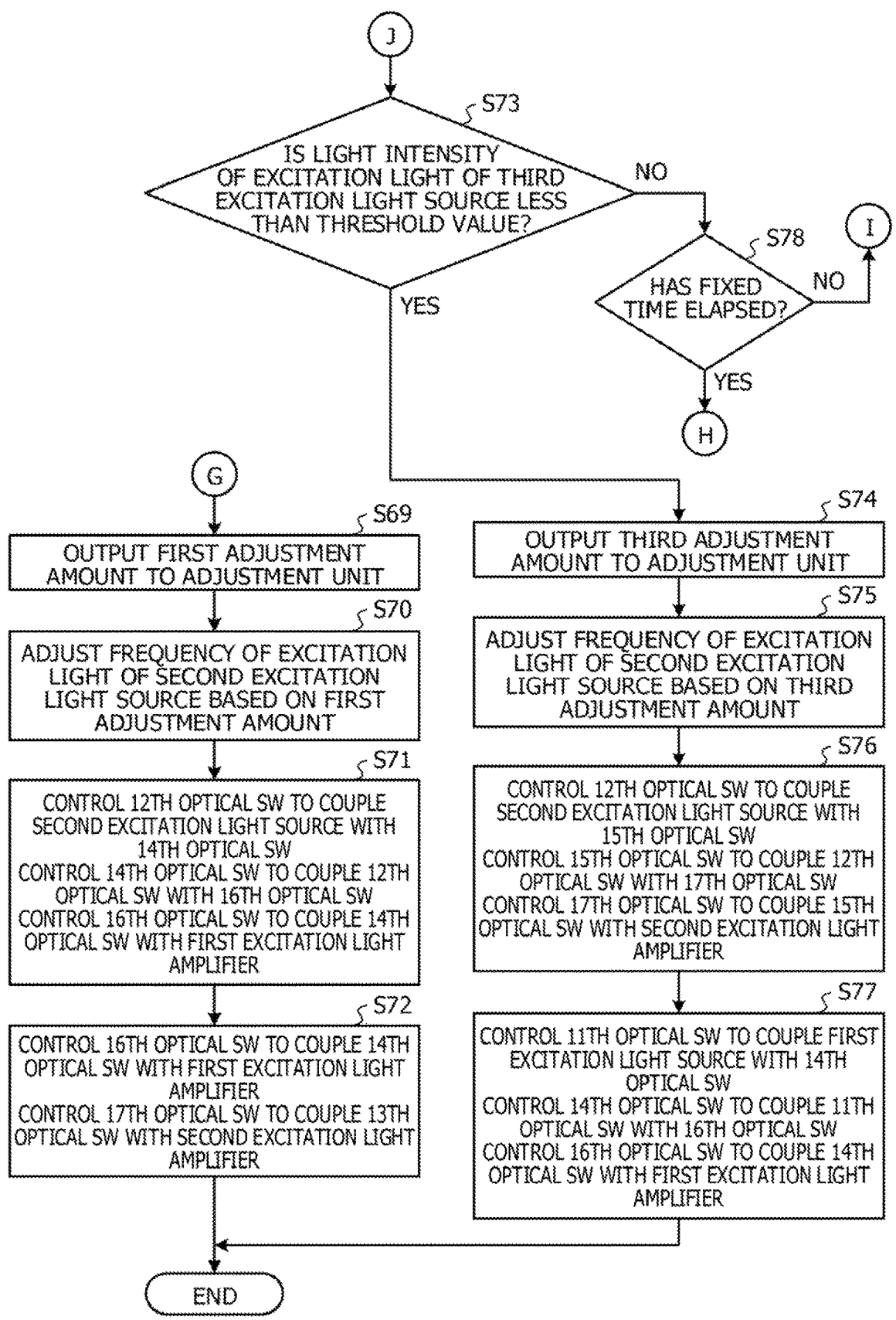

FIGS. 15A and 15B are flowcharts illustrating an example of a processing operation of a wavelength conversion device 3F related to fourth switching processing. The first excitation light source 11A and the third excitation light source 11C are operated, and the second excitation light source 11B is preliminary. In FIG. 15A, the control unit 20C in the wavelength conversion device 3F controls the 18th optical SW 25H to couple the first excitation light source 11A with the measurement unit 17C, and controls the 19th optical SW 253 to couple the second excitation light source 11B with the measurement unit 17C (Step S61). The measurement unit 17C measures the first frequency difference between the frequency of the first excitation light from the first excitation light source 11A and the frequency of the second excitation light from the second excitation light source 11B (Step S62). The measurement unit 17C holds the first adjustment amount before abnormality detection corresponding to the first frequency difference (Step S63).

The control unit 20C controls the 18th optical SW 25H to couple the second excitation light source 11B with the measurement unit 17C, and controls the 19th optical SW 253 to couple the third excitation light source 11C with the measurement unit 17C (Step S64). The measurement unit 17C measures the third frequency difference between the frequency of the second excitation light from the second excitation light source 11B and the frequency of the third excitation light from the third excitation light source 11C (Step S65). The measurement unit 17C holds the third adjustment amount before abnormality detection corresponding to the third frequency difference (Step S66).

The detection unit 18C in the wavelength conversion device 3F monitors the light intensity of the excitation light of the first excitation light source 11A and the light intensity of the excitation light of the third excitation light source 11C (Step S67). The detection unit 18C determines whether the light intensity of the first excitation light is less than the threshold value (Step S68).

When the light intensity of the first excitation light is less than the threshold value (Step S68: Yes), the measurement unit 17C determines that the first excitation light is abnormal, and outputs the first adjustment amount to the adjustment unit 19C (Step S69). The adjustment unit 19C adjusts the frequency of the second excitation light of the second excitation light source 118 based on the first adjustment amount (Step S70). As a result, the frequency of the second excitation light of the second excitation light source 11B becomes the same as the frequency of the first excitation light of the first excitation light source 11A before abnormality detection. The control unit 20C controls the 11th optical SW 25A to the 17th optical SW 25G so as to switch to a route of the second excitation light source 11B→the 12th optical SW 25B→the 14th optical SW 25D→the 16th optical SW 25F→the first excitation light amplifier 14A (Step S71). As a result, the second excitation light from the second excitation light source 11B is output instead of the first excitation light to the first excitation light amplifier 14A. The control unit 20C controls the 11th optical SW 25A to the 17th optical SW 25G while maintaining the route of the third excitation light source 11C→the 13th optical SW 25C→the 17th optical SW 25G→the second excitation light amplifier 14B, and ends the processing operation illustrated in FIG. 158 (Step S72).

When the light intensity of the first excitation light is not less than the threshold value (Step S68: No), the detection unit 18C determines that the first excitation light is normal and determines whether the light intensity of the third excitation light is less than the threshold value (Step S73). When the light intensity of the third excitation light is less than the threshold value (Step S73: Yes), the measurement unit 17C determines that the third excitation light is abnormal, and outputs the third adjustment amount to the adjustment unit 19C (Step S74). The adjustment unit 19C adjusts the frequency of the second excitation light of the second excitation light source 11B based on the third adjustment amount (Step S75). As a result, the frequency of the second excitation light of the second excitation light source 11B becomes the same as the frequency of the third excitation light of the third excitation light source 11C before abnormality detection. The control unit 20C controls the 11th optical SW 25A to the 17th optical SW 25G while maintaining the route of the second excitation light source 11B→the 12th optical SW 25B→the 14th optical SW 25D→the 16th optical SW 25F→the first excitation light amplifier 14A (Step S76). As a result, the second excitation light is output instead of the third excitation light to the first excitation light amplifier 14A. The control unit 20C controls the 11th optical SW 25A to the 17th optical SW 25G so as to switch to the route of the first excitation light source 11A→the 11th optical SW 25A→the 15th optical SW 25E→the 17th optical SW 25G→the second excitation light amplifier 14B (Step S77).

When the light intensity of the third excitation light is not less than the threshold value (Step S73: No), the detection unit 18C determines that the third excitation light is normal and determines whether a fixed time has elapsed (Step S78). In a case where a fixed time has elapsed (Step S78: Yes), the detection unit 18C proceeds to step S61 to control the 18th optical SW 25H and the 19th optical SW 253. When a fixed time has not elapsed (Step S78: No), the detection unit 18C proceeds to step S67 to monitor the light intensity of the first excitation light and the light intensity of the third excitation light.

Figure 16A:
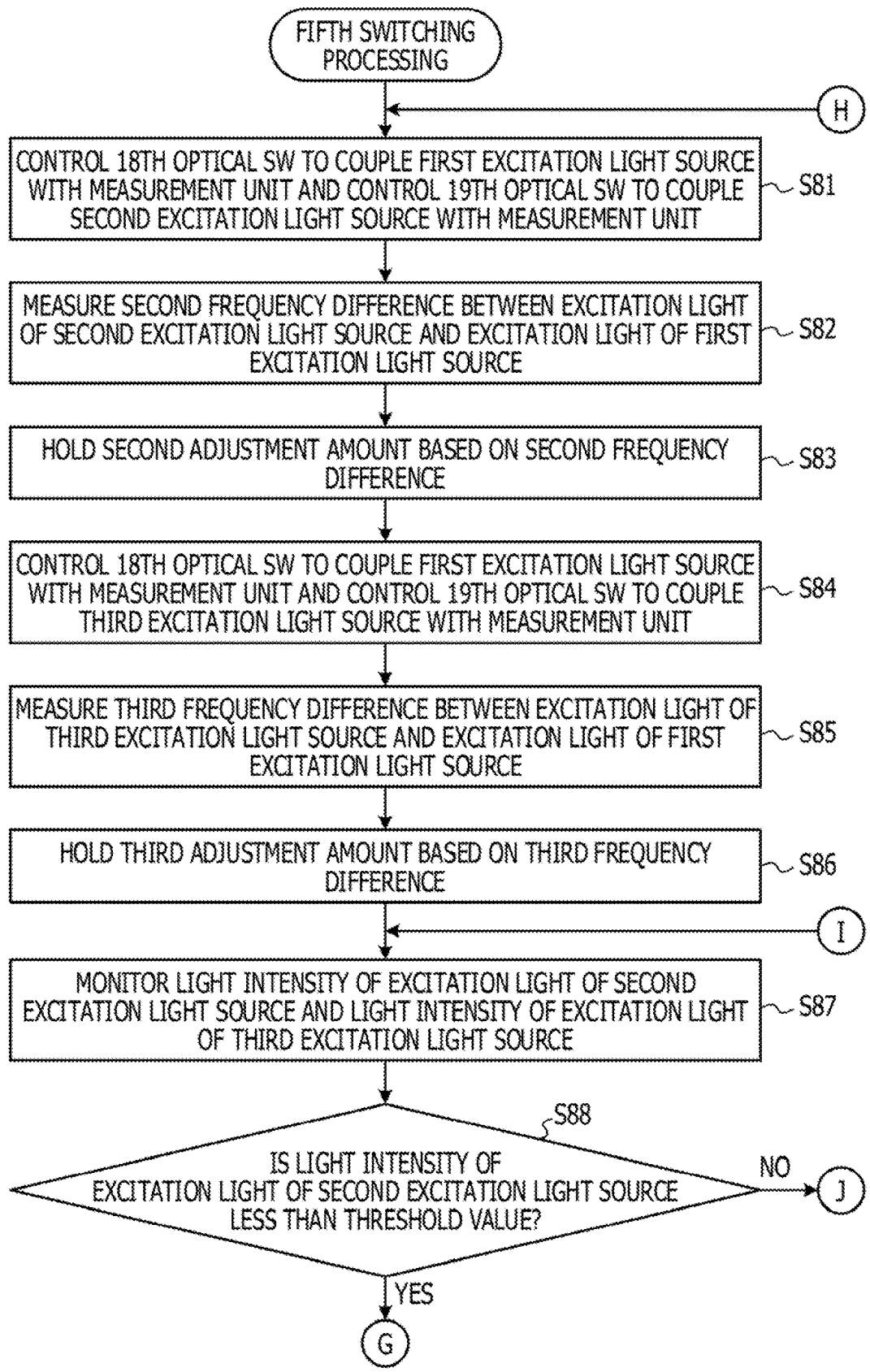
FIGS. 16A and 16B are flowcharts illustrating an example of a processing operation of a wavelength conversion device related to fifth switching processing.
Figure 16B:
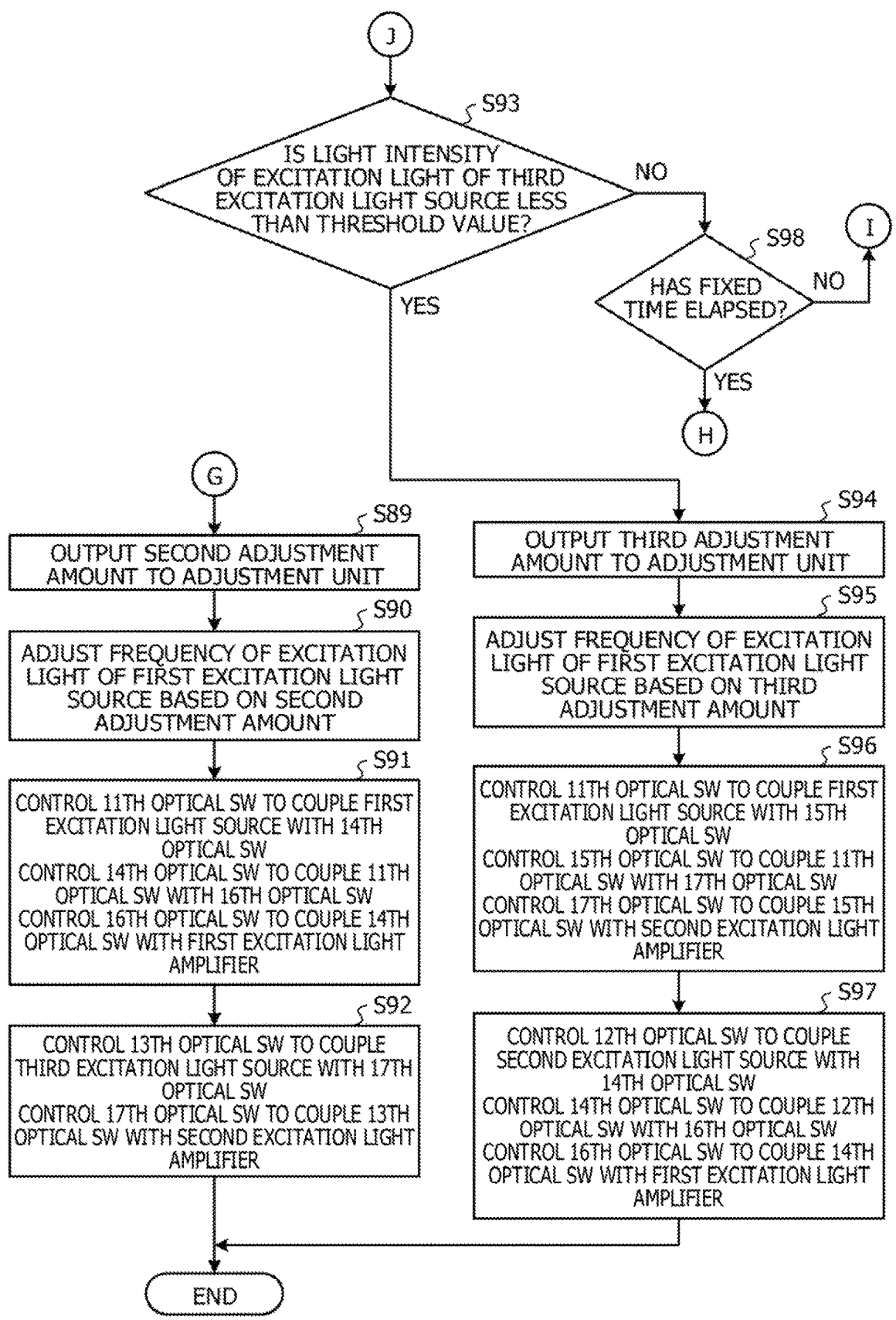

FIGS. 16A and 16B are flowcharts illustrating an example of a processing operation of a wavelength conversion device 3F related to fifth switching processing. The second excitation light source 11B and the third excitation light source 11C are operated, and the first excitation light source 11A is preliminary. In FIG. 16A, the control unit 20C in the wavelength conversion device 3F controls the 18th optical SW 25H to couple the first excitation light source 11A with the measurement unit 17C, and controls the 19th optical SW 253 to couple the second excitation light source 118 with the measurement unit 17C (Step S81). The measurement unit 17C measures the second frequency difference between the frequency of the first excitation light from the first excitation light source 11A and the frequency of the second excitation light from the second excitation light source 118 (Step S82). The measurement unit 17C holds the second adjustment amount before abnormality detection corresponding to the second frequency difference (Step S83).

Next, the control unit 20C controls the 18th optical SW 25H to couple the first excitation light source 11A with the measurement unit 17C, and controls the 19th optical SW 25J to couple the third excitation light source 11C with the measurement unit 17C (Step S84). The measurement unit 17C measures the third frequency difference between the frequency of the first excitation light from the first excitation light source 11A and the frequency of the third excitation light from the third excitation light source 11C (Step S85). The measurement unit 17C holds the third adjustment amount before abnormality detection corresponding to the third frequency difference (Step S86).

The detection unit 18C in the wavelength conversion device 3F monitors the light intensity of the excitation light of the second excitation light source 118 and the light intensity of the excitation light of the third excitation light source 11C (Step S87). The detection unit 18C determines whether the light intensity of the second excitation light is less than the threshold value (Step S88).

When the light intensity of the second excitation light is less than the threshold value (Step S88: Yes), the measurement unit 17C determines that the second excitation light is abnormal, and outputs the second adjustment amount to the adjustment unit 19C (Step S89). The adjustment unit 19C adjusts the frequency of the excitation light of the first excitation light source 11A based on the second adjustment amount (Step S90). As a result, the frequency of the excitation light of the first excitation light source 11A becomes the same as the frequency of the second excitation light of the second excitation light source 11B before abnormality detection. The control unit 20C controls the 11th optical SW 25A to the 17th optical SW 25G so as to switch to a route of the first excitation light source 11A→the 11th optical SW 25A→the 14th optical SW 25D→the 16th optical SW 25F→the first excitation light amplifier 14A (Step S91). As a result, the first excitation light from the first excitation light source 11A is output instead of the second excitation light to the first excitation light amplifier 14A. The control unit 20C controls the 11th optical SW 25A to the 17th optical SW 25G (Step S92) while maintaining the route of the third excitation light source 11C→the 13th optical SW 25C→the 17th optical SW 25G→the second excitation light amplifier 14B, and ends the processing operation illustrated in FIG. 16B.

When the light intensity of the second excitation light is not less than the threshold value (Step S88: No), the detection unit 18C determines that the second excitation light is normal and determines whether the light intensity of the third excitation light is less than the threshold value (Step S93). When the light intensity of the third excitation light is less than the threshold value (Step S93: Yes), the measurement unit 17C determines that the third excitation light is abnormal, and outputs the third adjustment amount to the adjustment unit 19C (Step S94). The adjustment unit 19C adjusts the frequency of the excitation light of the first excitation light source 11A based on the third adjustment amount (Step S95). As a result, the frequency of the first excitation light of the first excitation light source 11A becomes the same as the frequency of the third excitation light of the third excitation light source 11C before abnormality detection. The control unit 20C controls the 11th optical SW 25A to the 17th optical SW 25G so as to switch to a route of the first excitation light source 11A→the 11th optical SW 25A→the 15th optical SW 25E→the 17th optical SW 25G→the second excitation light amplifier 148 (Step S96). As a result, the first excitation light is output instead of the third excitation light to the second excitation light amplifier 14B. The control unit 20C controls the 11th optical SW 25A to the 17th optical SW 25G while maintaining the route of the second excitation light source 11B→the 12th optical SW 25B→the 14th optical SW 25D→the 16th optical SW 25F→the first excitation light amplifier 14A (Step S97).

When the light intensity of the third excitation light is not less than the threshold value (Step S93: No), the detection unit 18C determines that the third excitation light is normal and determines whether a fixed time has elapsed (Step S98). In a case where a fixed time has elapsed (Step S98: Yes), the detection unit 18C proceeds to step S81 to control the 18th optical SW 25H and the 19th optical SW 253. When a fixed time has not elapsed (Step S98: No), the detection unit 18C proceeds to step S87 to monitor the light intensity of the second excitation light and the light intensity of the third excitation light.

Figure 17A:
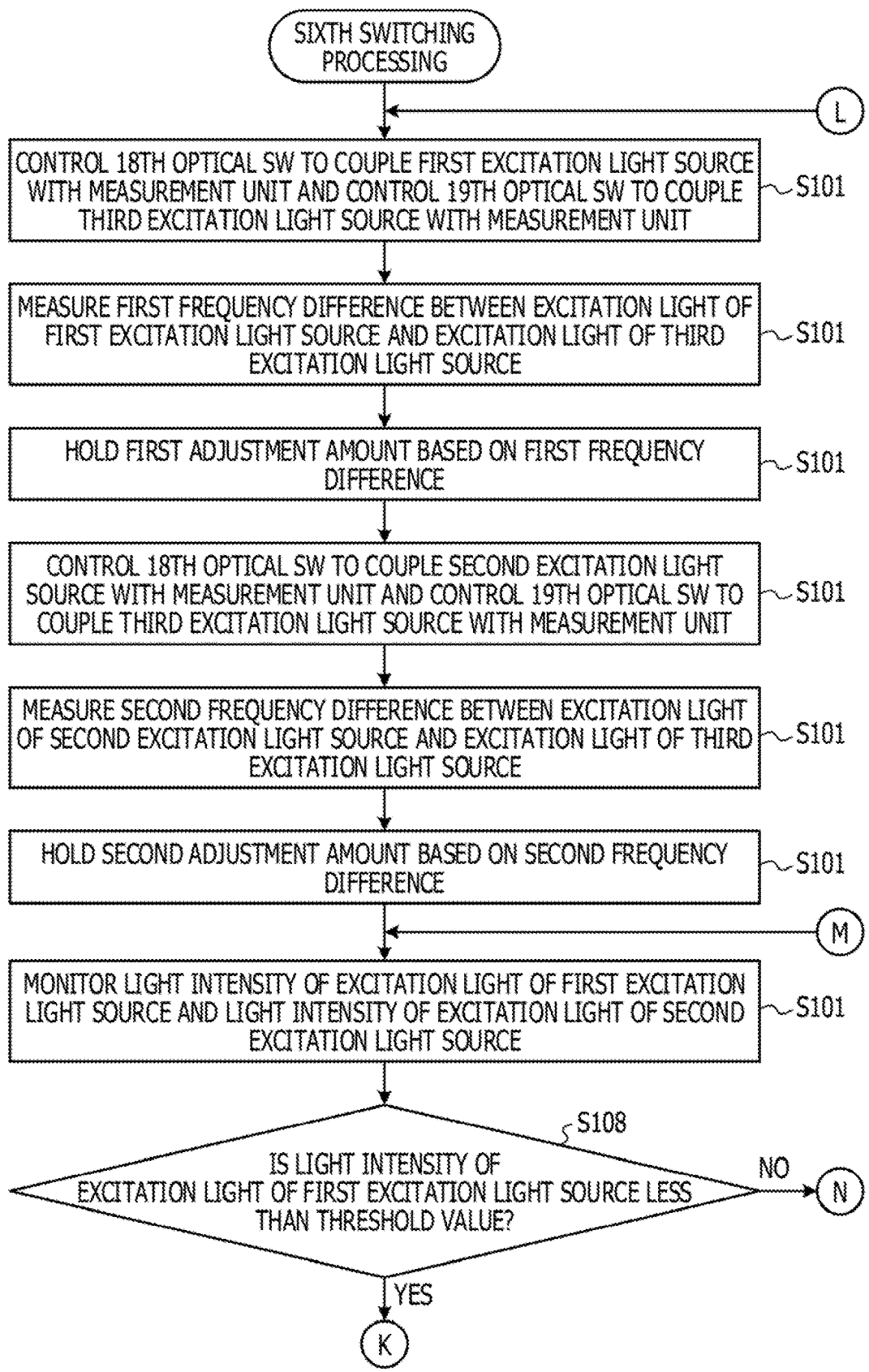
FIGS. 17A and 17B are flowcharts illustrating an example of a processing operation of a wavelength conversion device related to sixth switching processing.
Figure 17B:
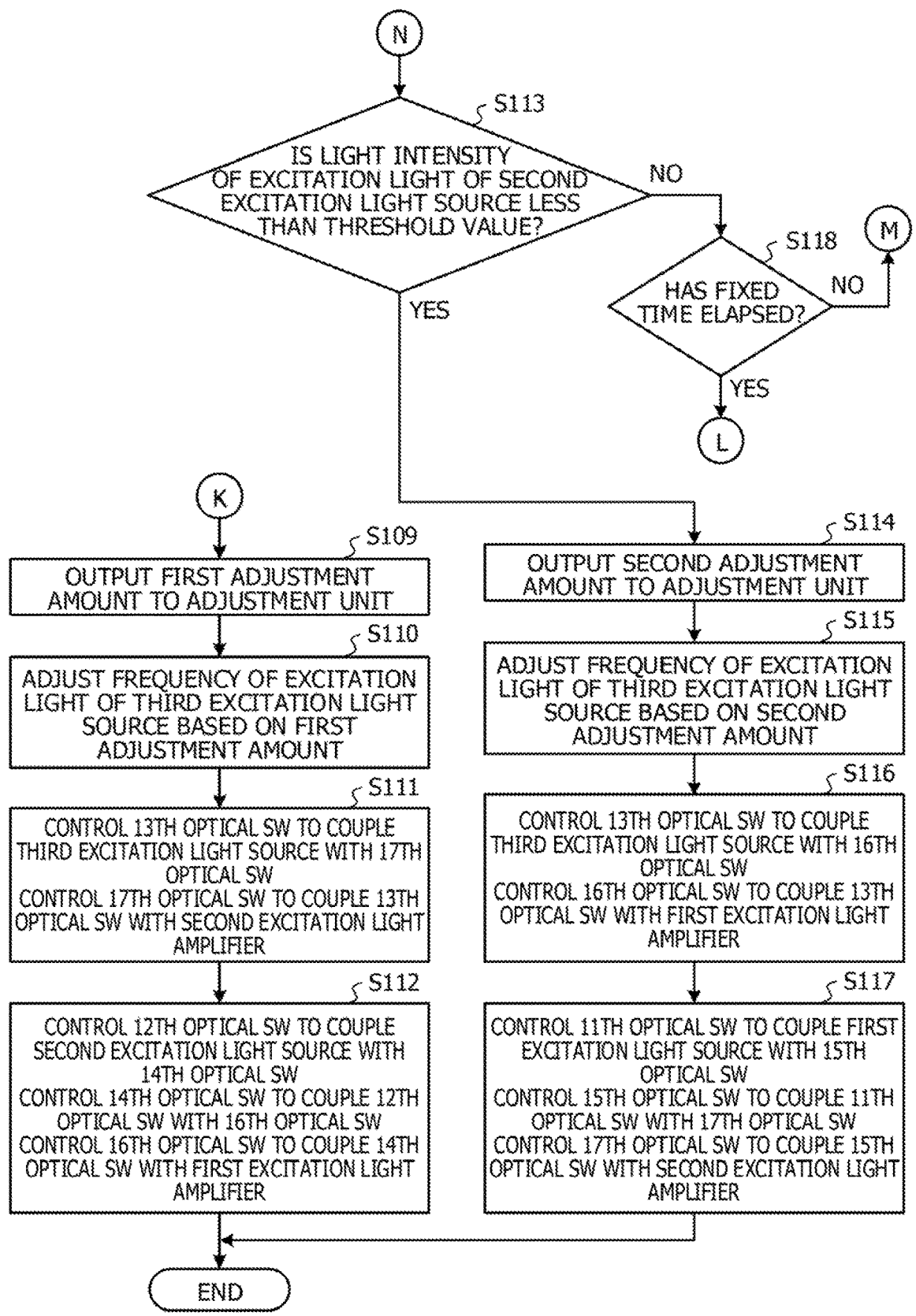

FIGS. 17A and 17B are flowcharts illustrating an example of a processing operation of a wavelength conversion device 3F related to sixth switching processing. The first excitation light source 11A and the second excitation light source 11B are operated, and the third excitation light source 11C is preliminary. In FIG. 17A, the control unit 20C in the wavelength conversion device 3F controls the 18th optical SW 25H to couple the first excitation light source 11A with the measurement unit 17C, and controls the 19th optical SW 25J to couple the third excitation light source 11C with the measurement unit 17C (Step S101). The measurement unit 17C measures the first frequency difference between the frequency of the first excitation light from the first excitation light source 11A and the frequency of the third excitation light from the third excitation light source 11C (Step S102). The measurement unit 17C holds the first adjustment amount before abnormality detection corresponding to the first frequency difference (Step S103).

The control unit 20C controls the 18th optical SW 25H to couple the second excitation light source 11B with the measurement unit 17C, and controls the 19th optical SW 25J to couple the third excitation light source 11C with the measurement unit 17C (Step S104). The measurement unit 17C measures the second frequency difference between the frequency of the second excitation light from the second excitation light source 11B and the frequency of the third excitation light from the third excitation light source 11C (Step S105). The measurement unit 17C holds the second adjustment amount before abnormality detection corresponding to the second frequency difference (Step S106).

The detection unit 18C monitors the light intensity of the excitation light of the first excitation light source 11A and the light intensity of the excitation light of the second excitation light source 11B (Step S107). The detection unit 18C determines whether the light intensity of the first excitation light is less than the threshold value (Step S108).

When the light intensity of the first excitation light is less than the threshold value (Step S108: Yes), the measurement unit 17C determines that the first excitation light is abnormal, and outputs the first adjustment amount to the adjustment unit 19C (Step S109). The adjustment unit 19C adjusts the frequency of the excitation light of the third excitation light source 11C based on the first adjustment amount (Step S110). As a result, the frequency of the third excitation light of the third excitation light source 11C becomes the same as the frequency of the first excitation light before abnormality detection of the first excitation light source 11A. The control unit 20 controls the 11th optical SW 25A to the 17th optical SW 25G so as to switch to a route of the third excitation light source 11C→the 13th optical SW 25C→the 17th optical SW 25G→the second excitation light amplifier 14B (Step S111). As a result, the third excitation light from the third excitation light source 11C is output instead of the first excitation light to the first excitation light amplifier 14A. The control unit 20C controls the 11th optical SW 25A to the 17th optical SW 25G (Step S112) while maintaining the route of the second excitation light source 11B→the 12th optical SW 25B→the 14th optical SW 25D→the 16th optical SW 25F→the first excitation light amplifier 14A, and ends the processing operation illustrated in FIG. 17B.

When the light intensity of the first excitation light is not less than the threshold value (Step S108: No), the detection unit 18C determines that the first excitation light is normal and determines whether the light intensity of the second excitation light is less than the threshold value (Step S113). When the light intensity of the second excitation light is less than the threshold value (Step S113: Yes), the measurement unit 17C determines that the second excitation light is abnormal, and outputs the second adjustment amount to the adjustment unit 19C (Step S114). The adjustment unit 19C adjusts the frequency of the excitation light of the third excitation light source 11C based on the second adjustment amount (Step S115). As a result, the frequency of the third excitation light of the third excitation light source 11C becomes the same as the frequency of the third excitation light of the first excitation light source 11A before abnormality detection. The control unit 20C controls the 11th optical SW 25A to the 17th optical SW 25G so as to switch to a route of the third excitation light source 11C→the 13th optical SW 25C→the 17th optical SW 25G→the second excitation light amplifier 14B (Step S116). As a result, the third excitation light is output instead of the second excitation light to the second excitation light amplifier 14B. The control unit 20C controls the 11th optical SW 25A to the 17th optical SW 25G while maintaining the route of the second excitation light source 11B→the 12th optical SW 25B→the 14th optical SW 25D→the 16th optical SW 25F→the first excitation light amplifier 14A (Step S117).

When the light intensity of the second excitation light is not less than the threshold value (Step S113: No), the detection unit 18C determines that the second excitation light is normal and determines whether a fixed time has elapsed (Step S118). In a case where a fixed time has elapsed (Step S118: Yes), the detection unit 18C proceeds to step S101 to control the 18th optical SW 25H and the 19th optical SW 25J. When a fixed time has not elapsed (Step S118: No), the detection unit 18C proceeds to step S107 to monitor the light intensity of the first excitation light and the light intensity of the second excitation light.

In the wavelength conversion device 3F of Example 5, in a case where the excitation light in operation is the first and second excitation light, preliminary excitation light is the third excitation light, and an abnormality of the first excitation light is detected, the third excitation light is adjusted according to the first adjustment amount and the first excitation light in which an abnormality is detected is switched to the adjusted third excitation light. As a result, in the WDM device 2, communication may be continued without interruption even when the excitation light in operation is abnormal by suppressing the frequency deviation of the excitation light, that is, by aligning the frequencies between the excitation light beams, thereby avoiding reception error.

In the wavelength conversion device 3F, in a case where the excitation light in operation is the first and second excitation light, the preliminary excitation light is the third excitation light, and an abnormality of the second excitation light is detected, the third excitation light is adjusted according to the second adjustment amount and the second excitation light in which an abnormality is detected is switched to the adjusted third excitation light. As a result, in the WDM device 2, by aligning the frequencies between the excitation light beams, communication may be continued without interruption even when the excitation light in operation is abnormal, thereby avoiding reception error.

In the wavelength conversion device 3F, in a case where the excitation light in operation is the first and third excitation light, the preliminary excitation light is the second excitation light, and an abnormality of the first excitation light is detected, the second excitation light is adjusted according to the first adjustment amount and the first excitation light in which an abnormality is detected is switched to the adjusted second excitation light. As a result, in the WDM device 2, by aligning the frequencies between the excitation light beams, communication may be continued without interruption even when the excitation light in operation is abnormal, thereby avoiding reception error.

In the wavelength conversion device 3F, in a case where the excitation light in operation is the first and third excitation light, the preliminary excitation light is the second excitation light, and an abnormality of the third excitation light is detected, the second excitation light is adjusted according to the third adjustment amount and the third excitation light in which an abnormality is detected is switched to the adjusted second excitation light. As a result, in the WDM device 2, by aligning the frequencies between the excitation light beams, communication may be continued without interruption even when the excitation light in operation is abnormal, thereby avoiding reception error.

In the wavelength conversion device 3F, in a case where the excitation light in operation is the second and third excitation light, the preliminary excitation light is the first excitation light, and an abnormality of the second excitation light is detected, the first excitation light is adjusted according to the second adjustment amount and the second excitation light in which an abnormality is detected is switched to the adjusted first excitation light. As a result, in the WDM device 2, by aligning the frequencies between the excitation light beams, communication may be continued without interruption even when the excitation light in operation is abnormal, thereby avoiding reception error.

In the wavelength conversion device 3F, in a case where the excitation light in operation is the second and third excitation light, the preliminary excitation light is the first excitation light, and an abnormality of the third excitation light is detected, the first excitation light is adjusted according to the third adjustment amount and the third excitation light in which an abnormality is detected is switched to the adjusted first excitation light. As a result, in the WDM device 2, by aligning the frequencies between the excitation light beams, communication may be continued without interruption even when the excitation light in operation is abnormal, thereby avoiding reception error.

The wavelength conversion device 3F of Example 5 exemplifies the case where the excitation light after optical amplification by the first excitation light amplifier 14A and the excitation light after optical amplification by the second excitation light amplifier 14B are multiplexed, and the multiplexed excitation light is output to the optical coupler 15. However, two excitation light beams may be collectively amplified by one excitation light amplifier 14, and an embodiment thereof will be described below as Example 6.

Example 6

Figure 18:
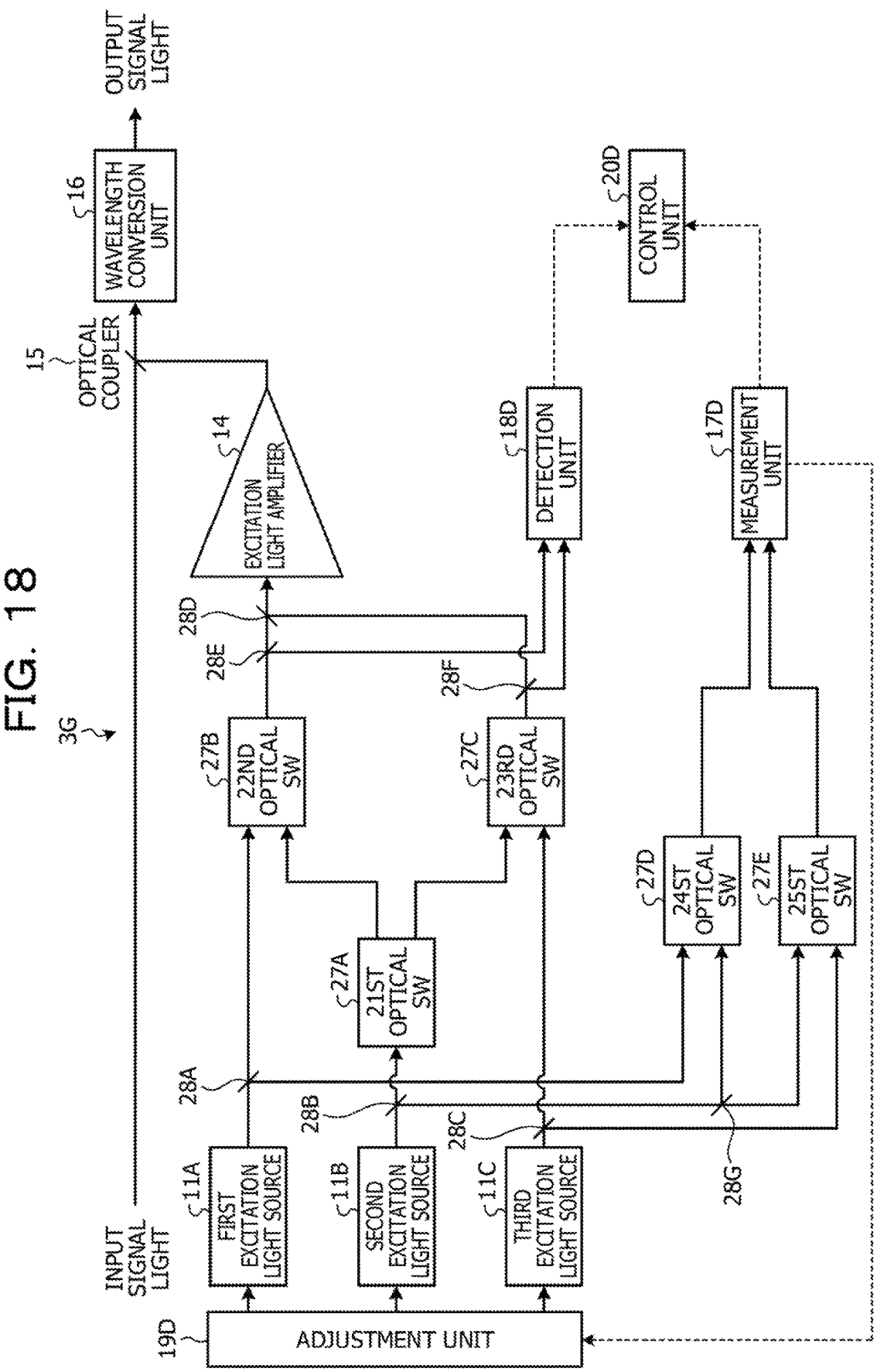
FIG. 18 is an explanatory diagram illustrating an example of a wavelength conversion device of Example 6.

FIG. 18 is an explanatory diagram illustrating an example of a wavelength conversion device 3G of Example 6. The same components as those in the wavelength conversion device 3F of Example 5 are denoted by the same reference numerals, and the description of the overlapping configuration and operation is omitted.

The difference between the wavelength conversion device 3G of Example 6 and the wavelength conversion device 3F of Example 5 is that, in the wavelength conversion device 3G of Example 6, the 21st optical SW 27A to the 25th optical SW 27E are provided instead of the 11th optical SW 25A to the 19th optical SW 25H.

The 21st optical SW 27A is disposed between the second excitation light source 11B and the 22nd optical SW 27B and the 23rd optical SW 27C, and is a switch that outputs the second excitation light from the second excitation light source 11B to the 22nd optical SW 27B or the 23rd optical SW 27C. The 22nd optical SW 27B is disposed between the first excitation light source 11A and the 21st optical SW 27A, and the excitation light amplifier 14, and is a switch that outputs the first excitation light from the first excitation light source 11A or the second excitation light from the 21st optical SW 27A to excitation light amplifier 14. The 23rd optical SW 27C is disposed between the third excitation light source 11C and the 21st optical SW 27A, and the excitation light amplifier 14, and is a switch that outputs the third excitation light from the third excitation light source 11C or the second excitation light from the 21st optical SW 27A to excitation light amplifier 14.

The 24th optical SW 27D is disposed between the first excitation light source 11A and the second excitation light source 11B, and the measurement unit 17C, and is a switch that outputs the excitation light from the first excitation light source 11A or the excitation light from the second excitation light source 11B to the measurement unit 17C. The 25th optical SW 27E is disposed between the second excitation light source 11B and the third excitation light source 11C, and the measurement unit 17C, and is a switch that outputs the excitation light from the second excitation light source 11B or the excitation light from the third excitation light source 11C to the measurement unit 17C.

The wavelength conversion device 3G includes a 31st optical coupler 28A to a 37th optical coupler 28G. The 31st optical coupler 28A is disposed between the first excitation light source 11A, and the 22nd optical SW 27B and the 24th optical SW 27D, and branches and outputs the first excitation light from the first excitation light source 11A to the 22nd optical SW 27B and the 24th optical SW 27D. The 32nd optical coupler 28B is disposed between the second excitation light source 11B, and the 21st optical SW 27A and the 37th optical coupler 28G, and branches and outputs the second excitation light from the second excitation light source 11B to the 21st optical SW 27A and the 37th optical coupler 28G. The 33rd optical coupler 28C is disposed between the third excitation light source 11C, and the 23rd optical SW 27C and the 25th optical SW 27E, and branches and outputs the third excitation light from the third excitation light source 11C to the 23rd optical SW 27C and the 25th optical SW 27E.

The 34th optical coupler 28D is disposed between the 22nd optical SW 27B and the 23rd optical SW 27C, and the excitation light amplifier 14, multiplexes the excitation light from the 22nd optical SW 27B and the excitation light from the 23rd optical SW 27C, and outputs the multiplexed excitation light to the excitation light amplifier 14. The 35th optical coupler 28E is disposed between the 22nd optical SW 27B, and the excitation light amplifier 14 and the detection unit 18D, and branches and outputs the excitation light from the 22nd optical SW 27B to the excitation light amplifier 14 and the detection unit 18D. The 36th optical coupler 28F is disposed between the 23rd optical SW 27C, and the excitation light amplifier 14 and the detection unit 18D, and branches and outputs the excitation light from the 23rd optical SW 27C to the excitation light amplifier 14 and the detection unit 18D. The 37th optical coupler 28G is disposed between the 32nd optical coupler 28B, and the 24th optical SW 27D and the 25th optical SW 27E, and branches and outputs the excitation light from the 32nd optical coupler 28B to the 24th optical SW 27D and the 25th optical SW 27E.

The detection unit 18D determines whether the light intensity of the excitation light via the 35th optical coupler 28E or the light intensity of the excitation light via the 36th optical coupler 28F is less than the threshold value. The detection unit 18D determines that the excitation light is abnormal when the light intensity of the excitation light is less than the threshold value. When it is determined that the excitation light is abnormal, the control unit 20D controls the 21st optical SW 27A to the 25th optical SW 27E.

The measurement unit 17D measures a frequency difference between the frequency of the excitation light via the 24th optical SW 27D and the frequency of the excitation light via the 25th optical SW 27E, that is a frequency difference between the frequency of the excitation light in operation and the frequency of the redundant excitation light. The measurement unit 17D outputs an adjustment amount corresponding to the frequency difference to the adjustment unit 19D. The adjustment unit 19D adjusts the frequency of the excitation light of the preliminary excitation light source 11 based on the adjustment amount, and outputs the adjusted excitation light from the excitation light source 11.

Figure 19:
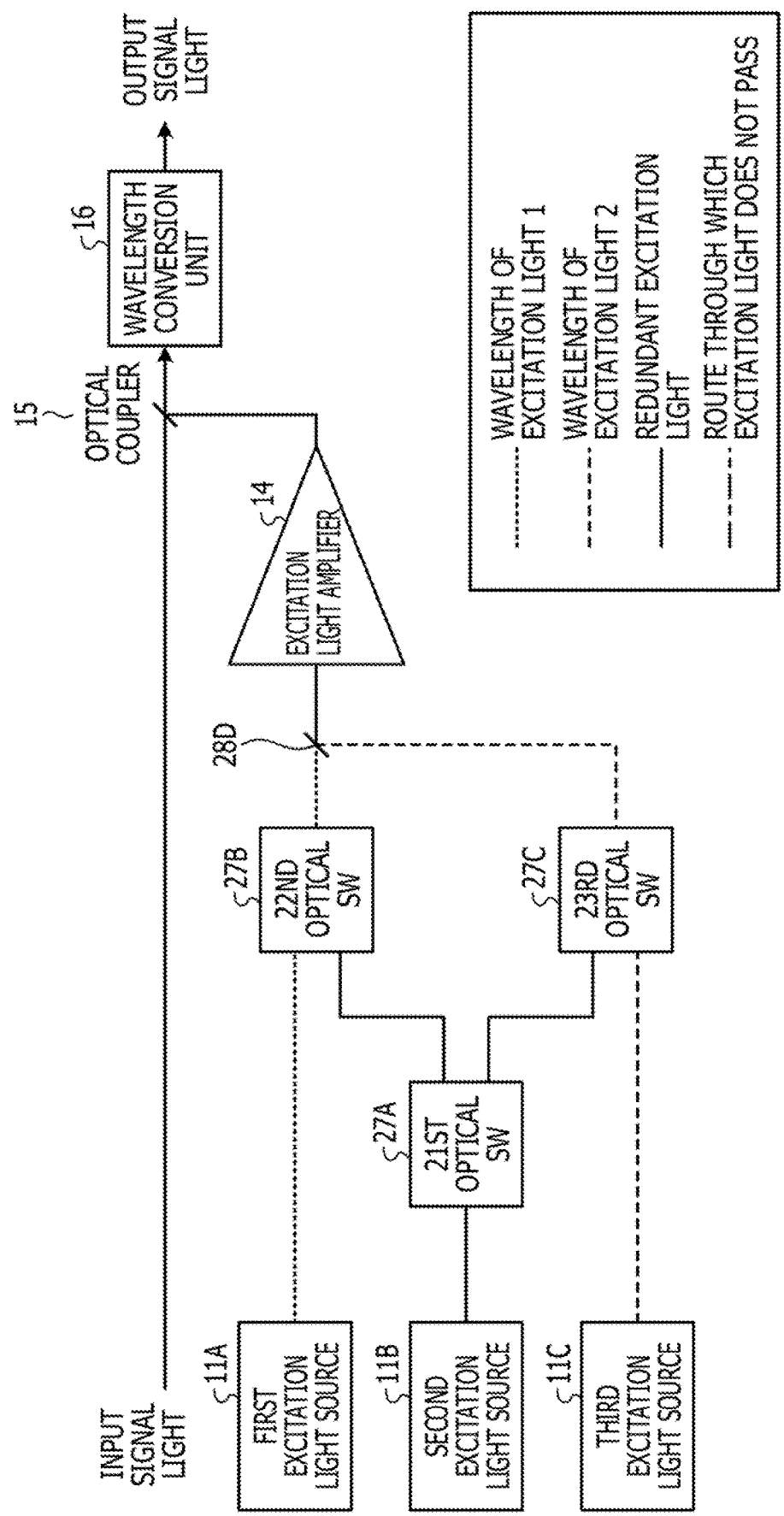
FIG. 19 is an explanatory diagram illustrating an example of an optical SW switching operation of a wavelength conversion device during operation of a first excitation light source and a third excitation light source.

The operation of the WDM system 1 according to Example 6 will be explained below. FIG. 19 is an explanatory diagram illustrating an example of an optical SW switching operation of a wavelength conversion device 3G during operation of a first excitation light source 11A and a third excitation light source 11C. The control unit 20D in the wavelength conversion device 3G illustrated in FIG. 19 switches to a route of the first excitation light source 11A→the 22nd optical SW 27B→the excitation light amplifier 14, and outputs the first excitation light to the excitation light amplifier 14 through the route. The control unit 20D switches to a route of the third excitation light source 11C→the 23rd optical SW 27C→the excitation light amplifier 14, and outputs the third excitation light to the excitation light amplifier 14 through the route.

Figure 20:
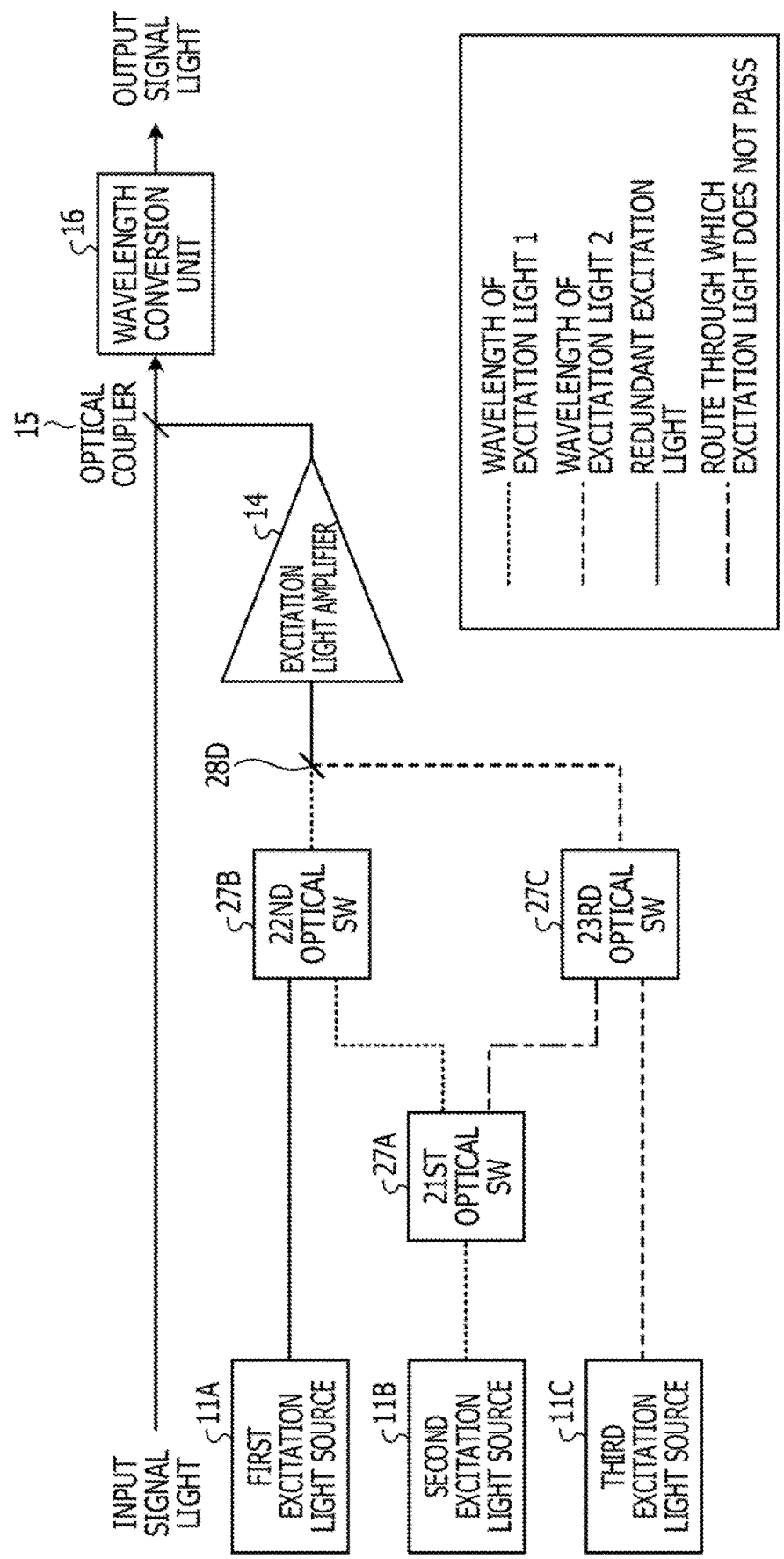
FIG. 20 is an explanatory diagram illustrating an example of an optical SW switching operation of a wavelength conversion device in a case of a failure of a first excitation light source from an operation state illustrated in FIG. 19.

FIG. 20 is an explanatory diagram illustrating an example of an optical SW switching operation of a wavelength conversion device 3G in a case of a failure of the first excitation light source 11A from an operation state illustrated in FIG. 19. The detection unit 18D of the wavelength conversion device 3G illustrated in FIG. 20 detects an abnormality of the light intensity of the first excitation light from the first excitation light source 11A. The control unit 20D switches from the first excitation light source 11A to the second excitation light source 11B. For example, the control unit 20D switches to a route of the second excitation light source 11B→the 21st optical SW 27A→the 22nd optical SW 27B→the excitation light amplifier 14, and outputs the second excitation light to the excitation light amplifier 14 through the route. The control unit 20D outputs, while maintaining the route of the third excitation light source 11C→the 23rd optical SW 27C→the excitation light amplifier 14, the third excitation light to the excitation light amplifier 14 through the route.

Figure 21:
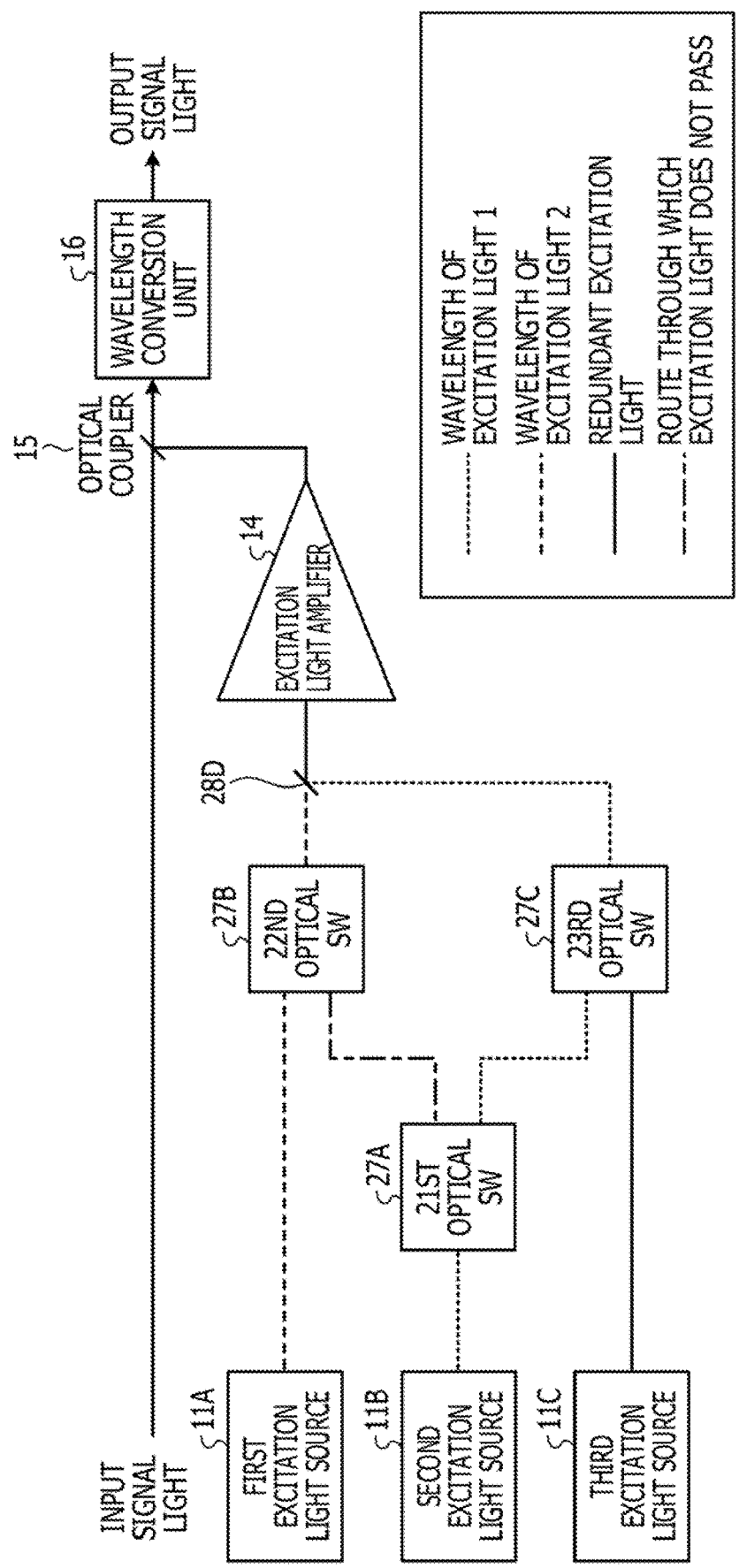
FIG. 21 is an explanatory diagram illustrating an example of an optical SW switching operation of a wavelength conversion device in a case of a failure of a third excitation light source from an operation state illustrated in FIG. 20.

FIG. 21 is an explanatory diagram illustrating an example of an optical SW switching operation of a wavelength conversion device 3G in a case of a failure of a third excitation light source 11C from an operation state illustrated in FIG. 20. The detection unit 18D of the wavelength conversion device 3G illustrated in FIG. 21 detects an abnormality of the light intensity of the third excitation light from the third excitation light source 11C. The control unit 20D switches from the third excitation light source 11C to the first excitation light source 11A. For example, the control unit 20D outputs, while maintaining the route of the second excitation light source 11B→the 21st optical SW 27A→the 23rd optical SW 27C→the excitation light amplifier 14, the second excitation light to the excitation light amplifier 14 through the route. The control unit 20D switches to a route of the first excitation light source 11A→the 22nd optical SW 27B→the excitation light amplifier 14, and outputs the first excitation light to the excitation light amplifier 14 through the route.

FIG. 22 is an explanatory diagram illustrating an example of an optical SW switching operation of a wavelength conversion device 3G in a case of a failure of a second excitation light source 11B from an operation state illustrated in FIG. 21. The detection unit 18D of the wavelength conversion device 3G illustrated in FIG. 22 detects an abnormality of the light intensity of the second excitation light from the second excitation light source 11B. The control unit 20D switches from the second excitation light source 11B to the third excitation light source 11C. For example, the control unit 20D switches to a route of the third excitation light source 11C→the 23rd optical SW 27C→the excitation light amplifier 14, and outputs the third excitation light to the excitation light amplifier 14 through the route. The control unit 20D outputs, while maintaining the route of the first excitation light source 11A→the 22nd optical SW 27B→the excitation light amplifier 14, the first excitation light to the excitation light amplifier 14 through the route.

Figure 23A:
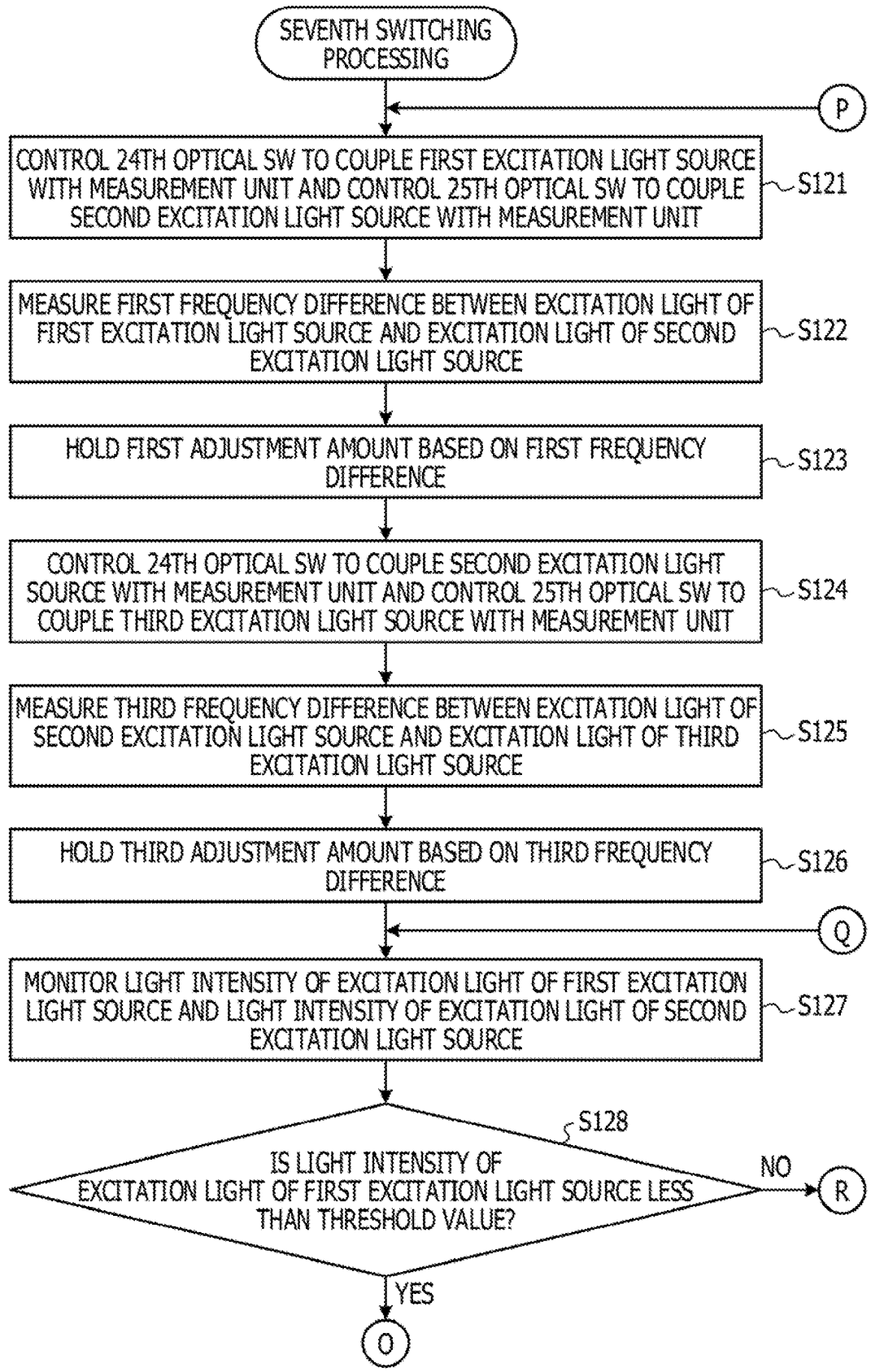
FIGS. 23A and 23B are flowcharts illustrating an example of a processing operation of a wavelength conversion device related to seventh switching processing.
Figure 23B:
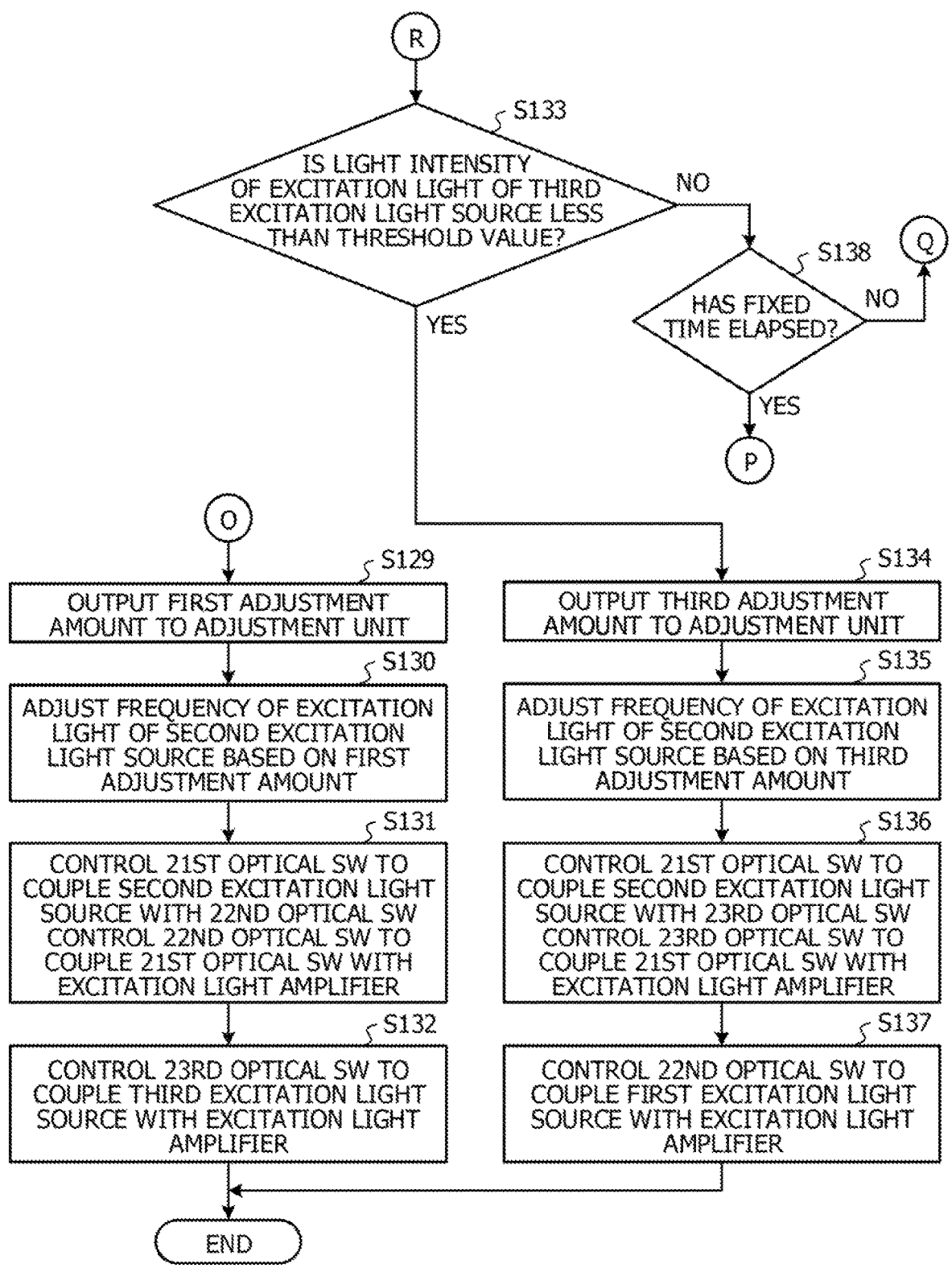

FIGS. 23A and 23B are flowcharts illustrating an example of a processing operation of a wavelength conversion device 3G related to seventh switching processing. The first excitation light source 11A and the third excitation light source 11C are operated, and the second excitation light source 11B is preliminary. In FIG. 23A, the control unit 20D in the wavelength conversion device 3G controls the 24th optical SW 27D to couple the first excitation light source 11A with the measurement unit 17D, and controls the 25th optical SW 27E to couple the second excitation light source 11B with the measurement unit 17D (Step S121). The measurement unit 17D measures the first frequency difference between the frequency of the first excitation light from the first excitation light source 11A and the frequency of the second excitation light from the second excitation light source 11B (Step S122). The measurement unit 17D holds the first adjustment amount before the abnormality detection corresponding to the first frequency difference (Step S123).

The control unit 20D controls the 24th optical SW 27D to couple the second excitation light source 11B with the measurement unit 17D, and controls the 25th optical SW 27E to couple the third excitation light source 11C with the measurement unit 17D (Step S124). The measurement unit 17D measures the third frequency difference between the frequency of the second excitation light from the second excitation light source 11B and the frequency of the third excitation light from the third excitation light source 11C (Step S125). The measurement unit 17D holds the third adjustment amount before abnormality detection corresponding to the third frequency difference (Step S126).

The detection unit 18D monitors the light intensity of the excitation light of the first excitation light source 11A and the light intensity of the excitation light of the third excitation light source 11C (Step S127). The detection unit 18D determines whether the light intensity of the first excitation light is less than the threshold value (Step S128).

When the light intensity of the first excitation light is less than the threshold value (Step S128: Yes), the measurement unit 17D determines that the first excitation light is abnormal, and outputs the first adjustment amount to the adjustment unit 19D (Step S129). The adjustment unit 19D adjusts the frequency of the excitation light of the second excitation light source 11B based on the first adjustment amount (Step S130). As a result, the frequency of the second excitation light of the second excitation light source 11B becomes the same as the frequency of the first excitation light of the first excitation light source 11A before abnormality detection. The control unit 20D controls the 21st optical SW 27A to the 25th optical SW 27E so as to switch to a route of the second excitation light source 11B→the 21st optical SW 27A→the 22nd optical SW 27B→the excitation light amplifier 14 (Step S131). As a result, the second excitation light from the second excitation light source 11B is output instead of the first excitation light to the excitation light amplifier 14. The control unit 20D controls the 21st optical SW 27A to the 25th optical SW 27E while maintaining the route of the third excitation light source 11C→the 23rd optical SW 27C→the excitation light amplifier 14 (Step S132), and ends the processing operation illustrated in FIG. 23B.

When the light intensity of the first excitation light is not less than the threshold value (Step S128: No), the detection unit 18D determines that the first excitation light is normal and determines whether the light intensity of the third excitation light is less than the threshold value (Step S133). When the light intensity of the third excitation light is less than the threshold value (Step S133: Yes), the measurement unit 17D determines that the third excitation light is abnormal, and outputs the third adjustment amount to the second excitation light source 11B (Step S134). The adjustment unit 19D adjusts the frequency of the excitation light of the second excitation light source 11B based on the third adjustment amount (Step S135). As a result, the frequency of the second excitation light of the second excitation light source 11B becomes the same as the frequency of the third excitation light of the third excitation light source 11C before abnormality detection. The control unit 20D controls the 21st optical SW 27A to the 25th optical SW 27E so as to switch to a route of the second excitation light source 11B→the 22nd optical SW 27B→the excitation light amplifier 14 (Step S136). As a result, the second excitation light is output instead of the third excitation light to the excitation light amplifier 14. The control unit 20D controls the 21st optical SW 27A to the 25th optical SW 27E while maintaining the route of the first excitation light source 11A→the 22nd optical SW 27B→the excitation light amplifier 14 (Step S137).

When the light intensity of the third excitation light is not less than the threshold value (Step S133: No), the detection unit 18D determines that the third excitation light is normal and determines whether a fixed time has elapsed (Step S138). In a case where a fixed time has elapsed (Step S138: Yes), the detection unit 18D proceeds to step S121 to control the 24th optical SW 27D and the 25th optical SW 27E. When a fixed time has not elapsed (Step S138: No), the detection unit 18D proceeds to step S127 to monitor the light intensity of the first excitation light and the light intensity of the third excitation light.

Figure 24A:
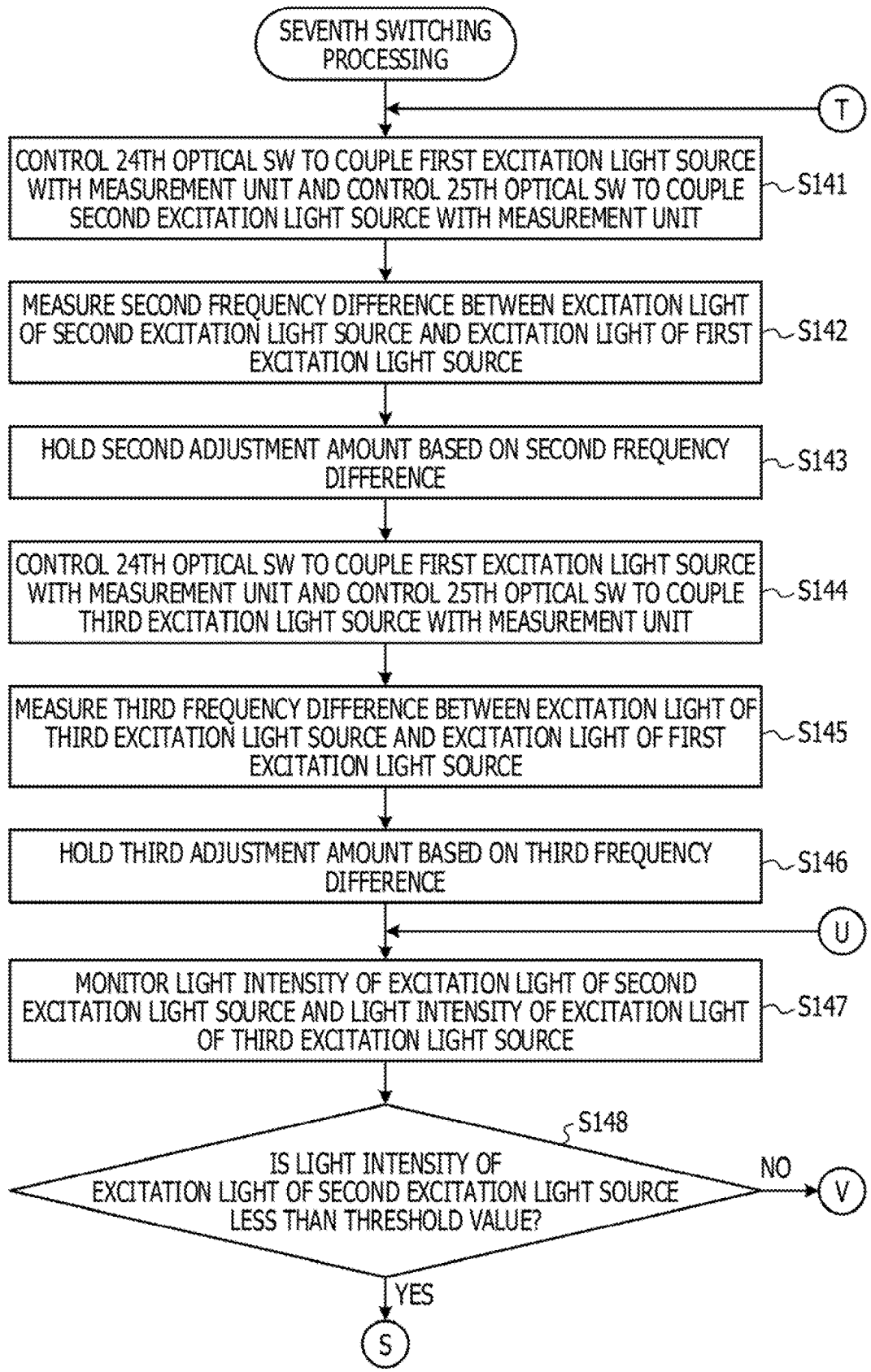
FIGS. 24A and 24B are flowcharts illustrating an example of a processing operation of a wavelength conversion device related to eighth switching processing.
Figure 24B:
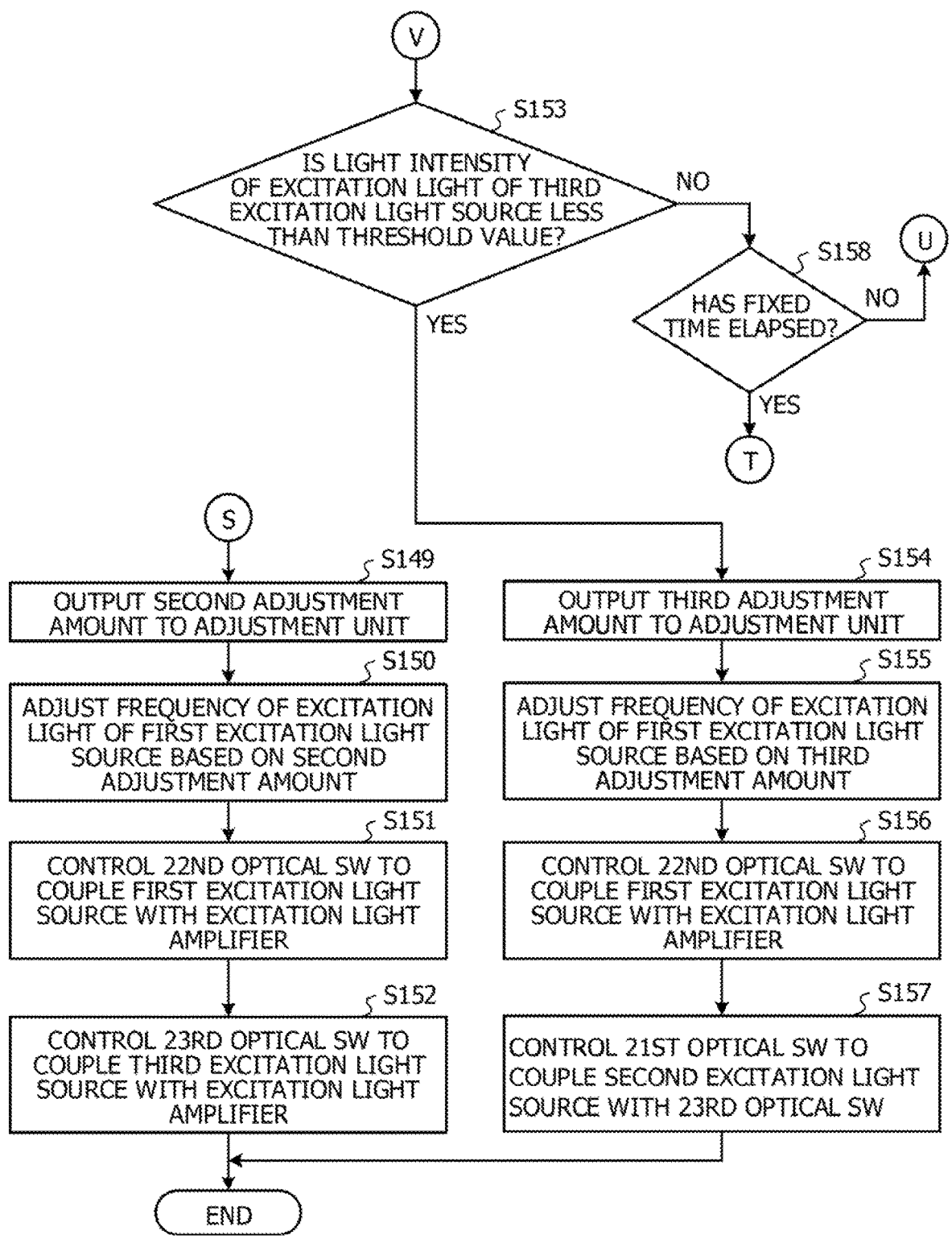

FIGS. 24A and 24B are flowcharts illustrating an example of a processing operation of a wavelength conversion device 3G related to eighth switching processing. The second excitation light source 11B and the third excitation light source 11C are operated, and the first excitation light source 11A is preliminary. In FIG. 24A, the control unit 20D in the wavelength conversion device 3G controls the 24th optical SW 27D to couple the first excitation light source 11A with the measurement unit 17D, and controls the 25th optical SW 27E to couple the second excitation light source 11B with the measurement unit 17D (Step S141). The measurement unit 17D measures the second frequency difference between the frequency of the first excitation light from the first excitation light source 11A and the frequency of the second excitation light from the second excitation light source 11B (Step S142). The measurement unit 17D holds the second adjustment amount before abnormality detection corresponding to the second frequency difference (Step S143).

The control unit 20D controls the 24th optical SW 27D to couple the first excitation light source 11A with the measurement unit 17D, and controls the 25th optical SW 27E to couple the third excitation light source 11C with the measurement unit 17D (Step S144). The measurement unit 17D measures the third frequency difference between the frequency of the first excitation light from the first excitation light source 11A and the frequency of the third excitation light from the third excitation light source 11C (Step S145). The measurement unit 17D holds the third adjustment amount before abnormality detection corresponding to the third frequency difference (Step S146).

The detection unit 18D monitors the light intensity of the excitation light of the second excitation light source 11B and the light intensity of the excitation light of the third excitation light source 11C (Step S147). The detection unit 18D determines whether the light intensity of the second excitation light is less than the threshold value (Step S148).

When the light intensity of the second excitation light is less than the threshold value (Step S148: Yes), the measurement unit 17D determines that the second excitation light is abnormal, and outputs the second adjustment amount to the adjustment unit 19D (Step S149). The adjustment unit 19D adjusts the frequency of the excitation light of the first excitation light source 11A based on the second adjustment amount (Step S150). As a result, the frequency of the first excitation light of the first excitation light source 11A becomes the same as the frequency of the second excitation light of the second excitation light source 11B before abnormality detection. The control unit 20D controls the 21st optical SW 27A to the 25th optical SW 27E so as to switch to a route of the first excitation light source 11A→the 22nd optical SW 27B→the excitation light amplifier 14 (Step S151). As a result, the first excitation light from the first excitation light source 11A is output instead of the second excitation light to the excitation light amplifier 14. The control unit 20D controls the 21st optical SW 27A to the 25th optical SW 27E while maintaining the route of the third excitation light source 11C→the 23rd optical SW 27C→the excitation light amplifier 14 (Step S152), and ends the processing operation illustrated in FIG. 24B.

When the light intensity of the second excitation light is not less than the threshold value (Step S148: No), the detection unit 18D determines that the second excitation light is normal and determines whether the light intensity of the third excitation light is less than the threshold value (Step S153). When the light intensity of the third excitation light is less than the threshold value (Step S153: Yes), the measurement unit 17D determines that the third excitation light is abnormal, and outputs the third adjustment amount to the adjustment unit 19D (Step S154). The adjustment unit 19D adjusts the frequency of the first excitation light of the first excitation light source 11A based on the third adjustment amount (Step S155). As a result, the frequency of the first excitation light of the first excitation light source 11A becomes the same as the frequency of the third excitation light of the third excitation light source 11C before abnormality detection. The control unit 20D controls the 21st optical SW 27A to the 25th optical SW 27E so as to switch to a route of the first excitation light source 11A→the 22nd optical SW 27B→the excitation light amplifier 14 (Step S156). As a result, the first excitation light is output instead of the third excitation light to the excitation light amplifier 14. The control unit 20D controls the 21st optical SW 27A to the 25th optical SW 27E while maintaining the route of the second excitation light source 11B→the 21st optical SW 27A→the 23rd optical SW 27C→the excitation light amplifier 14 (Step S157).

When the light intensity of the third excitation light is not less than the threshold value (Step S153: No), the detection unit 18D determines that the third excitation light is normal and determines whether a fixed time has elapsed (Step S158). In a case where a fixed time has elapsed (Step S158: Yes), the detection unit 18D proceeds to step S141 to control the 24th optical SW 27D and the 25th optical SW 27E. When a fixed time has not elapsed (Step S158: No), the detection unit 18D proceeds to step S147 to monitor the light intensity of the second excitation light and the third excitation light.

Figure 25A:
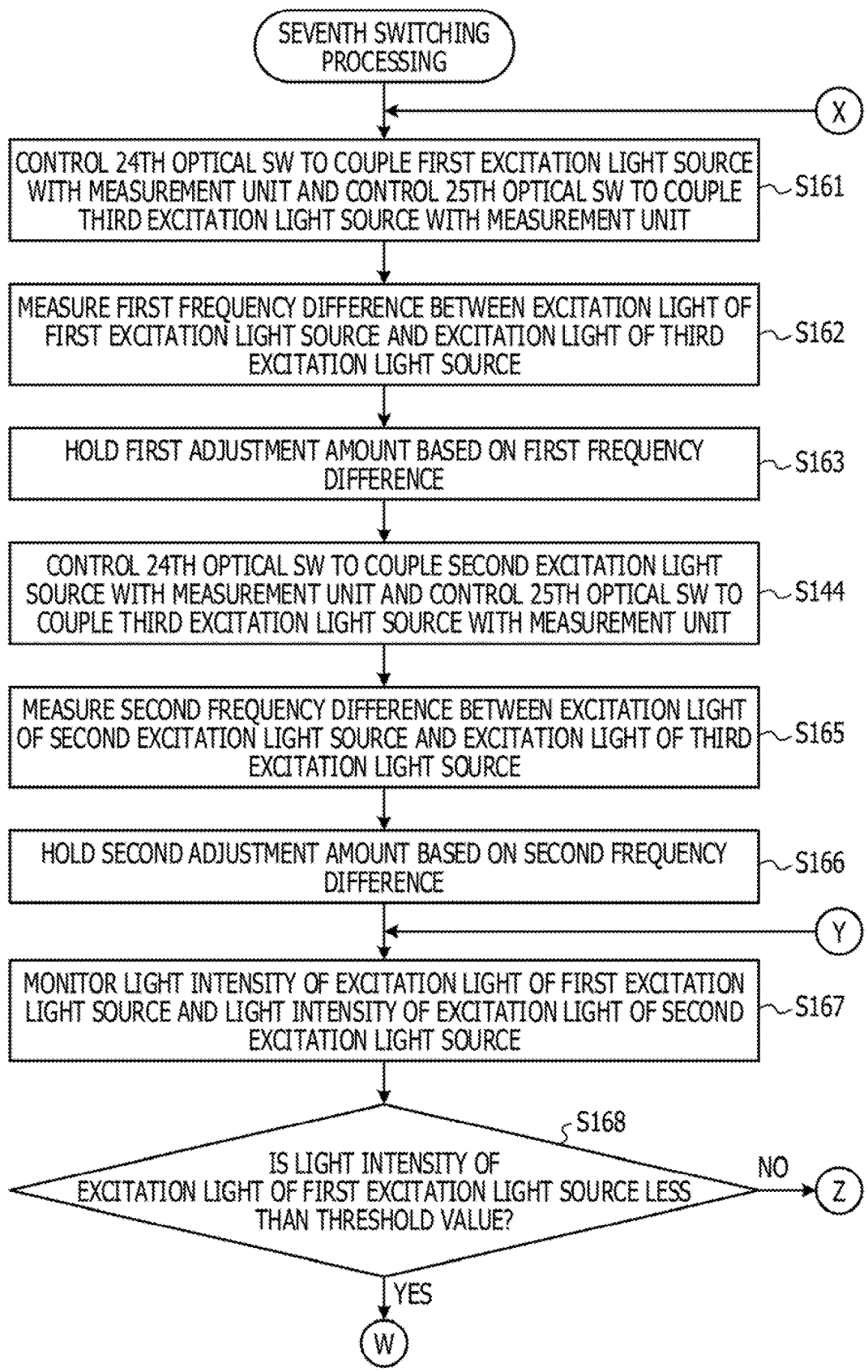
FIGS. 25A and 25B are flowcharts illustrating an example of a processing operation of a wavelength conversion device related to ninth switching processing.
Figure 25B:
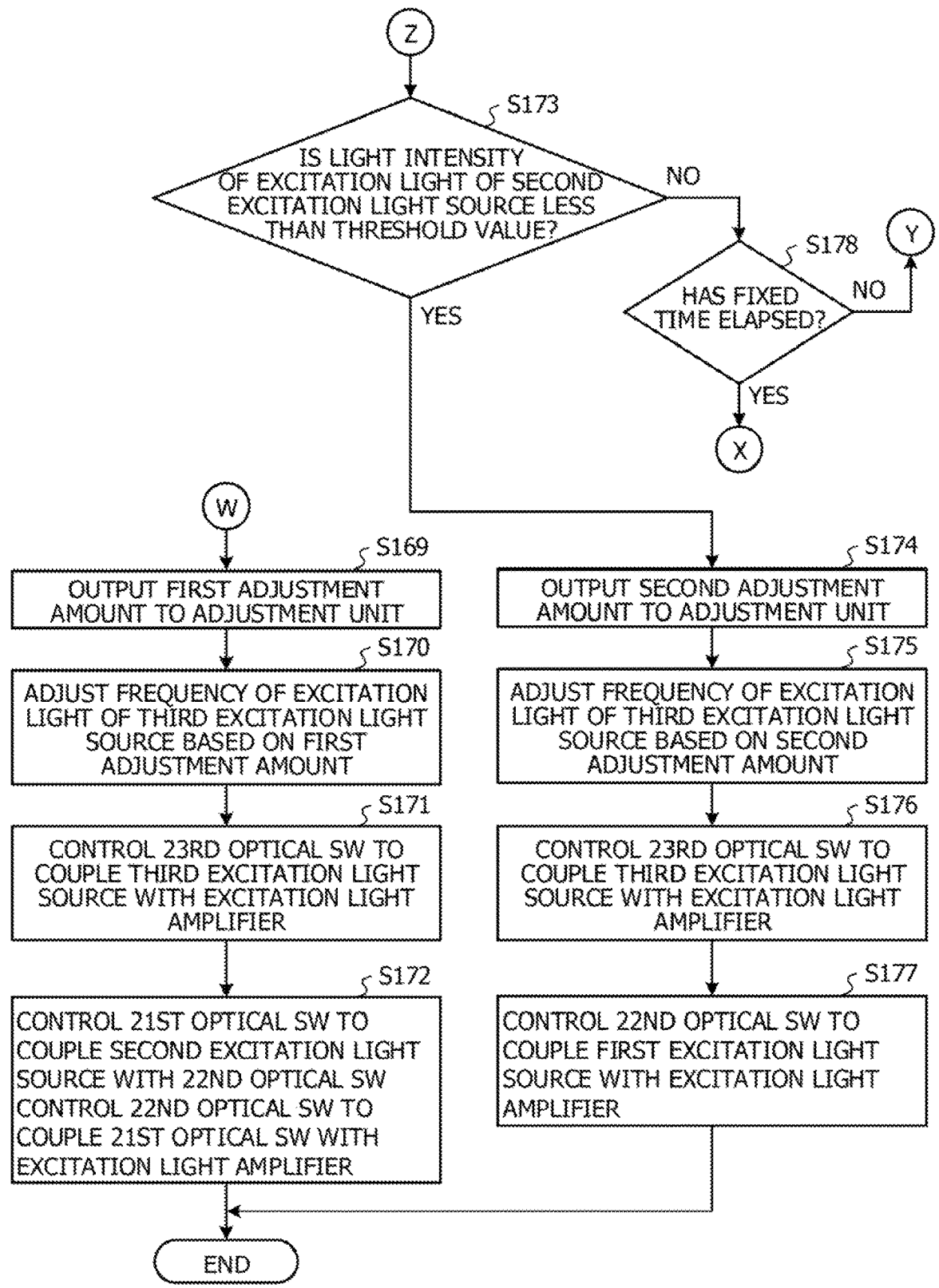

FIGS. 25A and 25B are flowcharts illustrating an example of a processing operation of a wavelength conversion device 3G related to ninth switching processing. The first excitation light source 11A and the second excitation light source 11B are operated, and the third excitation light source 11C is preliminary. In FIG. 25A, the control unit 20D in the wavelength conversion device 3G controls the 24th optical SW 27D to couple the first excitation light source 11A with the measurement unit 17D, and controls the 25th optical SW 27E to couple the third excitation light source 11C with the measurement unit 17D (Step S161). The measurement unit 17D measures the first frequency difference between the frequency of the first excitation light from the first excitation light source 11A and the frequency of the third excitation light from the third excitation light source 11C (Step S162). The measurement unit 17D holds the first adjustment amount before abnormality detection corresponding to the first frequency difference (Step S163).

Next, the control unit 20D controls the 24th optical SW 27D to couple the second excitation light source 11B with the measurement unit 17D, and controls the 25th optical SW 27E to couple the third excitation light source 11C with the measurement unit 17D (Step S164). The measurement unit 17D measures the second frequency difference between the frequency of the second excitation light from the second excitation light source 118 and the frequency of the third excitation light from the third excitation light source 11C (Step S165). The measurement unit 17D holds the second adjustment amount before abnormality detection corresponding to the second frequency difference (Step S166).

The detection unit 18D monitors the light intensity of the excitation light of the first excitation light source 11A and the light intensity of the excitation light of the second excitation light source 11B (Step S167). The detection unit 18D determines whether the light intensity of the first excitation light is less than the threshold value (Step S168).

When the light intensity of the first excitation light is less than the threshold value (Step S168: Yes), the measurement unit 17D determines that the first excitation light is abnormal, and outputs the first adjustment amount to the adjustment unit 19D (Step S169). The adjustment unit 19D adjusts the frequency of the excitation light of the third excitation light source 11C based on the first adjustment amount (Step S170). As a result, the frequency of the third excitation light of the third excitation light source 11C becomes the same as the frequency of the first excitation light before abnormality detection of the first excitation light source 11A. The control unit 20D controls the 21st optical SW 27A to the 25th optical SW 27E so as to switch to a route of the third excitation light source 11C→the 23rd optical SW 27C→the excitation light amplifier 14 (Step S171). As a result, the third excitation light from the third excitation light source 11C is output instead of the first excitation light to the excitation light amplifier 14. The control unit 20D controls the 21st optical SW 27A to the 25th optical SW 27E while maintaining the route of the second excitation light source 11B→the 21st optical SW 27A→the 22nd optical SW 27B→the excitation light amplifier 14 (Step S172), and ends the processing operation illustrated in FIG. 25B.

When the light intensity of the first excitation light is not less than the threshold value (Step S168: No), the detection unit 18D determines that the first excitation light is normal and determines whether the light intensity of the second excitation light is less than the threshold value (Step S173). When the light intensity of the second excitation light is less than the threshold value (Step S173: Yes), the measurement unit 17D determines that the second excitation light is abnormal, and outputs the second adjustment amount to the adjustment unit 19D (Step S174). The adjustment unit 19D adjusts the frequency of the excitation light of the third excitation light source 11C based on the second adjustment amount (Step S175). As a result, the frequency of the third excitation light of the third excitation light source 11C becomes the same as the frequency of the third excitation light of the first excitation light source 11A before abnormality detection. The control unit 20D controls the 21st optical SW 27A to the 25th optical SW 27E so as to switch to a route of the third excitation light source 11C→the 23rd optical SW 27C→the excitation light amplifier 14 (Step S176). As a result, the third excitation light is output instead of the second excitation light to the excitation light amplifier 14. The control unit 20D controls the 21st optical SW 27A to the 25th optical SW 27E while maintaining the route of the second excitation light source 11B→the 21st optical SW 27A→the 22nd optical SW 27B→the excitation light amplifier 14 (Step S177).

When the light intensity of the second excitation light is not less than the threshold value (Step S173: No), the detection unit 18D determines that the second excitation light is normal and determines whether a fixed time has elapsed (Step S178). In a case where a fixed time has elapsed (Step S178: Yes), the detection unit 18D proceeds to step S161 to control the 24th optical SW 27D and the 25th optical SW 27E. When a fixed time has not elapsed (Step S178: No), the detection unit 18D proceeds to step S167 to monitor the light intensity of the first excitation light and the light intensity of the second excitation light.

In the wavelength conversion device 3G of Example 6, in a case where the excitation light in operation is the first and second excitation light, the preliminary excitation light is the third excitation light, and an abnormality of the first excitation light is detected, the third excitation light is adjusted according to the first adjustment amount and the first excitation light in which an abnormality is detected is switched to the adjusted third excitation light. As a result, in the WDM device 2, communication may be continued without interruption even when the excitation light in operation is abnormal by suppressing the frequency deviation of the excitation light, that is, by aligning the frequencies between the excitation light beams, thereby avoiding reception error.

In a case where the excitation light in operation is the first and second excitation light, the preliminary excitation light is the third excitation light, and an abnormality of the second excitation light is detected, the wavelength conversion device 3G adjusts the third excitation light according to the second adjustment amount, and switches the second excitation light in which an abnormality is detected to the adjusted third excitation light. As a result, in the WDM device 2, by aligning the frequencies between the excitation light beams, communication may be continued without interruption even when the excitation light in operation is abnormal, thereby avoiding reception error.

In a case where the excitation light in operation is the first and third excitation light, the preliminary excitation light is the second excitation light, and an abnormality of the first excitation light is detected, the wavelength conversion device 3G adjusts the second excitation light according to the first adjustment amount, and switches the first excitation light in which an abnormality is detected to the adjusted second excitation light. As a result, in the WDM device 2, by aligning the frequencies between the excitation light beams, communication may be continued without interruption even when the excitation light in operation is abnormal, thereby avoiding reception error.

In a case where the excitation light in operation is the first and third excitation light, the preliminary excitation light is the second excitation light, and an abnormality of the third excitation light is detected, the wavelength conversion device 3G adjusts the second excitation light according to the third adjustment amount, and switches the third excitation light in which an abnormality is detected to the adjusted second excitation light. As a result, in the WDM device 2, by aligning the frequencies between the excitation light beams, communication may be continued without interruption even when the excitation light in operation is abnormal, thereby avoiding reception error.

In a case where the excitation light in operation is the second and third excitation light, the preliminary excitation light is the first excitation light, and an abnormality of the second excitation light is detected, the wavelength conversion device 3G adjusts the first excitation light according to the second adjustment amount, and switches the second excitation light in which an abnormality is detected to the adjusted first excitation light. As a result, in the WDM device 2, by aligning the frequencies between the excitation light beams, communication may be continued without interruption even when the excitation light in operation is abnormal, thereby avoiding reception error.

In a case where the excitation light in operation is the second and third excitation light, the preliminary excitation light is the first excitation light, and an abnormality of the third excitation light is detected, the wavelength conversion device 3G adjusts the first excitation light according to the third adjustment amount, and switches the third excitation light in which an abnormality is detected to the adjusted first excitation light. As a result, in the WDM device 2, by aligning the frequencies between the excitation light beams, communication may be continued without interruption even when the excitation light in operation is abnormal, thereby avoiding reception error.

Example 7

Figure 26:
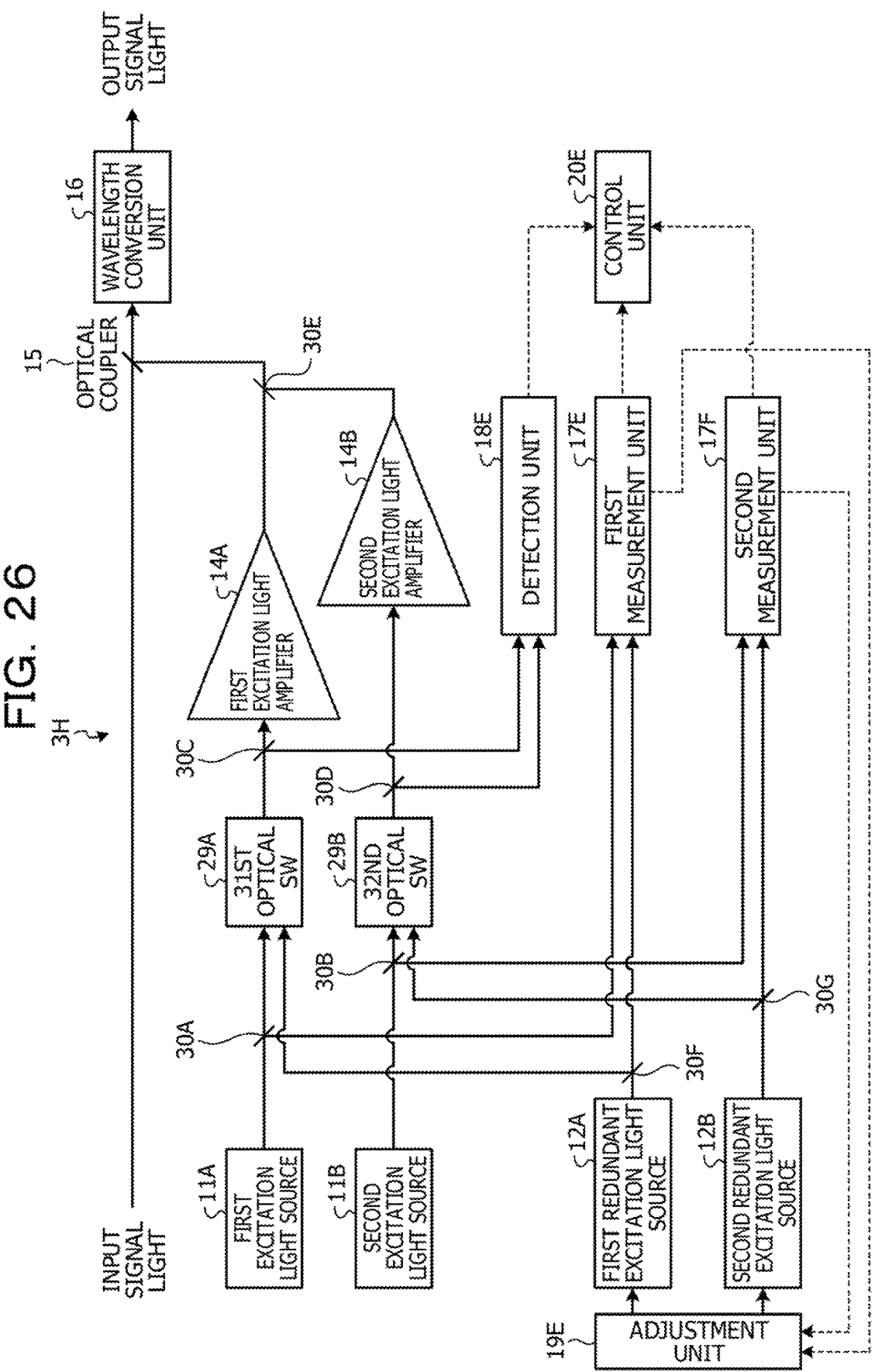
FIG. 26 is an explanatory diagram illustrating an example of a wavelength conversion device of Example 7.

FIG. 26 is an explanatory diagram illustrating an example of a wavelength conversion device 3H of Example 7. The same components as those in Example are denoted by the same reference numerals, and the description of the overlapping configuration and operation is omitted. In FIG. 26, the wavelength conversion device 3H includes the first excitation light source 11A, the second excitation light source 11B, the first redundant excitation light source 12A, the second redundant excitation light source 12B, the 31st optical SW 29A, and the 32nd optical SW 29B. The wavelength conversion device 3H includes the first excitation light amplifier 14A and the second excitation light amplifier 14B, a first measurement unit 17E, a second measurement unit 17F, a detection unit 18E, an adjustment unit 19E, and a control unit 20E.

The first excitation light source 11A emits first excitation light. The second excitation light source 11B emits second excitation light. The first redundant excitation light source 12A emits a first preliminary excitation light instead of the first excitation light. The second redundant excitation light source 12B emits a second preliminary excitation light instead of the second excitation light.

The 31st optical SW 29A is disposed between the first excitation light source 11A and the first redundant excitation light source 12A, and the first excitation light amplifier 14A, and outputs the first excitation light from the first excitation light source 11A or the first redundant excitation light source 12A to the first excitation light amplifier 14A. The 32nd optical SW 29B is disposed between the second excitation light source 11B and the second redundant excitation light source 12B, and the second excitation light amplifier 14B, and outputs the second excitation light from the second excitation light source 11B or the second redundant excitation light source 12B to the second excitation light amplifier 14B.

The wavelength conversion device 3H includes the 31st optical coupler 30A to the 37th optical coupler 30G. The 31st optical coupler 30A is disposed between the first excitation light source 11A, and the 31st optical SW 29A and the first measurement unit 17E, and branches and outputs the first excitation light from the first excitation light source 11A to the 31st optical SW 29A and the first measurement unit 17E. The 32nd optical coupler 30B is disposed between the second excitation light source 11B, and the 32nd optical SW 29B and the second measurement unit 17F, and branches and outputs the second excitation light from the second excitation light source 11B to the 32nd optical SW 29B and the second measurement unit 17F.

The 33rd optical coupler 30C is disposed between the 31st optical SW 29A, and the first excitation light amplifier 14A and the detection unit 18E, and branches and outputs the first excitation light from the 31st optical SW 29A to the first excitation light amplifier 14A and the detection unit 18E. The 34th optical coupler 30D is disposed between the 32nd optical SW 29B, and the second excitation light amplifier 14B and the detection unit 18E, and branches and outputs the second excitation light from the 32nd optical SW 29B to the second excitation light amplifier 14B and the detection unit 18E. The 35th optical coupler 30E is disposed between the first excitation light amplifier 14A and the second excitation light amplifier 14B, and the optical coupler 15. The 35th optical coupler 30E multiplexes the first excitation light from the first excitation light amplifier 14A and the second excitation light from the second excitation light amplifier 14B, and outputs the multiplexed excitation light to the optical coupler 15.

The 36th optical coupler 30F is disposed between the first redundant excitation light source 12A, and the 31st optical SW 29A and the first measurement unit 17E, and branches and outputs the first excitation light from the first redundant excitation light source 12A to the 31st optical SW 29A and the first measurement unit 17E. The 37th optical coupler 30G is disposed between the second redundant excitation light source 12B, and the 32nd optical SW 29B and the second measurement unit 17F, and branches and outputs the second excitation light from the second redundant excitation light source 12B to the 32nd optical SW 29B and the second measurement unit 17F.

The detection unit 18E determines whether the light intensity of the first excitation light via the 33rd optical coupler 30C or the light intensity of the second excitation light via the 34th optical coupler 30D is less than the threshold value. The detection unit 18E determines that the excitation light is abnormal when the light intensity of the excitation light is less than the threshold value. When it is determined that the excitation light is abnormal, the control unit 20E switches the first excitation light source 11A to the first redundant excitation light source 12A, and controls the 31st optical SW 29A and the 32nd optical SW 29B so as to switch the second excitation light source 11B to the second redundant excitation light source 12B.

The first measurement unit 17E measures the first frequency difference between the frequency of the first excitation light via the 31st optical coupler 30A and the frequency of the first preliminary excitation light via the 36th optical coupler 30F. The first measurement unit 17E outputs the first adjustment amount corresponding to the first frequency difference to the adjustment unit 19E.

The second measurement unit 17F measures a second frequency difference between the frequency of the second excitation light via the 32nd optical coupler 30B and the frequency of the second preliminary excitation light via the 37th optical coupler 30G. The second measurement unit 17F outputs a second adjustment amount corresponding to the second frequency difference to the adjustment unit 19E.

The adjustment unit 19E adjusts the frequency of the first excitation light of the first redundant excitation light source 12A based on the first adjustment amount, and adjusts the frequency of the second excitation light of the second redundant excitation light source 12B based on the second adjustment amount.

Figure 27A:
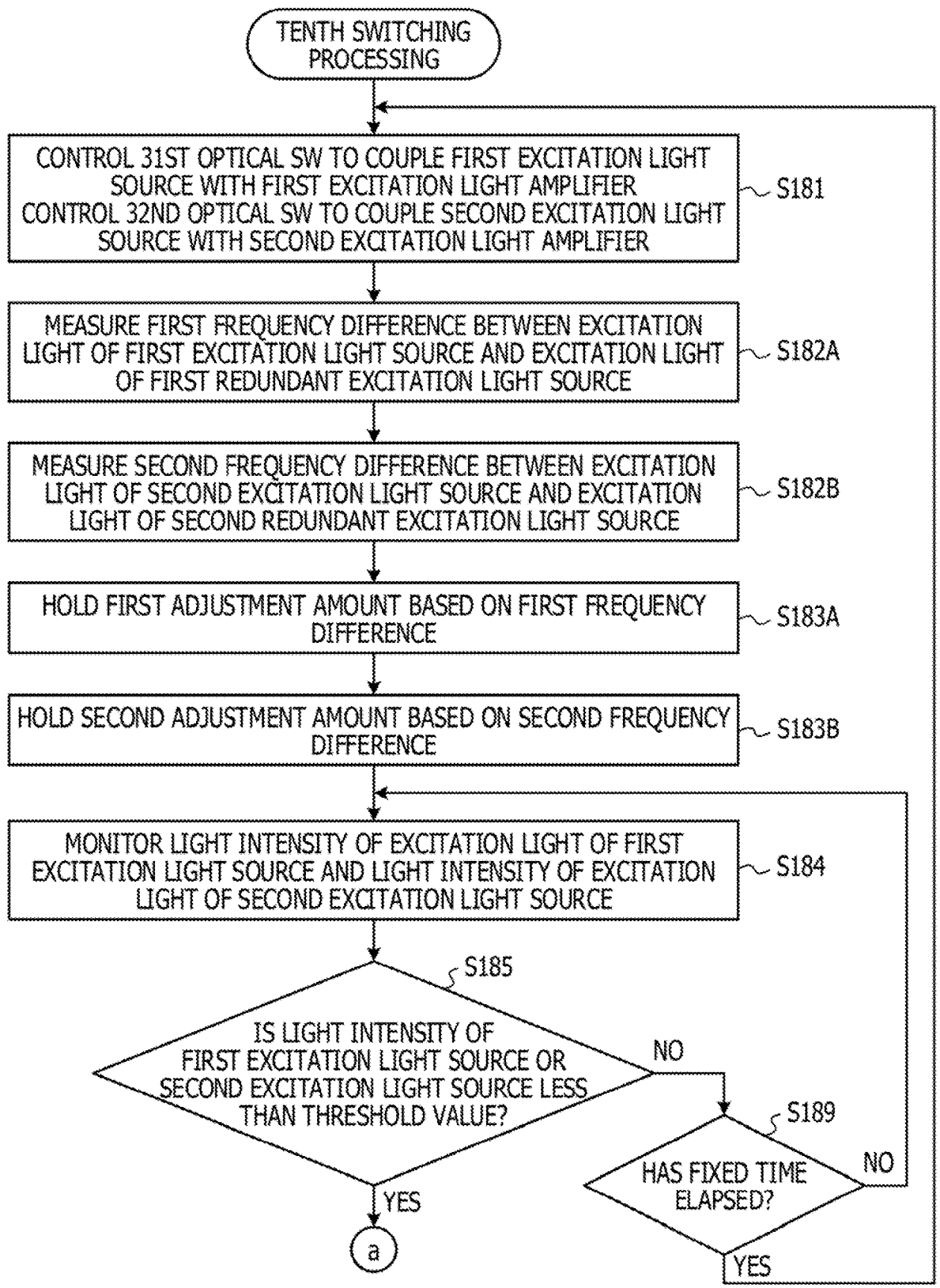
FIGS. 27A and 27B are flowcharts illustrating an example of a processing operation of a wavelength conversion device related to tenth switching processing.
Figure 27B:
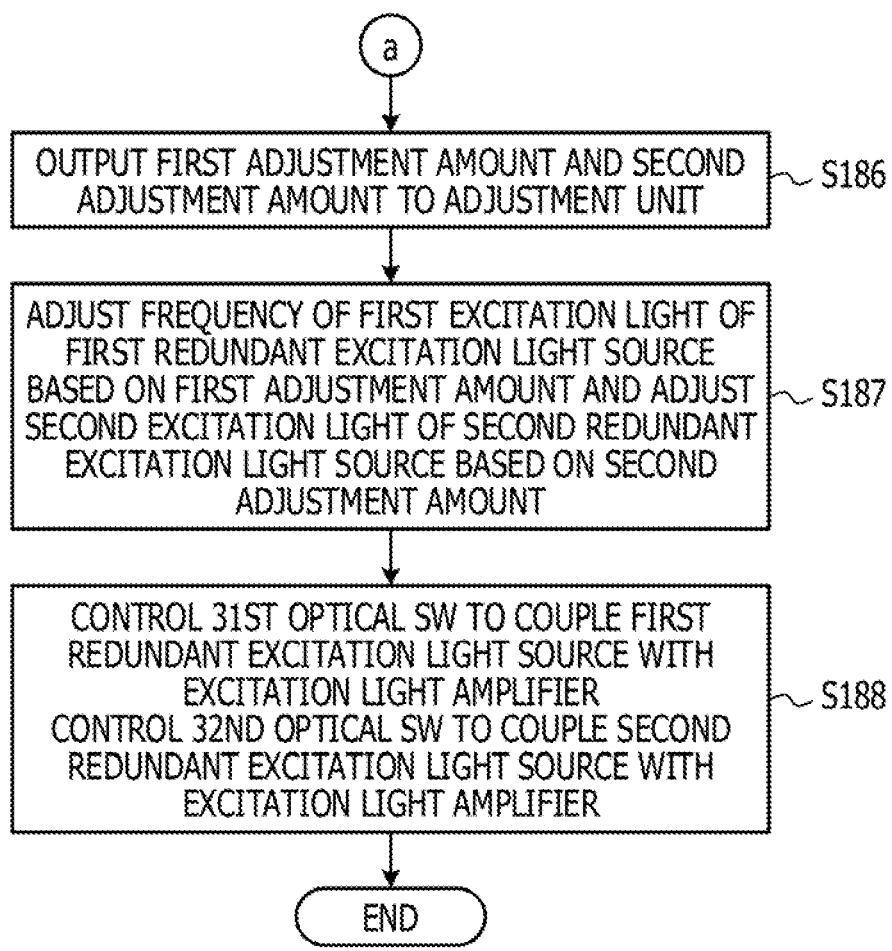

The operation of the WDM system 1 according to Example 7 will be explained below. FIGS. 27A and 27B are flowcharts illustrating an example of a processing operation of a wavelength conversion device 3G related to tenth switching processing. The control unit 20E controls the 31st optical SW 29A to couple the first excitation light source 11A with the first excitation light amplifier 14A, and controls the 32nd optical SW 29B to couple the second excitation light source 11B with the second excitation light amplifier 14B (Step S181). The first measurement unit 17E measures the first frequency difference between the frequency of the excitation light from the first excitation light source 11A and the frequency of the first preliminary excitation light from the first redundant excitation light source 12A (Step S182A). The second measurement unit 17F measures the second frequency difference between the frequency of second the excitation light from the second excitation light source 11B and the frequency of the second preliminary excitation light from the second redundant excitation light source 12B (Step S182B).

The first measurement unit 17E holds the first adjustment amount before abnormality detection corresponding to the first frequency difference (Step S183A). The second measurement unit 17F holds the second adjustment amount before abnormality detection corresponding to the second frequency difference (Step S183B).

The detection unit 18E monitors the light intensities of the first excitation light of the first excitation light source 11A and the light intensity of the excitation light of the second excitation light of the second excitation light source 11B (Step S184). The detection unit 18E determines whether the light intensity of the first excitation light or the second excitation light is less than the threshold value (Step S185).

When the light intensity of the first excitation light or the light intensity of the second excitation light is less than the threshold value (Step S185: Yes), the first measurement unit 17E determines that the first excitation light or the second excitation light is abnormal, and outputs the first adjustment amount and the second adjustment amount to the adjustment unit 19E (Step S186). The adjustment unit 19E adjusts the frequency of the first excitation light of the first redundant excitation light source 12A based on the first adjustment amount, and adjusts the frequency of the second excitation light of the second redundant excitation light source 12B based on the second adjustment amount (Step S187). As a result, the frequency of the first excitation light of the first redundant excitation light source 12A becomes the same as the frequency of the first excitation light of the first excitation light source 11A before abnormality detection. The frequency of the second excitation light of the second redundant excitation light source 12B becomes the same as the frequency of the second excitation light before abnormality detection of the second excitation light source 11B. The control unit 20E controls the 31st optical SW 29A so as to switch to a route of the first redundant excitation light source 12A→the 31st optical SW 29A→the first excitation light amplifier 14A. The control unit 20E controls the 32nd optical SW 29B so as to switch to a route of the second redundant excitation light source 12B→the 32nd optical SW 29B→the second excitation light amplifier 14B (Step S188). As a result, the first preliminary excitation light from the first redundant excitation light source 12A is output instead of the first excitation light to the first excitation light amplifier 14A. The second excitation light from the second redundant excitation light source 12B is output instead of the second excitation light to the second excitation light amplifier 148.

When the light intensity of the first excitation light or the light intensity of the second excitation light is not less than the threshold value (Step S185: No), the detection unit 18E determines that the first excitation light or the second excitation light is normal, and determines whether a fixed time has elapsed (Step S189). In a case where a fixed time has elapsed (Step S189: Yes), the detection unit 18E proceeds to step S181 to control the 31st optical SW 29A and the 32nd optical SW 29B. When a fixed time has not elapsed (Step S189: No), the detection unit 18E proceeds to step S184 to monitor the light intensity of the first excitation light and the second excitation light.

In the wavelength conversion device 3H of Example 7, when an abnormality is detected in any one of the first excitation light of the first excitation light source 11A, the first excitation light of the second excitation light source 11B, the second excitation light of the first excitation light source 11A, and the second excitation light of the second excitation light source 118, the first preliminary excitation light is adjusted according to the first adjustment amount, and the second preliminary excitation light is adjusted according to the second adjustment amount. The wavelength conversion device 3H collectively switches the first excitation light source 11A and the second excitation light source 11B to the adjusted first redundant excitation light source 12A and the adjusted second redundant excitation light source 12B. As a result, in the WDM device 2, communication may be continued without interruption even when the excitation light in operation is abnormal by suppressing the frequency deviation of the excitation light, that is, by aligning the frequencies between the excitation light beams, thereby avoiding reception error.

In the detection unit 18 of Example 1, a case where the detection unit 18 determines whether the light intensity of the excitation light in operation is equal to or less than the threshold value, and determines that the excitation light is abnormal when the light intensity of the excitation light is determined to be equal to or less than the threshold value is described, but not limited to this. Therefore, an embodiment thereof will be described below as Example 8.

Example 8

Figure 28:
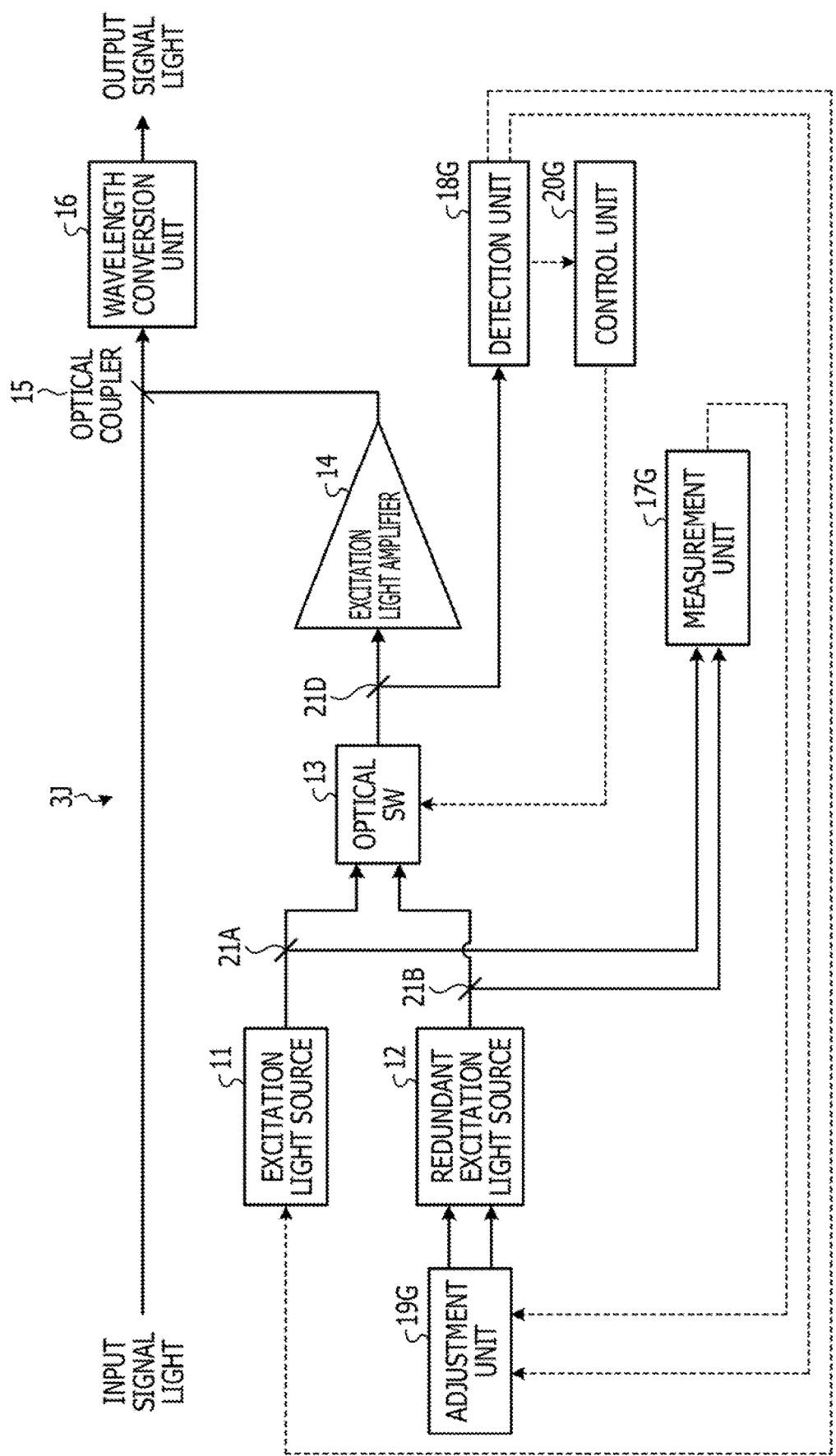
FIG. 28 is an explanatory diagram illustrating an example of a wavelength conversion device of Example 8.

FIG. 28 is an explanatory diagram illustrating an example of a wavelength conversion device 33 of Example 8. The same components as those in the wavelength conversion device 3 of Example 1 are denoted by the same reference numerals, and the description of the overlapping configuration and operation is omitted. The wavelength conversion device 33 illustrated in FIG. 28 includes a fourth optical coupler 21D, a measurement unit 17, a detection unit 18G, an adjustment unit 19G, and a control unit 20G. The fourth optical coupler 21D is disposed between the optical SW 13, and the excitation light amplifier 14 and the detection unit 18G, and is a switch that branches and outputs the excitation light from the optical SW 13 to the excitation light amplifier 14 and the detection unit 18G.

Figure 29:
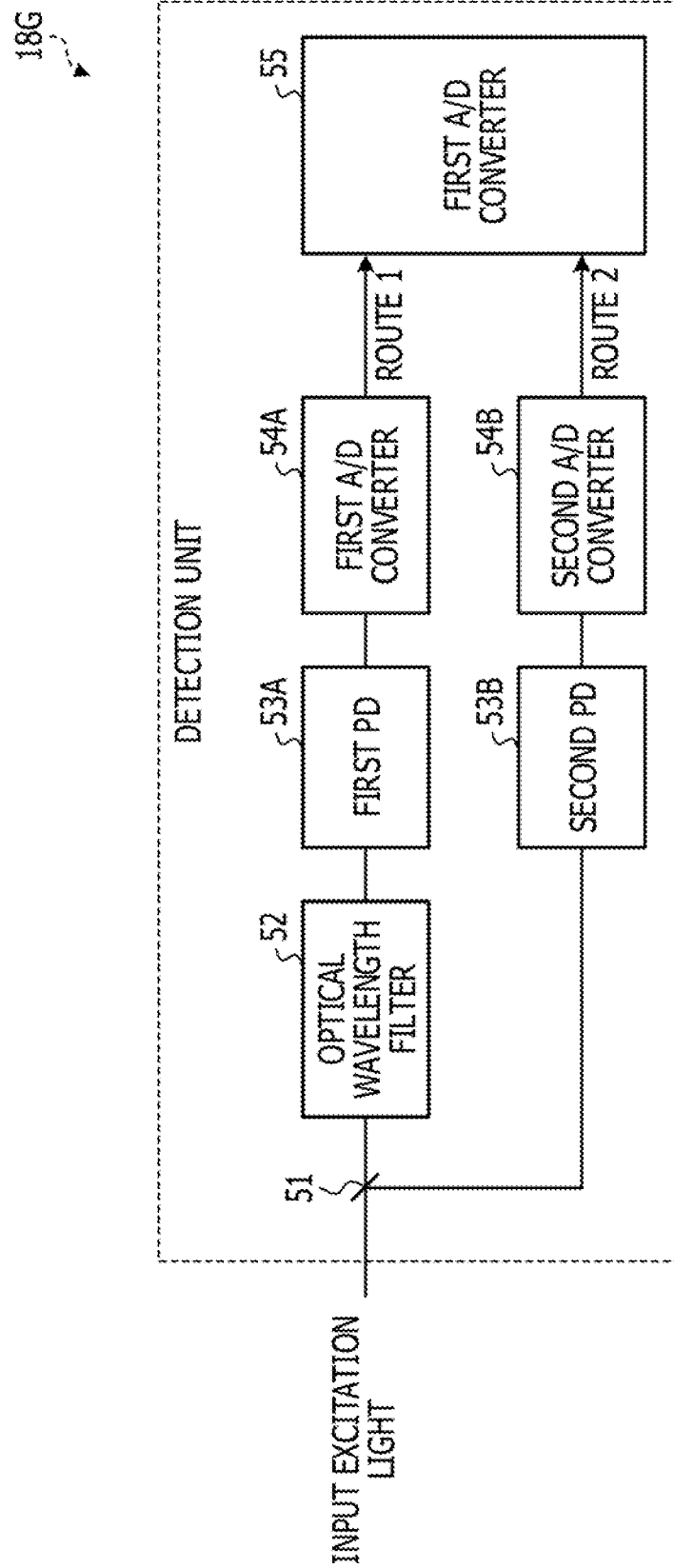
FIG. 29 is an explanatory diagram illustrating an example of a detection unit of Example 8.

FIG. 29 is an explanatory diagram illustrating an example of a detection unit 18G of Example 8. The detection unit 18G illustrated in FIG. 28 includes an optical coupler 51, an optical wavelength filter 52, a first PD 53A, a second PD 53B, a first A/D converter 54A, a second A/D converter 54B, and a first abnormality detection unit 55.

The optical coupler 51 branches and outputs the excitation light from the fourth optical coupler 21D to the optical wavelength filter 52 and the second PD 53B. The optical wavelength filter 52 is a transmission wavelength for transmitting the normal excitation light of the excitation light source 11, transmits the normal excitation light branched by the optical coupler 51 to output to the first PD 53A. The first PD 53A electrically converts the transmitted excitation light, and outputs a first excitation light signal after electrical conversion to the first A/D converter 54A. The first A/D converter 54A digitally converts the first excitation light signal and outputs an output level of the first excitation light signal after digital conversion to the first abnormality detection unit 55 as an output level of a route 1. In the route 1, since the optical wavelength filter 52 is present, the output level is reduced when the frequency deviation occurs.

The second PD 53B electrically converts the excitation light branched by the optical coupler 51, and outputs the second excitation light signal after electrical conversion to the second A/D converter 54B. The second A/D converter 54B digitally converts the second excitation light signal and outputs an output level of the second excitation light signal after digital conversion to the first abnormality detection unit 55 as an output level of a route 2. In the route 2, since the optical wavelength filter 52 is not present, the output level is not changed even when the frequency deviation occurs. For example, when the frequency deviation of the excitation light is generated, the output level of only route 1 is reduced, and when the output level is reduces, the output level is reduced in the route 1 and the route 2.

The first abnormality detection unit 55 outputs an abnormality detection result based on the output level of the route 1, the output level of the route 2, and an output level difference (route 1-route 2). FIG. 30 is an explanatory diagram illustrating an example of a determination result of an abnormality detection. When the output level of the route 1 and the output level of the route 2 are reduced by 3 dB and the output level difference is 0, the first abnormality detection unit 55 determines an abnormality of an output reduction of the excitation light.

When the output level of the route 1 is reduced by 2 dB, the output level of the route 2 is 0 dB, and the output level difference is 2 dB or less, the first abnormality detection unit 55 determines an abnormality of the frequency deviation of the excitation light. When the output level of the route 1 is reduced by 5 dB, the output level of the route 2 is reduced by 3 dB, and the output level difference is 2 dB, the first abnormality detection unit 55 determines an output reduction of the excitation light and an abnormality of the frequency deviation.

The measurement unit 17 measures the frequency difference between the excitation light in operation from the excitation light source 11 via the first optical coupler 21A, and the excitation light from the redundant excitation light source 12 via the second optical coupler 21B. The measurement unit 17 calculates an adjustment amount according to the frequency difference, and outputs the calculated adjustment amount to the adjustment unit 19G. The adjustment amount is an adjustment amount for aligning the frequency of the excitation light from the redundant excitation light source 12 with the frequency of the excitation light from the excitation light source 11 before abnormality detection.

The detection unit 18G detects the light intensity of the excitation light via the fourth optical coupler 21D, and determines whether an abnormality of the excitation light is detected, based on the light intensity. The detection unit 18G determines an abnormality of the frequency deviation, based on the output levels of the route 1 and route 2 of the excitation light. When an abnormality based on the light intensity of the excitation light is detected, the detection unit 18G outputs an abnormality of the excitation light to the adjustment unit 19G and the control unit 20G. When an abnormality based on the light intensity of the excitation light is detected, the adjustment unit 19G adjusts the frequency of the excitation light from the redundant excitation light source 12 according to the adjustment amount. As a result, the redundant excitation light source 12 emits the adjusted excitation light having the same frequency as the excitation light of the excitation light source 11 before the abnormality detection. When an abnormality of the excitation light is detected, the optical SW 13 switches the input from the excitation light source 11 to the excitation light of the redundant excitation light source 12.

When an abnormality of the frequency deviation is detected, the detection unit 18G outputs an abnormality of the excitation light to the adjustment unit 19G and the control unit 20G. When an abnormality of the frequency deviation of the excitation light is detected, the adjustment unit 19G adjusts the frequency of the excitation light from the redundant excitation light source 12 according to the adjustment amount. As a result, the redundant excitation light source 12 emits the adjusted excitation light having the same frequency as the excitation light of the excitation light source 11 before the abnormality detection. When an abnormality of the excitation light is detected, the optical SW 13 switches the input from the excitation light source 11 to the excitation light of the redundant excitation light source 12.

Figure 31:
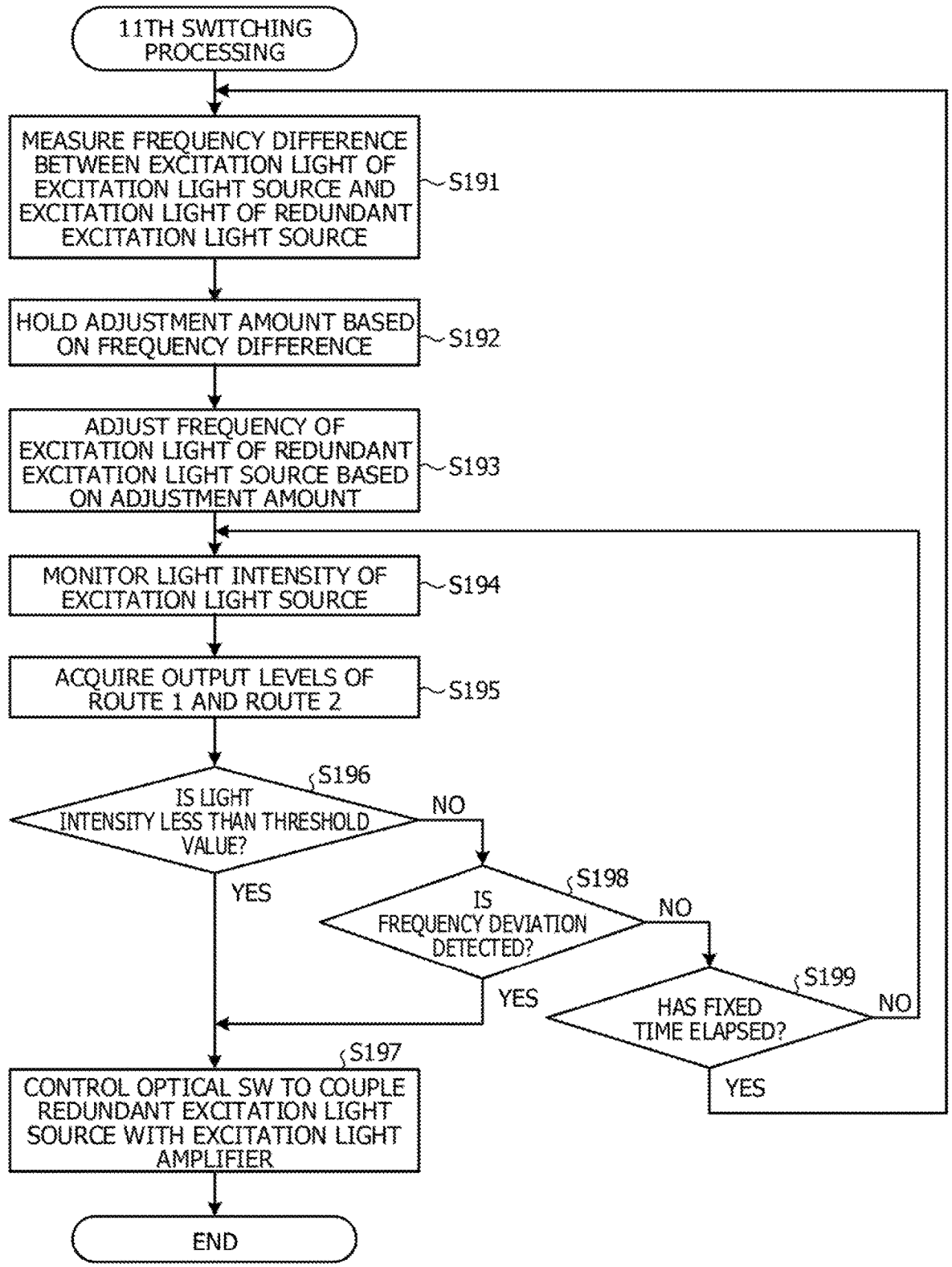
FIG. 31 is a flowchart illustrating an example of a processing operation of a wavelength conversion device related to 11th switching processing.

FIG. 31 is a flowchart illustrating an example of a processing operation of a wavelength conversion device 33 related to 11th switching processing. In FIG. 31, the measurement unit 17 in the wavelength conversion device 33 measures the frequency difference between the frequency of excitation light from the excitation light source 11 and the frequency of excitation light from the redundant excitation light source 12 (Step S191). The measurement unit 17 outputs the adjustment amount before abnormality detection to the adjustment unit 19G based on the frequency difference (Step S192).

The adjustment unit 19G adjusts the frequency of the preliminary excitation light of the redundant excitation light source 12 based on the adjustment amount (Step S193). As a result, the frequency of the preliminary excitation light of the redundant excitation light source 12 becomes the same as the frequency of the excitation light of the excitation light source 11. The detection unit 18G monitors the light intensity of the excitation light of the excitation light source 11 (Step S194). The detection unit 18G acquires output levels of the route 1 and the route 2 (Step S195). The detection unit 18G determines whether the light intensity of the excitation light is less than the threshold value (Step S196). The threshold value is the threshold value of the light intensity for detecting an abnormality of the excitation light.

The control unit 20G determines that the excitation light is abnormal when the light intensity of the excitation light is less than the threshold value (Step S196: Yes), controls the optical SW 13 to switch and couple the redundant excitation light source 12 to the excitation light amplifier 14 (Step S197), and ends the processing operation illustrated in FIG. 31. As a result, the excitation light amplifier 14 inputs the adjusted preliminary excitation light from the redundant excitation light source 12, amplifies the adjusted preliminary excitation light to output to the optical coupler 15.

When the light intensity is not less than the threshold value (Step S196: No), the detection unit 18G determines whether the frequency deviation is detected based on the output levels of the route 1 and the route 2 (Step S198). When the frequency deviation is detected (Step S198: Yes), the control unit 20G proceeds to step S197 to control the optical SW 13. When the frequency deviation is not detected (Step S198: No), detection unit 18G determines whether a fixed time has elapsed (Step S199). When a fixed time has elapsed (Step S199: Yes), the detection unit 18G proceeds to step S191 to measure a frequency difference between the excitation light source 11 and the redundant excitation light source 12. When a fixed time has not elapsed (Step S199: No), the detection unit 18G proceeds to step S194 to monitor the light intensity of the excitation light.

In the wavelength conversion device 33 of Example 8, the frequency difference between the excitation light in operation from the excitation light source 11 and preliminary excitation light from the redundant excitation light source 12 is measured. Based on the comparison result between the excitation light in operation after passing through the optical wavelength filter 52 and the excitation light in operation before passing through the optical wavelength filter 52, the wavelength conversion device 33 detects the light intensity reduction of the excitation light in operation or the frequency deviation. When the light intensity of the excitation light in operation is less than the threshold value or the frequency deviation of the excitation light in operation is detected, the wavelength conversion device 33 determines abnormality of the excitation light in operation. When an abnormality of the excitation light in operation is determined, the wavelength conversion device 3J adjusts the frequency of the preliminary excitation light to the frequency of the excitation light in operation before abnormality detection, based on the adjustment amount corresponding to the frequency difference before abnormality detection. After adjusting the frequency of the preliminary excitation light, the wavelength conversion device 33 aligns the frequency of the preliminary excitation light with the frequency of the excitation light in operation before abnormality detection, and switches from the excitation light source 11 to the redundant excitation light source 12. As a result, in the WDM device 2, communication may be continued without interruption even when the excitation light in operation is abnormal by suppressing the frequency deviation of the excitation light, that is, by aligning the frequencies between the excitation light beams, thereby avoiding reception error.

Example 9

Figure 32:
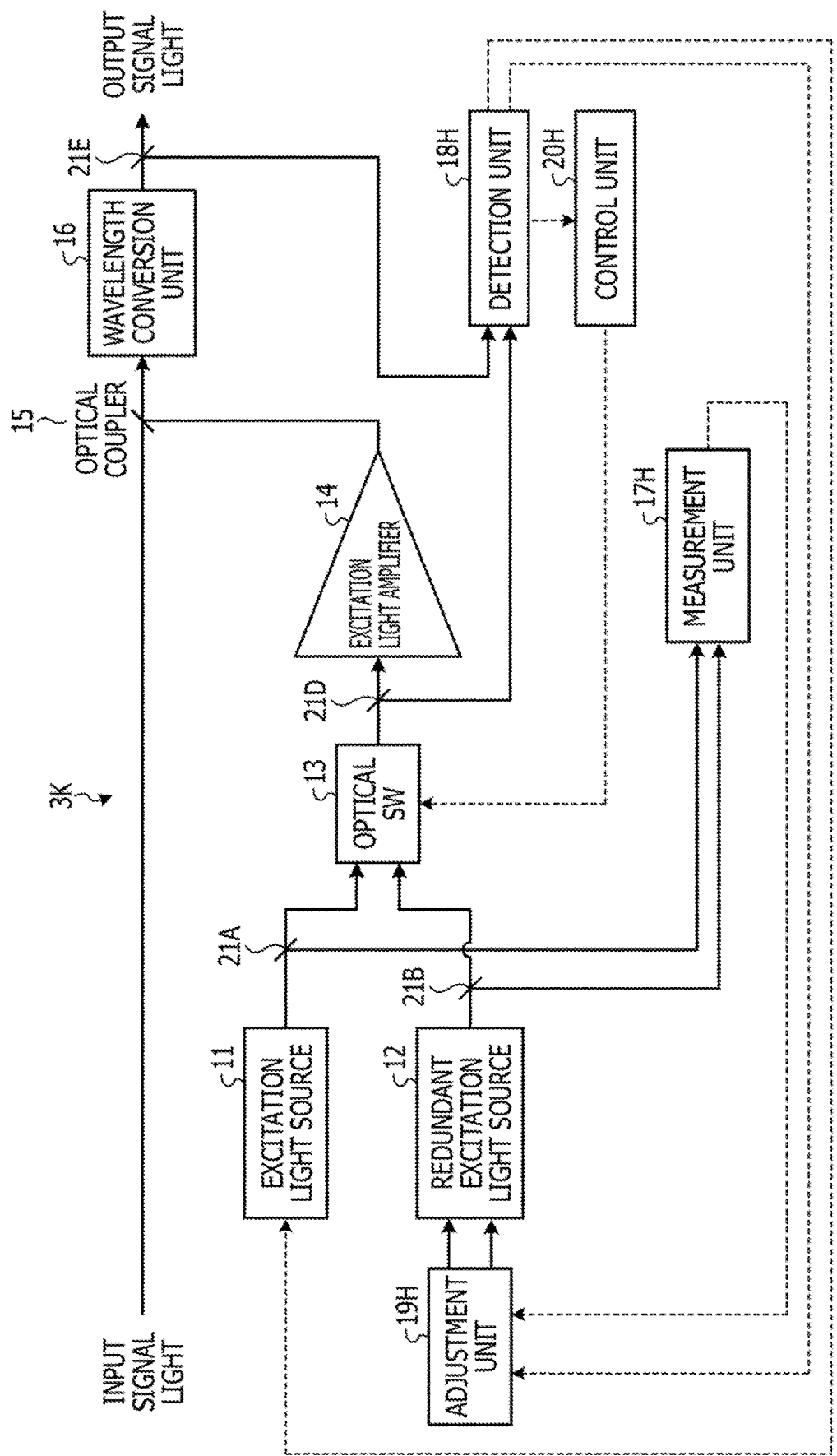
FIG. 32 is an explanatory diagram illustrating an example of a wavelength conversion device of Example 9.

FIG. 32 is an explanatory diagram illustrating an example of a wavelength conversion device 3K of Example 9. The same components as those in the WDM system 1 of Example 1 are denoted by the same reference numerals, and the description of the overlapping configuration and operation is omitted. The difference between the wavelength conversion device 3 of Example 1 and the wavelength conversion device 3K of Example 9 is that, in the wavelength conversion device 3 of Example 1, the fifth optical coupler 21E is disposed at the subsequent stage of the wavelength conversion unit 16, and the signal light after wavelength conversion is branched and output from the fifth optical coupler 21E to the detection unit 18H and the output stage. The wavelength conversion device 3K illustrated in FIG. 32 includes the measurement unit 17, the detection unit 18H, the adjustment unit 19H, and the control unit 20H.

Figure 33:
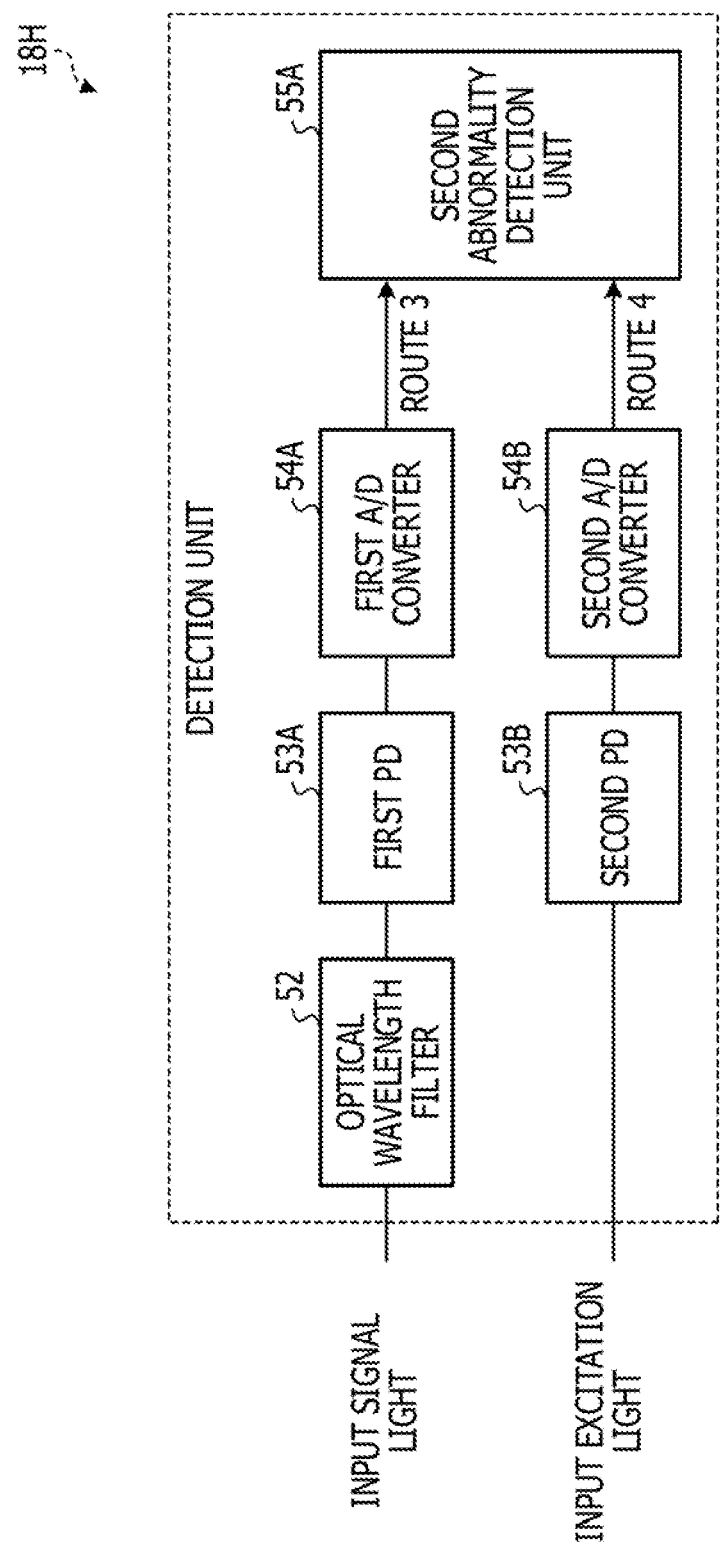
FIG. 33 is an explanatory diagram illustrating an example of a detection unit of Example 9.

FIG. 33 is an explanatory diagram illustrating an example of a detection unit 18H of Example 9. The detection unit 18H illustrated in FIG. 33 includes a second abnormality detection unit 55A other than the optical wavelength filter 52, the first PD 53A, the second PD 53B, the first A/D converter 54A, and the second A/D converter 54B.

The optical wavelength filter 52 in the detection unit 18H transmits the excitation light from the WDM light branched by the fifth optical coupler 21E and outputs it to the first PD 53A. The first PD 53A electrically converts the transmitted excitation light, and outputs a first excitation light signal after electrical conversion to the first A/D converter 54A. The first A/D converter 54A digitally converts the first excitation light signal and outputs the output level of the first excitation light signal after digital conversion to the second abnormality detection unit 55A as an output level of a route 3.

The second PD 53B electrically converts the excitation light branched by the fourth optical coupler 21D, and outputs the second excitation light signal after electrical conversion to the second A/D converter 54B. The second A/D converter 54B digitally converts the second excitation light signal and outputs the output level of the second excitation light signal after digital conversion to the second abnormality detection unit 55A as an output level of a route 4.

The second abnormality detection unit 55A outputs an abnormality detection result based on the output level of the route 3, the output level of the route 4, and an output level difference (route 3-route 4). When the output level of the route 3 and the output level of the route 4 are reduced by 3 dB, and the reduced output level difference is sufficiently small, the second abnormality detection unit 55A determines an abnormality of an output reduction of the excitation light.

When the output level of the route 3 is reduced by 2 dB, the output level of the route 4 is 0 dB, and the reduced output level difference is 2 dB or less, the second abnormality detection unit 55A determines an abnormality of the frequency deviation of the excitation light. When the output level of the route 3 is reduced by 5 dB, the output level of the route 4 is reduced by 3 dB, and the reduced output level difference is 2 dB, the second abnormality detection unit 55A determines an output reduction of the excitation light and an abnormality of the frequency deviation.

The measurement unit 17 measures the frequency difference between the excitation light in operation from the excitation light source 11 via the first optical coupler 21A, and the excitation light from the redundant excitation light source 12 via the second optical coupler 21B. The measurement unit 17 calculates an adjustment amount according to the frequency difference, and outputs the calculated adjustment amount to the adjustment unit 19H. The adjustment amount is an adjustment amount for aligning the frequency of the excitation light from the redundant excitation light source 12 with the frequency of the excitation light from the excitation light source 11 before abnormality detection.

The detection unit 18H detects light intensity of the excitation light via the fourth optical coupler 21D, and determines whether the abnormality of the excitation light is detected based on the light intensity. The detection unit 18H detects the excitation light via the fourth optical coupler 21D and the WDM light via the fifth optical coupler 21E. The detection unit 18H determines abnormal frequency deviation based on the output levels of the route 3 and the route 4 of the excitation light. When an abnormality based on the light intensity of the excitation light is detected, the detection unit 18H outputs an abnormality of the excitation light to the adjustment unit 19H and the control unit 20H. When an abnormality based on the light intensity of the excitation light is detected, the adjustment unit 19H adjusts the frequency of the excitation light from the redundant excitation light source 12 according to the adjustment amount. As a result, the redundant excitation light source 12 outputs the adjusted excitation light having the same frequency as the excitation light of the excitation light source 11 before abnormality detection. When an abnormality of the excitation light is detected, the optical SW 13 switches the input from the excitation light source 11 to the excitation light of the redundant excitation light source 12.

When abnormality in the frequency deviation is detected, the detection unit 18H outputs an abnormality of the excitation light to the adjustment unit 19H and the control unit 20H. When an abnormality in the frequency deviation of the excitation light is detected, the adjustment unit 19H adjusts the frequency of the excitation light from the redundant excitation light source 12 according to the adjustment amount. As a result, the redundant excitation light source 12 outputs the adjusted excitation light having the same frequency as the excitation light of the excitation light source 11 before abnormality detection. When an abnormality of the excitation light is detected, the optical SW 13 switches the input from the excitation light source 11 to the excitation light of the redundant excitation light source 12.

In the wavelength conversion device 3K of Example 9, the frequency difference between the excitation light in operation from the excitation light source 11 and preliminary excitation light from the redundant excitation light source 12 is measured. Based on the comparison result between the excitation light extracted from the WDM light in operation after passing through the optical wavelength filter 52 and the excitation light in operation before passing through the optical wavelength filter 52, the wavelength conversion device 3K detects the light intensity reduction of the excitation light in operation or the frequency deviation. When the light intensity of the excitation light in operation is less than the threshold value or the frequency deviation of the excitation light in operation is detected, the wavelength conversion device 3K determines that the excitation light in operation is abnormal. When an abnormality of the excitation light in operation is determined, the wavelength conversion device 3K adjusts the frequency of the preliminary excitation light to the frequency of the excitation light in operation before abnormality detection, based on the adjustment amount corresponding to the frequency difference before abnormality detection. After adjusting the frequency of the preliminary excitation light, the wavelength conversion device 3K aligns the frequency of the preliminary excitation light with the frequency of the excitation light in operation before abnormality detection, and switches from the excitation light source 11 to the redundant excitation light source 12. As a result, in the WDM device 2, communication may be continued without interruption even when the excitation light in operation is abnormal by suppressing the frequency deviation of the excitation light, that is, by aligning the frequencies between the excitation light beams, thereby avoiding reception error.

In the present example, for example, the wavelength conversion device 3 that converts the wavelength of C-band WDM light into L-band WDM light is described. However, the present example is not limited to WDM light, and may be applied to the wavelength conversion device 3 that converts the wavelength of C-band signal light into L-band converted light, and may be changed as appropriate. For the convenience of explanation, the C-band is used as a reference, but may be applied to a transmission system where wavelength conversion is performed from an S-band to an L-band or an L-band to an S-band, that is, between the S-band and the L-band, may be changed as appropriate.

In the WDM system 1 of the above-described Example, the excitation light used for the wavelength conversion device 3 may be used for an optical component such as an optical amplifier, and may be changed as appropriate.

The wavelength conversion device 3 converts the WDM light into an arbitrary wavelength band by propagating the WDM light and the excitation light to a non-linear fiber, but excitation light of an FM modulation (or PM modulation) may be used.

In the Example, a system using an optical component of the C-band, converting the wavelength of the C-band WDM light into the S-band or L-band, and transmitting it to the optical fiber 4 is exemplified. However, it is also applicable to a system that uses the optical component of S-band and converts the wavelength of the S-band WDM light into the C-band or the L-band to transmit it to the optical fiber 4, or a system that uses the optical component of L-band and converts the wavelength of the L-band WDM light into the C-band or the S-band to transmit it to the optical fiber 4.

In the Example, the case of using the C-band and the L-band is exemplified, but not limited to the C-band and the L-band, may be applied to, for example, an O-band, an E-band or a U-band, and may be changed as appropriate.

Figure 34:
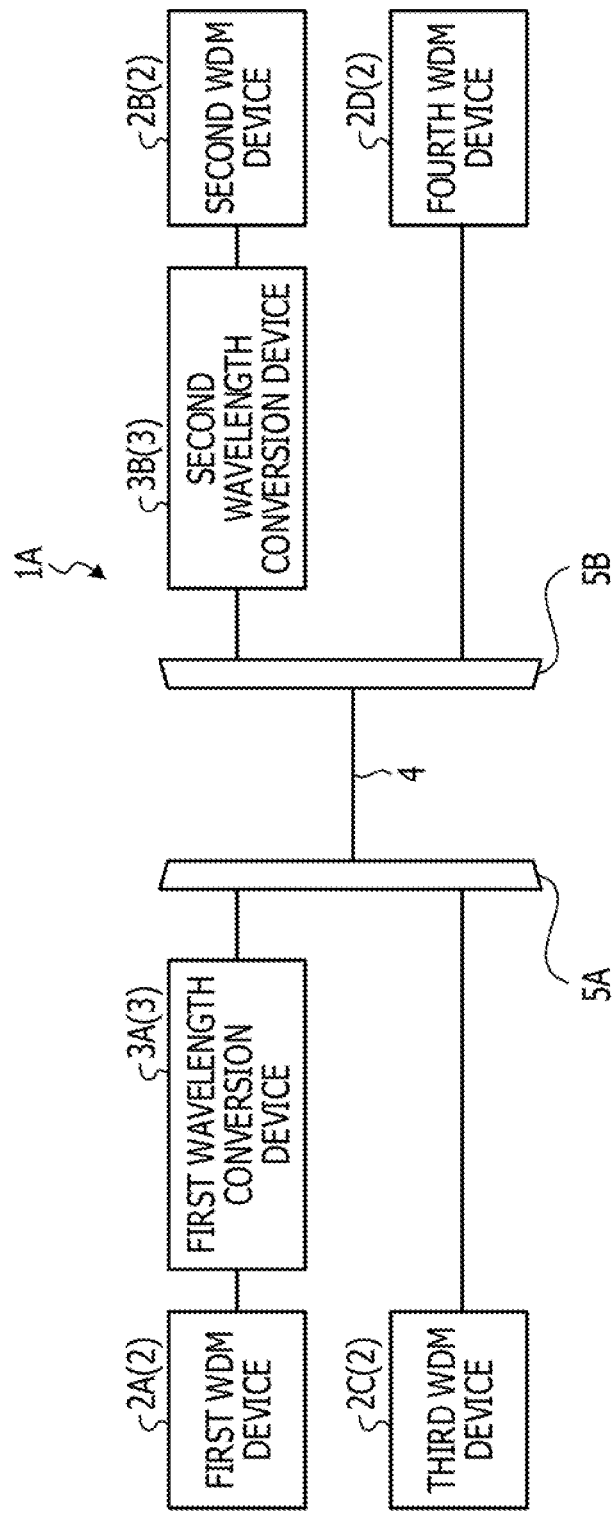
FIG. 34 is an explanatory diagram illustrating an example of a WDM system according to another example.

FIG. 34 is an explanatory diagram illustrating an example of a WDM system 1A according to another example. A first wavelength multiplexer/demultiplexer 5A in a WDM system 1A illustrated in FIG. 34 multiplexes L-band WDM light from a first wavelength conversion device 3A with C-band WDM light from a third WDM device 2C to output the C-band+L-band WDM light to the fiber 4. A second wavelength multiplexer/demultiplexer 5B demultiplexes the C-band+L-band WDM light from the fiber 4 into the C-band WDM light and the L-band WDM light, outputs the C-band WDM light to a fourth WDM device 2D, and outputs the L-band WDM light to a second wavelength conversion device 3B. The second wavelength conversion device 3B converts the wavelength of the L-band WDM light from the first wavelength conversion device 3A into the C-band WDM light according to the excitation light, and outputs the converted C-band WDM light to the second WDM device 2B. The second WDM device 2B and the fourth WDM device 2D demultiplex the C-band WDM light into signal light of each wavelength and outputs the demultiplexed signal light to each optical transceiver. The present embodiment is applicable also to a first wavelength conversion device 3A (3) and a second wavelength conversion device 3B (3) illustrated in FIG. 34.

Figure 35:
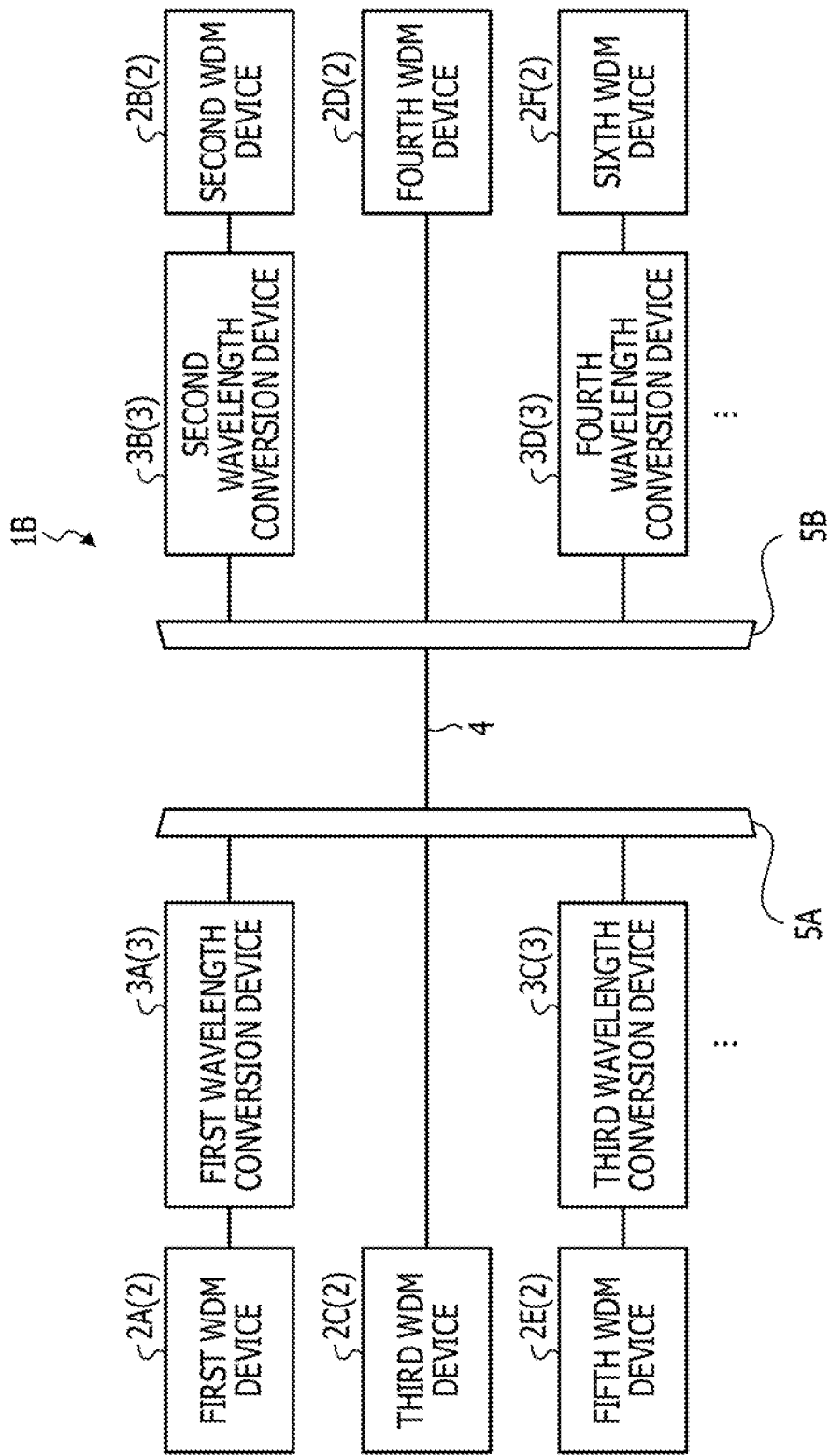
FIG. 35 is an explanatory diagram illustrating an example of a WDM system according to still another example.
Figure 36:
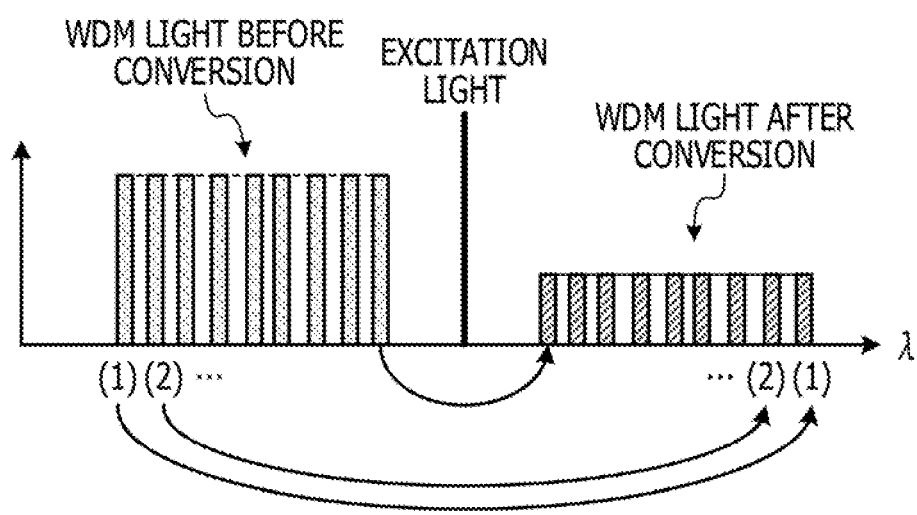
FIG. 36 is an explanatory diagram illustrating an example of WDM light before wavelength conversion and WDM light after wavelength conversion in the wavelength conversion device.

FIG. 35 is an explanatory diagram illustrating an example of a WDM system 18 according to still another example. A third wavelength conversion device 3C in the WDM system illustrated in FIG. 35 converts the wavelength of the C-band WDM light from a fifth WDM device 2E into a short-wavelength band (S-band) WDM light according to the excitation light. The first wavelength multiplexer/demultiplexer 5A multiplexes L-band WDM light after wavelength conversion from the first wavelength conversion device 3A, C-band WDM light from the third WDM device 2C, and S-band WDM light after wavelength conversion from the third wavelength conversion device 3C, and outputs the multiplexed S+C+L-band WDM light to the fiber 4. The second wavelength multiplexer/demultiplexer 5B demultiplexes the S+C+L-Band WDM light from the fiber 4 into S-band WDM light, C-band WDM light, and L-band WDM light. The second wavelength multiplexer/demultiplexer 5B outputs the C-band WDM light to the fourth WDM device 2D, outputs the L-band WDM light to the second wavelength conversion device 3B, and outputs the S-band WDM light to the fourth wavelength conversion device 3D. The second wavelength conversion device 36 converts the wavelength of the L-band WDM light from the first wavelength conversion device 3A into the C-band WDM light according to the excitation light, and outputs the converted C-band WDM light to the second WDM device 2B. The fourth wavelength conversion device 3D converts the wavelength of the S-band WDM light from the third wavelength conversion device 3C into the C-band WDM light according to the excitation light, and outputs the converted C-band WDM light to the sixth WDM device 2F. The second WDM device 28, the fourth WDM device 2D, and the sixth WDM device 2F demultiplex the C-band WDM light into signal light of each wavelength and outputs the demultiplexed signal light to each optical transceiver. The present embodiment may also be applicable to the first to fourth wavelength conversion devices 3A to 3D (3) Illustrated in FIG. 35. Similarly, the WDM light other than of the S-band, the C-band, and the L-band may be added to the band output to the optical fiber 4.

The measurement unit 17 of the present embodiment calculates an adjustment amount for aligning the frequency of the preliminary excitation light with the frequency of the excitation light in operation before abnormality detection, according to a frequency difference between the frequency of the excitation light in operation and the frequency of the preliminary excitation light and outputs the adjustment amount to the adjustment unit 19. The adjustment unit 19 aligns the frequency of the preliminary excitation light to the frequency of the excitation light before abnormality detection according to the adjustment amount. However, the embodiment is not limited to this, the measurement unit 17 specifies a set frequency of the excitation light in operation before abnormality detection according to the frequency difference. The measurement unit 17 outputs the specified set frequency to the adjustment unit 19, and the adjustment unit 19 may adjust the preliminary excitation light according to the set frequency, and may be changed appropriately. The case where the measurement unit 17 calculates an adjustment amount according to the frequency difference and outputs the adjustment amount to the adjustment unit 19 has been exemplified, but the preliminary excitation light may be adjusted according to the frequency difference before abnormality detection, and may be changed appropriately.

Two excitation light sources 11 out of the first excitation light source 11A, the second excitation light source 11B, and the third excitation light source 11C are operated, and one excitation light source 11 is preliminary, but in a case of a single excitation light system, one excitation light source 11 is operated, and two excitation light sources 11 may be preliminary, and may be changed appropriately.

A case where, in the wavelength conversion device 3 of two-wavelength excitation method, when the WDM light before conversion and two-wavelength excitation light on the long wavelength side of the WDM light side are input, the non-degenerate four lights is output from the WDM light after wavelength conversion on the long wavelength side centered on the two excitation light beams is exemplified. However, the embodiment is not limited to this, when inputting WDM light before conversion, one excitation light on a short wavelength side of the WDM light before conversion, and one excitation light on the long wavelength side of the WDM light before conversion, the wavelength conversion device 3 converts and outputs WDM light after conversion between the excitation light beams. In this case, the wavelength conversion device 3 of the present embodiment is also applicable. The wavelength conversion device 3 converts and outputs the converted WDM light between the excitation light, when the WDM light before conversion, and the two excitation light beams on the long wavelength side of the WDM light before conversion are input. In this case, the wavelength conversion device 3 of the present embodiment is also applicable. The wavelength conversion device 3 inputs the WDM light before conversion, the first excitation light orthogonal to the WDM light on the short wavelength side of the WDM light before conversion, and the second excitation light orthogonal to the WDM light on the long wavelength side of the WDM light before conversion. In this case, the first WDM light after conversion on the short wavelength side orthogonal to the first excitation light and the second WDM light after conversion on the long wavelength side orthogonal to the second excitation light are converted and output. In this case, the wavelength conversion device 3 of the present embodiment is also applicable.

The case where the detection units 18 (18A to 18E) of the wavelength conversion devices 3 (3A to 3H) of Examples 1 to 7 detect an abnormality of the excitation light based on whether the light intensity of the excitation light in operation is less than the threshold value have been exemplified. However, not limited to this, the detection unit 18 may detect the frequency deviation of the excitation light and may detect an abnormality of the frequency deviation by configuring a detection unit 18G and a detection unit 18H, and may be changed appropriately.

In the wavelength conversion devices 3 (3A to 3K) of the present embodiment, when the frequency difference between the excitation light in operation and the preliminary excitation light is measured by the measurement unit 17, and an abnormality of the excitation light in operation is detected, the device adjusts the frequency of the preliminary excitation light based on the frequency difference, and then switches the adjusted preliminary excitation light to operation. However, when the frequency of the excitation light in operation and the preliminary excitation light are set in advance, and an abnormality in the excitation light in operation is detected regardless of the frequency difference, the preliminary excitation light of the frequency set in advance may be switched to operation. In this case, a wavelength conversion device includes a first excitation light source that emits first excitation light, a second excitation light source that emits second excitation light, and a wavelength conversion unit that converts signal light of a first wavelength into signal light of a second wavelength according to the excitation light in operation out of the first excitation light and the second excitation light. The wavelength conversion device includes an adjustment unit and a control unit. When an abnormality of the excitation light in operation is detected, the adjustment unit adjusts to align the frequency of the preliminary excitation light other than the excitation light in operation out of the first excitation light and the second excitation light, with the frequency set in advance by the first excitation light source and the second excitation light source. The control unit switches the preliminary excitation light after adjustment to operation. As a result, even if there is no measurement unit, by aligning the frequencies between the excitation light beams, the WDM device may continue communication without interruption even when excitation light in operation is abnormal, thereby avoiding reception error.

The constituent elements of the respective units illustrated may not be required to be physically configured as illustrated in the drawings. For example, a specific form of distribution and integration of each unit is not limited to the form illustrated in the drawings, and all or part thereof may be configured by being distributed or integrated functionally or physically in any units depending on various loads, usage situations, and the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength conversion device comprising:
   a first excitation light source that emits first excitation light;
   a second excitation light source that emits second excitation light;
   a wavelength converter that converts signal light of a first wavelength into signal light of a second wavelength according to the first excitation light; and
   a measurer that measures a frequency difference between the first excitation light and the second excitation light,
   wherein the measurer specifies an adjustment amount according to the frequency difference,
   when an abnormality of the first excitation light is detected, the second excitation light source is adjusted so that a frequency of the second excitation light is aligned with a frequency of the first excitation light before the abnormality detection, based on the adjustment amount before the abnormality detection, and
   the wavelength converter converts the signal light of the first wavelength into the signal light of the second wavelength according to the second excitation light, after adjusting the frequency of the second excitation light.

2. The wavelength conversion device according to claim 1, further comprising:
a third excitation light source that emits third excitation light,
wherein the wavelength converter converts the signal light of the first wavelength into the signal light of the second wavelength according to the first excitation light and the third excitation light,
the measurer measures a frequency difference between the second excitation light and the third excitation light,
when an abnormality of the third excitation light is detected, the second excitation light source is adjusted so that the frequency of the second excitation light is aligned with a frequency of the third excitation light before the abnormality detection, based on the frequency difference before the abnormality detection, and
the wavelength converter converts the signal light of the first wavelength into the signal light of the second wavelength according to the first excitation light and the second excitation light, after adjusting the frequency of the second excitation light.

3. The wavelength conversion device according to claim 2, further comprising:
a first switch;
a second switch that switches between the first excitation light source and the first switch with respect to the wavelength converter; and
a third switch that switches between the third excitation light source and the first switch with respect to the wavelength converter,
wherein the first switch switches between the second switch and the third switch with respect to the second excitation light source.

4. The wavelength conversion device according to claim 1, further comprising:
a filter that sets a normal frequency of the first excitation light to a transmission wavelength; and
an abnormality detection circuit that compares an output level of the first excitation light before passing through the filter with an output level of the first excitation light after passing through the filter, and detects an abnormality of the output level of the first excitation light or an abnormality of a frequency deviation based on a comparison result.

5. The wavelength conversion device according to claim 1, further comprising:
a branching device that optically branches the signal light after wavelength conversion by the wavelength converter;
a filter that sets a normal frequency of the first excitation light to a transmission wavelength; and
an abnormality detection circuit that compares an output level of the first excitation light before passing through the filter with an output level of the first excitation light after passing through the filter, and detects an abnormality of the output level of the first excitation light or an abnormality of a frequency deviation based on a comparison result.

6. The wavelength conversion device according to claim 1, further comprising:
an adjuster configured to adjust a frequency of the second excitation light which is output form the second excitation light source.

7. An excitation light switching method executed by a wavelength conversion device, the method comprising:
emitting first excitation light;
emitting second excitation light;
converting signal light of a first wavelength into signal light of a second wavelength according to the first excitation light;
measuring a frequency difference between the first excitation light and the second excitation light;
specifying an adjustment amount according to the frequency difference;
when an abnormality of the first excitation light is detected, performing adjustment so that a frequency of the second excitation light is aligned with a frequency of the first excitation light before the abnormality detection, based on the adjustment amount before the abnormality detection; and
converting the signal light of the first wavelength into the signal light of the second wavelength, according to the second excitation light, after adjusting the frequency of the second excitation light.

* * * * *